US011175568B2

(12) United States Patent
Ito et al.

(10) Patent No.: US 11,175,568 B2
(45) Date of Patent: Nov. 16, 2021

(54) INFORMATION PROCESSING APPARATUS, INFORMATION PROCESSING METHOD, AND PROGRAM AS WELL AS IN INTERCHANGEABLE LENS

(71) Applicant: SONY CORPORATION, Tokyo (JP)

(72) Inventors: Katsuhisa Ito, Tokyo (JP); Kengo Hayasaka, Kanagawa (JP); Makibi Nakamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/755,757

(22) PCT Filed: Oct. 5, 2018

(86) PCT No.: PCT/JP2018/037327
§ 371 (c)(1),
(2) Date: Apr. 13, 2020

(87) PCT Pub. No.: WO2019/078032
PCT Pub. Date: Apr. 25, 2019

(65) Prior Publication Data
US 2020/0257183 A1 Aug. 13, 2020

(30) Foreign Application Priority Data

Oct. 20, 2017 (JP) .............................. JP2017-203243

(51) Int. Cl.
| *G03B 17/14* | (2021.01) |
| *G03B 15/02* | (2021.01) |
| *G03B 13/36* | (2021.01) |
| *H04N 5/225* | (2006.01) |

(52) U.S. Cl.
CPC ............. *G03B 17/14* (2013.01); *G03B 13/36* (2013.01); *G03B 15/02* (2013.01); *H04N 5/2254* (2013.01); *H04N 5/2256* (2013.01)

(58) Field of Classification Search
CPC ...... G03B 19/023; G03B 17/14; G03B 13/36; G03B 15/02; H04N 5/2254; H04N 5/2256
(Continued)

(56) References Cited

U.S. PATENT DOCUMENTS

| 8,526,802 B1 * | 9/2013 | Starns .................. G03B 17/561 |
| | | 396/1 |
| 10,085,008 B2 * | 9/2018 | Hayasaka ............ H04N 13/161 |

(Continued)

FOREIGN PATENT DOCUMENTS

| CN | 102640488 A | 8/2012 |
| CN | 105408937 A | 3/2016 |

(Continued)

OTHER PUBLICATIONS

Wilburn et al., High Performance Imaging Using Large Camera Arrays, ACM Transactions on Graphics, Jul. 2005, pp. 1-12.

*Primary Examiner* — Christopher E Mahoney
(74) *Attorney, Agent, or Firm* — Paratus Law Group, PLLC

(57) ABSTRACT

The present technology relates to an information processing apparatus, an information processing method, and a program as well as an interchangeable lens that make it possible to easily obtain an image of a plurality of visual points. A communication section receives, when an interchangeable lens including monocular lenses that are plural lenses arranged so as not to overlap with each other in an optical axis direction is mounted on a camera main body that includes an image sensor, known reference positions that are positions on a captured image on which a predetermined imaging target imaged by the image sensor appears, the positions corresponding to predetermined rays of light on monocular images corresponding to figures formed from rays of light focused by the monocular lenses. A reference position calculation section determines unknown reference (Continued)

positions on the basis of the known reference positions. The present technology can be applied to a camera system for capturing an image.

11 Claims, 28 Drawing Sheets

(58) Field of Classification Search
USPC .................................................. 396/326, 333
See application file for complete search history.

(56) References Cited

U.S. PATENT DOCUMENTS

| | | | |
|---|---|---|---|
| 2008/0095523 A1* | 4/2008 | Schilling-Benz | ............................ H04N 5/232123 396/111 |
| 2011/0211068 A1 | 9/2011 | Yokota | |
| 2011/0279654 A1 | 11/2011 | Ueda et al. | |
| 2013/0093842 A1* | 4/2013 | Yahata | ............... H04N 5/23238 348/38 |
| 2014/0327792 A1 | 11/2014 | Mulloni et al. | |
| 2015/0229815 A1 | 8/2015 | Nonaka et al. | |
| 2018/0131861 A1* | 5/2018 | Schillebeeckx | ........ G03B 13/36 |

FOREIGN PATENT DOCUMENTS

| | | | |
|---|---|---|---|
| CN | 108572497 A | 9/2018 | |
| DE | 102013013536 A1 * | 2/2015 | ............... G03B 7/20 |
| JP | 2007-140273 A | 6/2007 | |
| JP | 2009-003190 A | 1/2009 | |
| JP | 2012-129714 A | 7/2012 | |
| JP | 2015-148765 A | 8/2015 | |
| JP | 2017-184143 A | 10/2017 | |
| WO | WO 2014/203676 A1 | 12/2014 | |

* cited by examiner

INFORMATION PROCESSING APPARATUS, INFORMATION PROCESSING METHOD, AND PROGRAM AS WELL AS IN INTERCHANGEABLE LENS

TECHNICAL FIELD

The present technology relates to an information processing apparatus, an information processing method, and a program as well as an interchangeable lens, and particularly to an information processing apparatus, an information processing method, and a program as well as an interchangeable lens that make it possible to easily obtain, for example, an image of a plurality of visual points.

BACKGROUND ART

A light field technology which reconstructs, from an image of a plurality of visual points, for example, an image obtained by refocusing, that is, an image that may be obtained by imaging with the focus of an optical system changed or a like image has been proposed (for example, refer to NPL 1).

For example, NPL 1 describes a refocusing method using a camera array including 100 cameras.

CITATION LIST

Patent Literature

[NPL 1]
Bennett Wilburn et al., "High Performance Imaging Using Large Camera Arrays"

SUMMARY

Technical Problem

In order to perform specific image processing such as refocusing, an image of a plurality of visual points is required.

The present technology has been made in view of such a situation as described above and makes it possible to easily obtain an image of a plurality of visual points.

Solution to Problem

The information processing apparatus or the program of the present technology is an information processing apparatus including a communication section configured to receive, when an interchangeable lens including monocular lenses that are plural lenses arranged so as not to overlap with each other in an optical axis direction is mounted on a camera main body that includes an image sensor, known reference positions that are positions on a captured image on which a predetermined imaging target imaged by the image sensor appears, the positions corresponding to predetermined rays of light on monocular images corresponding to figures formed from rays of light focused by the monocular lenses, and a reference position calculation section configured to determine unknown reference positions that are positions corresponding to the predetermined rays of light on the monocular images corresponding to the monocular lenses on a different captured image captured by the image sensor on the basis of the known reference positions, or a program for causing a computer to function as such an information processing apparatus as just described.

The information processing method of the present technology is an information processing method by an information processing apparatus including receiving, when an interchangeable lens including monocular lenses that are plural lenses arranged so as not to overlap with each other in an optical axis direction is mounted on a camera main body that includes an image sensor, known reference positions that are positions on a captured image on which a predetermined imaging target imaged by the image sensor appears, the positions corresponding to predetermined rays of light on monocular images corresponding to figures formed from rays of light focused by the monocular lenses, and determining unknown reference positions that are positions corresponding to the predetermined rays of light on the monocular images corresponding to the monocular lenses on a different captured image captured by the image sensor, on the basis of the known reference positions.

In the information processing apparatus, information processing method, and program of the present technology, when an interchangeable lens including monocular lenses that are plural lenses arranged so as not to overlap with each other in an optical axis direction is mounted on a camera main body that includes an image sensor, known reference positions which are positions on a captured image on which a predetermined imaging target imaged by the image sensor appears are received, the positions corresponding to predetermined rays of light on monocular images corresponding to figures formed from rays of light focused by the monocular lenses. Then, unknown reference positions that are positions corresponding to the predetermined rays of light on the monocular images corresponding to the monocular lenses on a different captured image captured by the image sensor are determined on the basis of the known reference positions.

The interchangeable lens of the present technology is an interchangeable lens including monocular lenses that are plural lenses arranged so as not to overlap with each other in an optical axis direction, a storage section configured to store, when the interchangeable lens is mounted on a camera main body that includes an image sensor, known reference positions that are positions on a captured image on which a predetermined imaging target imaged by the image sensor appears, the positions corresponding to predetermined rays of light on monocular images corresponding to figures formed from rays of light focused by the monocular lenses, and a communication section configured to transmit the known reference position to the outside.

In the interchangeable lens of the present technology, the plural monocular lenses are arranged so as not to overlap with each other in the optical axis direction. Further, when the interchangeable lens is mounted on a camera main body that includes an image sensor, known reference positions which are positions on a captured image on which a predetermined imaging target imaged by the image sensor appears are stored, the positions corresponding to predetermined rays of light on monocular images corresponding to figures formed from rays of light focused by the monocular lenses. Further, the known reference position are transmitted to the outside.

It is to be noted that the information processing apparatus may be an independent apparatus or may be an internal block configuring one apparatus.

Further, the program can be provided by transmitting the same through a transmission medium or by recording the same on a recording medium.

Advantage Effect of Invention

According to the present technology, an image of a plurality of visual points can be obtained easily.

It is to be noted that the advantageous effect described here is not necessarily restrictive and may be some effect described in the present disclosure.

DESCRIPTION OF EMBODIMENTS

First Embodiment of Camera System to which Present Technology is Applied

Figure 1:
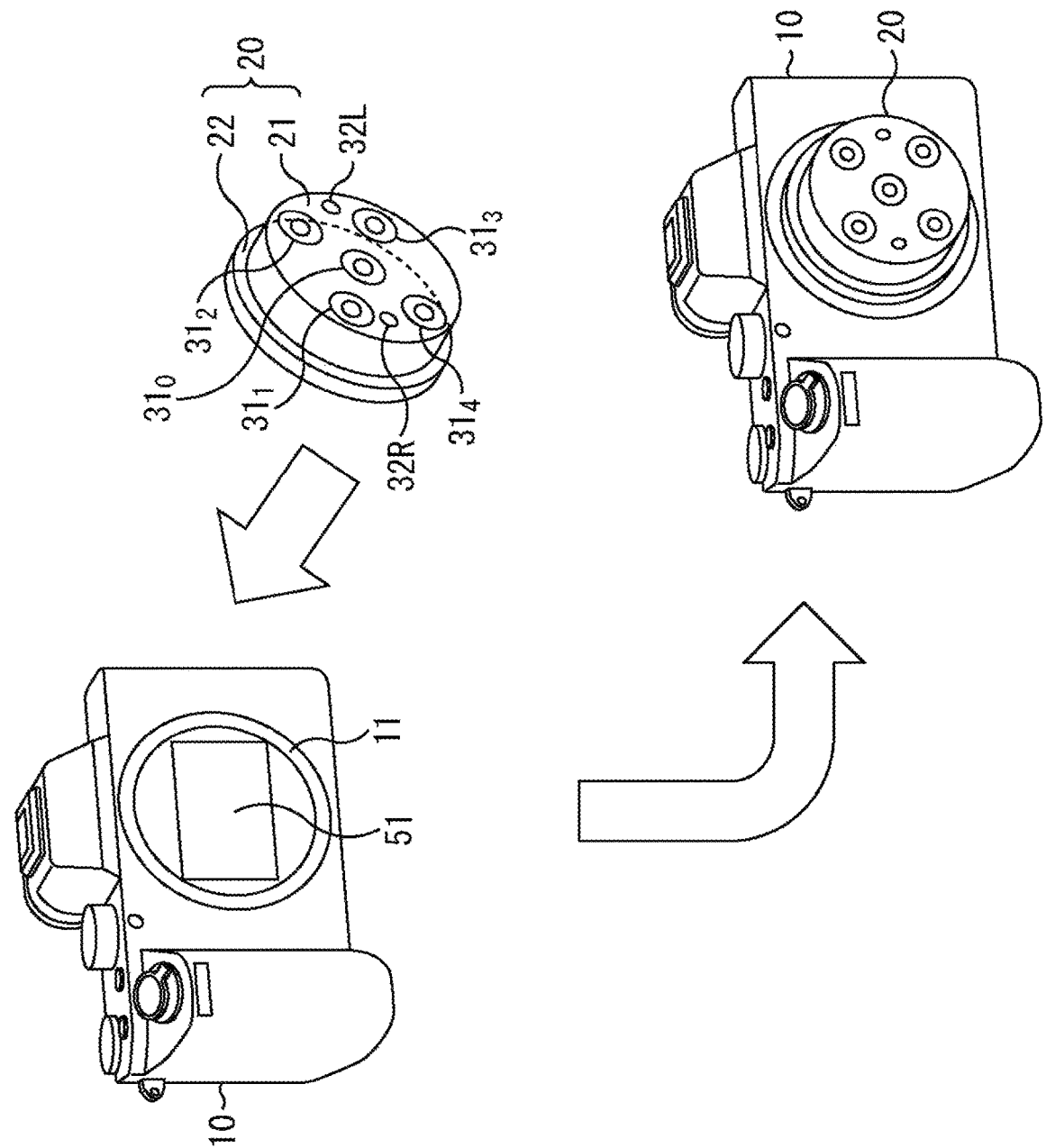
FIG. 1 is a perspective view depicting an example of a configuration of a first embodiment of a camera system to which the present technology is applied.

FIG. 1 is a perspective view depicting an example of a configuration of a first embodiment of a camera system to which the present technology is applied.

The camera system includes a camera main body 10 and a multi-lens interchangeable lens 20.

The camera main body 10 allows the multi-lens interchangeable lens 20 to be mounted removably thereon. In particular, the camera main body 10 has a camera mount 11, and by attaching (a lens mount 22 of) the multi-lens interchangeable lens 20 to the camera mount 11, the multi-lens interchangeable lens 20 is mounted on the camera main body 10. It is to be noted that a general interchangeable lens other than the multi-lens interchangeable lens 20 can also be attached removably to the camera main body 10.

The camera main body 10 has an image sensor 51 built therein. The image sensor 51 is, for example, a CMOS (Complementary Metal Oxide Semiconductor) image sensor and captures an image by receiving and photoelectrically converting rays of light focused by the multi-lens interchangeable lens 20 or some other interchangeable lens mounted on (the camera mount 11 of) the camera main body 10. In the following description, an image obtained by imaging by the image sensor 51 is also referred to as a captured image.

The multi-lens interchangeable lens 20 includes a lens barrel 21 and a lens mount 22.

On the lens barrel 21, plural lenses, that is, five monocular lenses $31_0$, $31_1$, $31_2$, $31_3$, and $31_4$, are arranged such that they do not overlap with each other (as viewed) in an optical axis direction. In FIG. 1, the five monocular lenses $31_0$ to $31_4$ are arranged on the lens barrel 21 such that the monocular lens $31_0$ is centered (gravity centered) on a two-dimensional plane perpendicular to the optical axis (i.e., parallel to a light receiving face (imaging plane) of the image sensor 51) and the other four monocular lenses $31_1$ to $31_4$ configure the vertices of a square.

The monocular lenses $31_0$ to $31_4$ focus rays of light from an imaging target to the image sensor 51 of the camera main body 10 when the multi-lens interchangeable lens 20 is mounted on the camera main body 10.

It is to be noted that, although the camera main body 10 here is what is generally called a single plate camera having one image sensor 51, the camera main body 10 may be configured adopting what is generally called a three-plate camera having plural image sensors, for example, three image sensors for RGB (Red, Green, and Blue). In the three-plate camera, the monocular lenses $31_0$ to $31_4$ focus rays of light individually to the three image sensors.

In the lens barrel 21, plural light sources that are two light sources 32L and 32R are provided in addition to the five monocular lenses $31_0$ to $31_4$. The light sources 32L and 32R are respectively provided at positions of the right end and the left end of the lens barrel 21 when the multi-lens interchangeable lens 20 is viewed from the front.

The light sources 32L and 32R each include, for example, an LED (Light Emitting Diode) or a laser and emit spotlight from the front face side toward the rear face side of the multi-lens interchangeable lens 20.

Accordingly, in the case where the multi-lens interchangeable lens 20 is mounted on the camera main body 10, spotlight emitted from the light sources 32L and 32R is received by the image sensor 51 of the camera main body 10.

The lens mount 22 is attached to the camera mount 11 of the camera main body 10 when the multi-lens interchangeable lens 20 is mounted on the camera main body 10.

It is to be noted that, while, in FIG. 1, the five monocular lenses $31_0$ to $31_4$ are provided on the multi-lens interchangeable lens 20, the number of individual lenses to be provided on the multi-lens interchangeable lens 20 is not limited to five, and any plural number of lenses such as two, three, five, or more can be adopted.

Further, the plural monocular lenses provided on the multi-lens interchangeable lens 20 may be arranged not only at positions of the center and vertices of a square but also at any position on a two-dimensional plane.

Further, for the plural monocular lenses in the multi-lens interchangeable lens 20, plural lenses can be used which are different in focal length, F value, or other specifications from one another. However, in order to simplify the description, it is assumed here that plural lenses that are same in specification are used.

Furthermore, although the multi-lens interchangeable lens 20 in FIG. 1 includes two light sources 32L and 32R, the number of light sources to be provided in the multi-lens interchangeable lens 20 is not limited to two, and any number of light sources equal to or greater than three light sources can be adopted.

Further, the light sources 32L and 32R can be arranged on a plane on which the five monocular lenses $31_0$ to $31_4$ are arranged, that is, on a line interconnecting two points that are remotest on a circle of the bottom face of the lens barrel 21 of a substantially cylindrical shape, in FIG. 1. In this case, the light sources 32L and 32R are arranged on a line passing the center of the circle of the bottom face of the lens barrel 21. As hereinafter described, the light sources 32L and 32R are desirably arranged in a spaced relationship from each other by a distance as great as possible. In the case where the bottom face of the lens barrel 21 has a circular shape, the light sources 32L and 32R can be arranged in a spaced relationship by a maximum distance from each other by arranging them on a line that passes the center of the circle of the bottom face of the lens barrel 21.

In the multi-lens interchangeable lens 20, each of the plural, i.e., five, monocular lenses $31_0$ to $31_4$ is arranged such that, when the multi-lens interchangeable lens 20 is mounted on the camera main body 10, the optical axis thereof extends orthogonally to the light receiving face of the image sensor 51.

In the camera system in which such a multi-lens interchangeable lens 20 as described above is mounted on the camera main body 10, by the image sensor 51, images corresponding to figures formed on the light receiving face of the image sensor 51 by rays of light focused individually by the five monocular lenses $31_0$ to $31_4$ are captured.

Now, if an image corresponding to a figure formed from rays of light focused by one monocular lens $31_i$ (here, i=0, 1, 2, 3, 4) is referred to as a monocular image, then a captured image captured by the image sensor 51 includes five monocular images corresponding to the five monocular lenses $31_0$ to $31_4$ (images corresponding to figures formed from rays of light focused individually by the monocular lenses $31_0$ to $31_4$).

The monocular image corresponding to the monocular lens $31_i$ is an image where the visual point is at the position of the monocular lens $31_i$, and accordingly, the five monocular images corresponding to the monocular lenses $31_0$ to $31_4$ are images of different visual points.

Further, the captured image includes spotlight figures that are images corresponding to spotlight individually emitted by the two light sources 32L and 32R.

Figure 2:
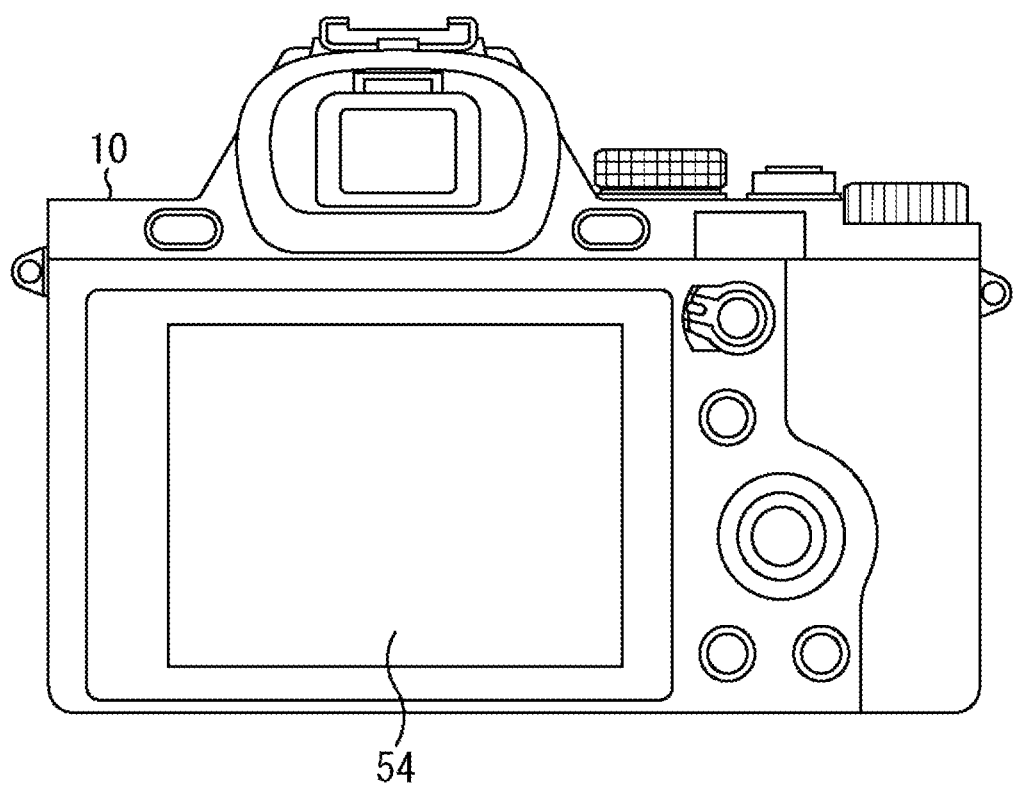
FIG. 2 is a rear elevational view depicting an example of a configuration of the rear face of a camera main body 10.

FIG. 2 is a rear elevational view depicting an example of a configuration of the rear face of the camera main body 10.

Here, it is assumed that, of the camera main body 10, the front face is given by a face on the side on which the multi-lens interchangeable lens 20 is mounted, that is, a face on which the camera mount 11 exists.

On the rear face of the camera main body 10, a display section 54 including, for example, a liquid crystal panel, an organic EL (Electro Luminescence) panel, or the like is provided. The display section 54 displays what is generally called a through picture, a menu, and such information as settings of the camera main body 10.

Figure 3:
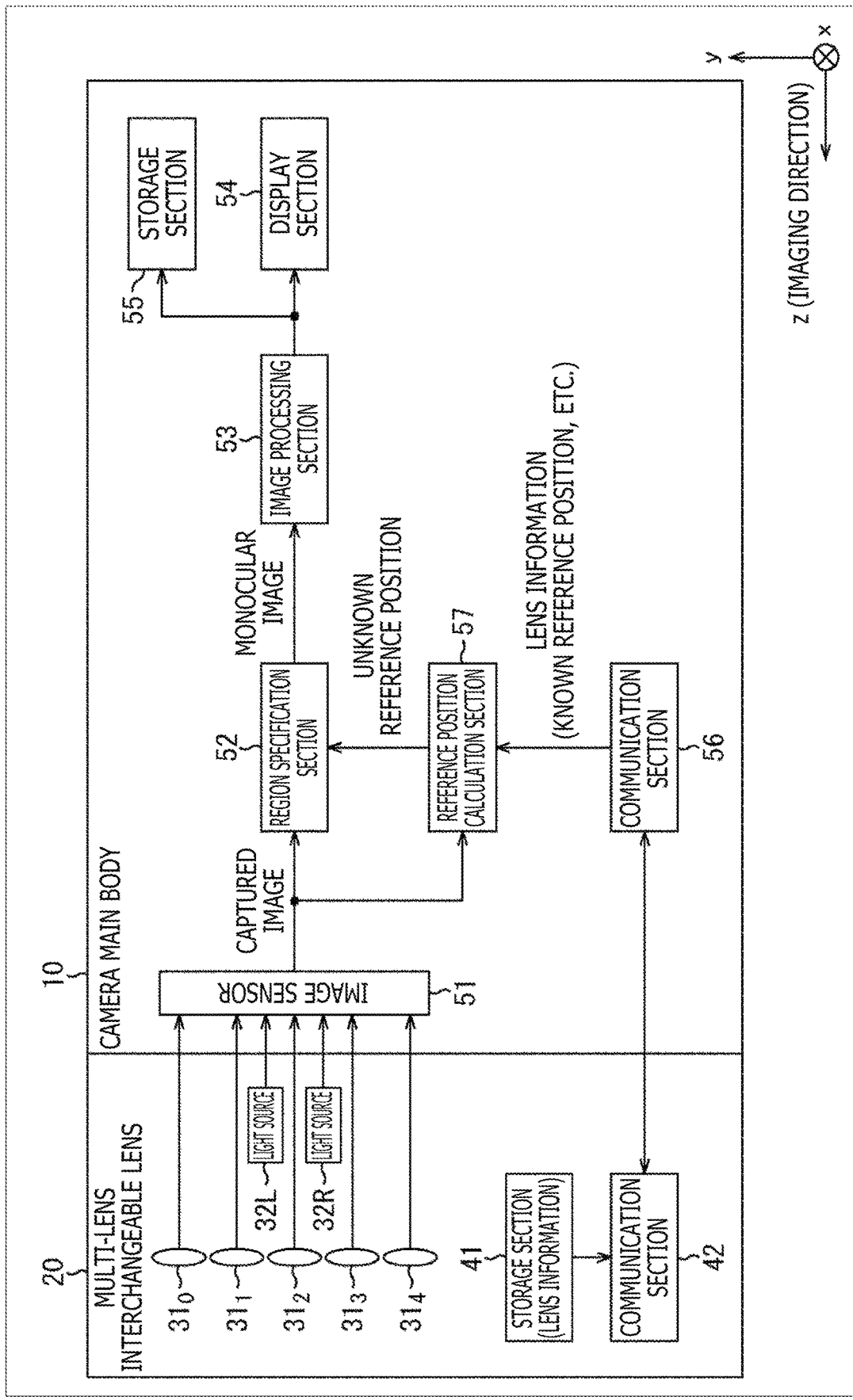
FIG. 3 is a block diagram depicting an example of an electric configuration of the camera system.

FIG. 3 is a block diagram depicting an example of an electric configuration of the camera system of FIG. 1.

In the camera system, the multi-lens interchangeable lens 20 includes a storage section 41 and a communication section 42.

The storage section 41 stores therein lens information that is information relating to the multi-lens interchangeable lens 20. The lens information includes a known reference position.

The known reference position is a position corresponding to a predetermined ray of light on an monocular image corresponding to the monocular lens $31_i$ on a known captured image on which, when the multi-lens interchangeable lens 20 is mounted on the camera main body 10, a predetermined imaging target at a known distance imaged by the (single) image sensor 51 appears.

Here, the position at which a figure of a ray of light passing along the optical axis of the monocular lens $31_i$ is formed in an monocular image corresponding to the monocular lens $31_i$ is referred to as an optical axis center position.

Now, if, for example, a ray of light passing along the optical axis of the monocular lens $31_i$ is adopted as the predetermined ray of light with respect to the monocular image corresponding to the monocular lens $31_i$, then the known reference position of the monocular image corresponding to the monocular lens $31_i$ is the optical axis center position of the monocular image.

It is to be noted that the predetermined ray of light is not limited to a ray of light passing along the optical axis of the monocular lens $31_i$. In particular, as the predetermined ray of light, for example, a ray of light passing a position spaced by a predetermined distance from the optical axis of the monocular lens $31_i$ and parallel to the optical axis and other ray of light can be adopted.

The lens information includes, in addition to the known reference position of the monocular image corresponding to the monocular lens $31_i$ on the known captured image, positions of spotlight figures of spotlight from the light sources 32L and 32R on the known captured image, that is, known light positions that are emission positions of the spotlight.

Here, it is possible to allocate a unique lens ID (Identification) to the multi-lens interchangeable lens 20 and adopt, as the lens information to be stored into the storage section 41, the lens ID of the multi-lens interchangeable lens 20. Further, in this case, a database which associates lens IDs as lens information and known reference positions or known light positions, as lens information other than the lens IDs, of the multi-lens interchangeable lens 20 specified by the lens IDs, can be prepared. In this case, by searching the database using a lens ID as a keyword, the known reference position or the known light position of an multi-lens interchangeable lens 20 associated with the lens ID can be acquired.

The communication section 42 performs wired or wireless communication with a communication section 56 hereinafter described of the camera main body 10. It is to be noted that the communication section 42 can be configured so as to communicate by any communication method with a server on the Internet, a PC (Personal Computer) on a wired or wireless LAN (Local Area Network), or some other external device, as occasion demands.

The communication section 42 transmits the lens information stored in the storage section 41 to the communication section 56 by communication with the communication section 56 of the camera main body 10, for example, when the multi-lens interchangeable lens 20 is mounted on the camera main body 10.

The camera main body 10 includes an image sensor 51, a region specification section 52, an image processing section 53, a display section 54, a storage section 55, a communication section 56, and a reference position calculation section 57.

The image sensor 51 is, for example, a CMOS image sensor described hereinabove with reference to FIG. 1, and the light receiving face of the image sensor 51 is irradiated by rays of light focused by the monocular lenses $31_0$ to $31_4$ of the multi-lens interchangeable lens 20 mounted on the camera main body 10 and rays of light as spotlight emitted from the light sources 32L and 32R.

The image sensor 51 receives and performs photoelectric conversion of rays of light focused individually by the monocular lenses $31_0$ to $31_4$ and rays of light as spotlight emitted from the light sources 32L and 32R to capture and output monocular images corresponding to the monocular lenses $31_0$ to $31_4$ (monocular images corresponding to the figures formed from the rays of light focused individually by the monocular lenses $31_0$ to $31_4$) and captured images including spotlight figures of the spotlight from the light sources 32L and 32R. The captured images (different captured images) outputted from the image sensor 51 are supplied to the region specification section 52 and the reference position calculation section 57.

In addition to the captured images outputted from the image sensor 51, an unknown reference position on a monocular image included in each captured image outputted from the image sensor 51 is supplied from the reference position calculation section 57 to the region specification section 52.

While the known reference position here is an optical axis center position on a monocular image included in a known captured image in the case where the captured image is the known captured image in which an imaging target at a known distance is imaged, the unknown reference position is the optical axis center position on a monocular image included in a captured image in the case where the captured image is an image (different captured image) in which a freely-selected imaging target (regardless of whether or not the distance to the imaging target is known) is imaged.

The region specification section 52 specifies, on the basis of the unknown reference position from the reference position calculation section 57, a region of a monocular image corresponding to each of the monocular lenses $31_0$ to $31_4$ on the captured image from the image sensor 51, and outputs region specification result information representative of a result of the specification of the region.

In particular, the region specification section 52 specifies, as the region of a monocular image, a rectangular region, in the captured image from the image sensor 51, of a predetermined size centered (gravity centered) at an unknown reference position of the captured image, for example.

Here, the region specification section 523 can output, for example, a set of captured images and region information representative of regions of individual monocular images on the captured image, as region specification result information. Further, the region specification section 52 can extract (cut out) the monocular images from the captured image and output the monocular images as region specification result information.

In the following, in order to simplify description, it is assumed that the region specification section 52 outputs, for example, monocular images extracted from a captured image (here, monocular images corresponding to the monocular lenses $31_0$ to $31_4$), as region specification result information.

The monocular images corresponding to the monocular lenses $31_0$ to $31_4$ outputted from the region specification section 52 are supplied to the image processing section 53.

The image processing section 53 performs, for example, image processing such as generation of parallax information and refocusing for generating (reconstructing) an image focused at a freely-selected imaging target using monocular images corresponding to the monocular lenses $31_0$ to $31_4$ from the region specification section 52, that is, monocular images of different visual points that are the visual points of the monocular lenses $31_0$ to $31_4$, and supplies a processing result image obtained as a result of the image processing to the display section 54 and the storage section 55.

The display section 54 displays, for example, the processing result image and so forth supplied from the image processing section 53 as a through picture as described hereinabove with reference to FIG. 2.

The storage section 55 includes a memory card or the like not depicted and stores a processing result image supplied from the image processing section 53, for example, in response to an operation of the user or the like.

The communication section 56 communicates with the communication section 42 of the multi-lens interchangeable lens 20 and so forth by wired or wireless communication. It is to be noted that the communication section 56 can further perform communication with a server on the Internet, a PC on a wired or wireless LAN, or other external devices by any communication method, as occasion demands.

For example, when the multi-lens interchangeable lens 20 is mounted on the camera main body 10, the communication section 56 communicates with the communication section 42 of the multi-lens interchangeable lens 20 to receive lens information of the multi-lens interchangeable lens 20 transmitted from the communication section 42, and supplies the lens information to the reference position calculation section 57.

The reference position calculation section 57 determines, on the basis of the known reference positions included in the lens information from the communication section 56, unknown reference positions that are optical axis center positions on monocular images corresponding to the monocular lenses $31_i$ included in the captured image supplied from the image sensor 51, and supplies the unknown reference positions to the region specification section 52.

It is to be noted that, in FIG. 3, when the reference position calculation section 57 determines unknown reference positions that are optical axis center positions on a monocular image included in a captured image supplied from the image sensor 51, the reference position calculation section 57 refers to known light positions in addition to the known reference positions included in the lens information.

<Overview of Imaging Performed Using Multi-Lens Interchangeable Lens 20>

Figure 4:
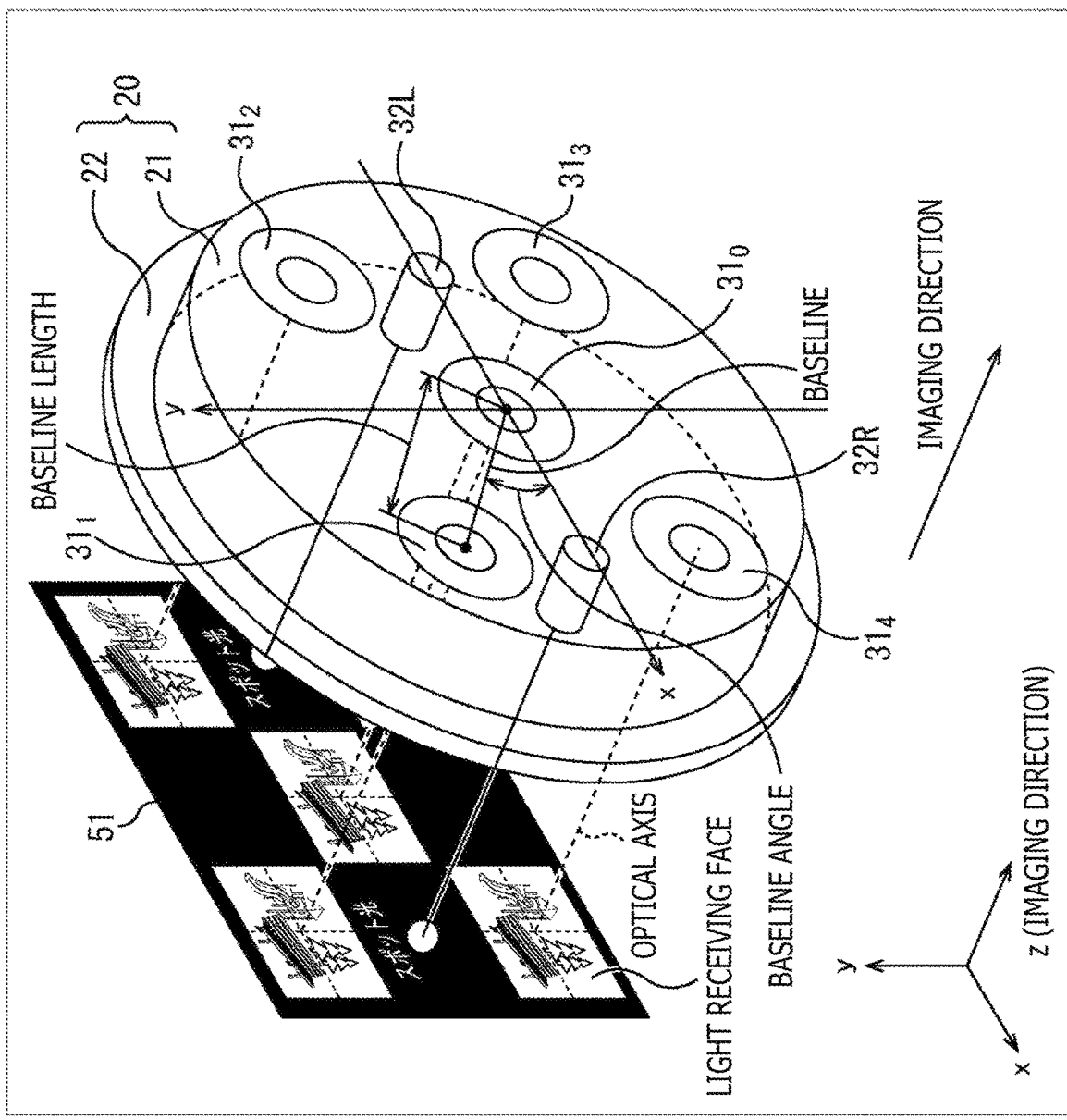
FIG. 4 is a view illustrating an overview of capturing of a captured image performed using a multi-lens interchangeable lens 20.

FIG. 4 is a view illustrating an overview of imaging of a captured image performed using the multi-lens interchangeable lens 20.

The image sensor 51 of the camera main body 10 on which the multi-lens interchangeable lens 20 is mounted captures monocular images corresponding to figures formed by focusing of rays of light by the monocular lenses $31_i$ and captured images including spotlight figures of spotlight emitted from the light sources 32L and 32R.

Here, in the present specification, in the optical axis direction of the monocular lens $31_i$, the direction from the rear face side toward the front face side of the camera main body 10 is the z direction (axis), and the direction from left to right upon orientation to the z direction is the x direction while the direction from bottom to top is the y direction.

Further, the left and right of an imaging target appearing in an image is matched with the left and right of the imaging target in actual space and besides, the left and right of the position of the monocular lens $31_i$ is made coincident with the left and right on a captured image of a monocular image corresponding to the monocular lens $31_i$. Therefore, in the following description, unless otherwise specified, the position on a capture image, the position of the monocular lens $31_i$, the left or right of an imaging target, and so forth are described with reference to the z direction, i.e., with reference to a state in which the user is orientated in an imaging direction in which an imaging target who is to be imaged exists, from the rear face side of the camera main body 10.

It is to be noted that a straight line or a line segment interconnecting the optical axes of one monocular lens $31_i$ and another monocular lens $31_j$ ($i \neq j$) is also referred to as a baseline, and the distance between the optical axes is also referred to as a baseline length. Further, an angle representative of a direction of a baseline is also referred to as a baseline angle. Here, as the baseline angle, for example, an angle defined by the x axis and a baseline (angle of an epipolar line) is adopted.

Figure 5:
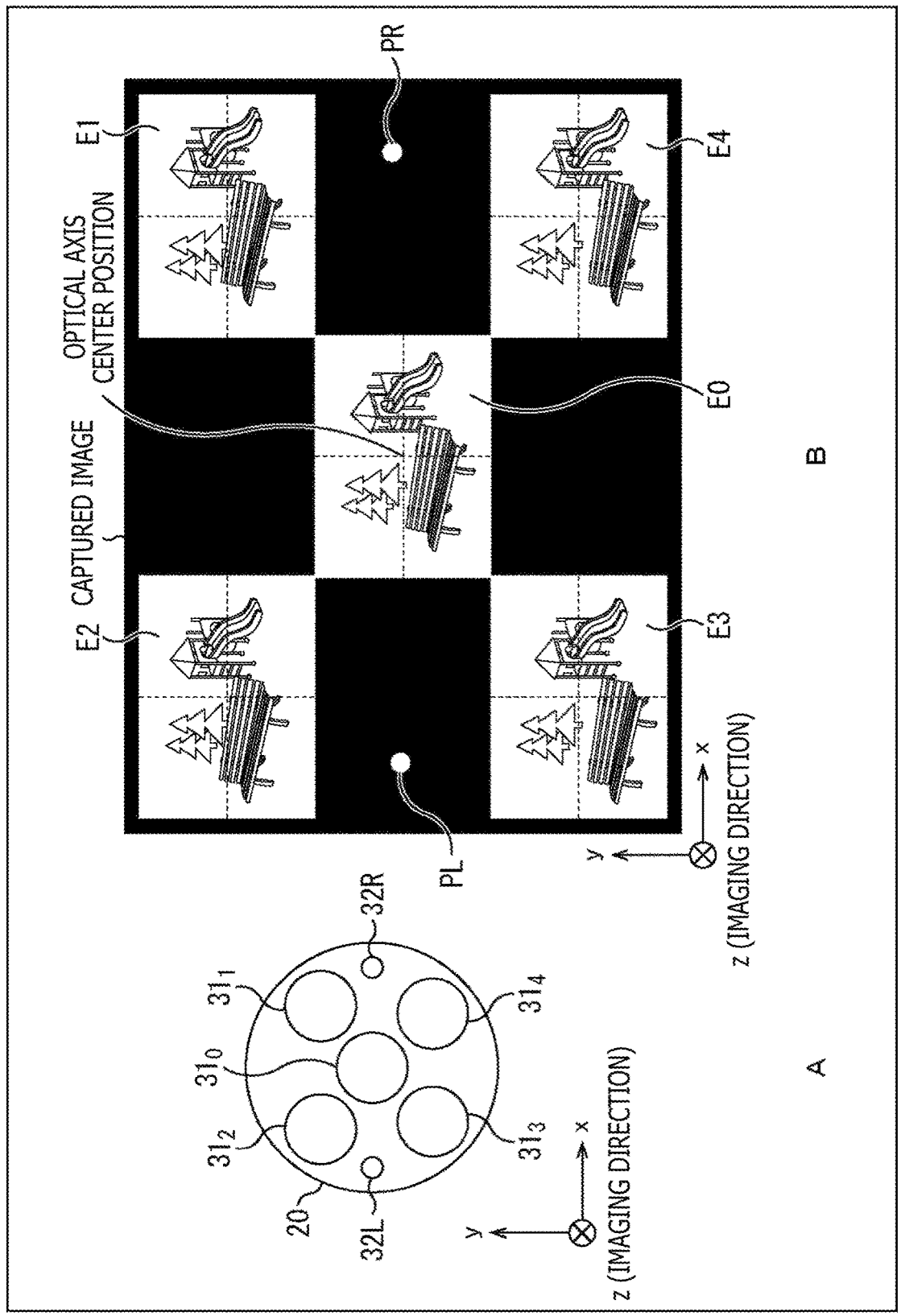
FIG. 5 is a view depicting an example of arrangement of monocular lenses $31_0$ to $31_4$ and light sources 32L and 32R in the multi-lens interchangeable lens 20 and a captured image captured using the multi-lens interchangeable lens 20.

FIG. 5 is a view depicting an example of arrangement of the monocular lenses $31_0$ to $31_4$ and the light sources 32L and 32R in the multi-lens interchangeable lens 20 and captured images captured using the multi-lens interchangeable lens 20.

In FIG. 5, "A" is a rear elevational view depicting an example of arrangement of the monocular lenses $31_0$ to $31_4$ and the light sources 32L and 32R in the multi-lens interchangeable lens 20.

In "A" of FIG. 5, the monocular lenses $31_0$ to $31_4$ are arranged such that, in a two-dimensional plane parallel to the light receiving face of the image sensor 51, the monocular lens $31_0$ is positioned at the center and the other four monocular lenses $31_1$ to $31_4$ configure the vertices of a square as described hereinabove with reference to FIG. 1.

In particular, if, for example, the monocular lens $31_0$ is determined as a reference among the monocular lenses $31_0$ to $31_4$, then in FIG. 5, the monocular lens $31_1$ is located at the top right with respect to the monocular lens $31_0$ and the monocular lens $31_2$ is located at the top left with respect to the monocular lens $31_0$. Further, the monocular lens $31_3$ is located at the bottom left with respect to the monocular lens $31_0$ and the monocular lens $31_4$ is located at the bottom right with respect to the monocular lens $31_0$.

Further, in "A" of FIG. 5, the light source 32L is located at the left end position of the multi-lens interchangeable lens 20 having a substantially circular plane, and the light source 32R is located at the right end position on the opposite side of the light source 32L, with respect to the center (middle) of the multi-lens interchangeable lens 20 having the substantially circular plane.

It is to be noted that the light sources 32L and 32R can be located at any position different from each other, of (the lens barrel 21 of) the multi-lens interchangeable lens 20.

However, the light sources 32L and 32R can be located such that spotlight figures PL and PR of spotlight emitted from the light sources 32L and 32R on the captured image captured by the image sensor 51 are positioned outside the regions of monocular images included in the captured image (outside the ranges irradiated by light passing through the monocular lenses $31_i$). In this case, the spotlight figure PL or PR can be prevented from appearing in an overlapping relationship with a monocular image to degrade the picture quality of the monocular image.

In FIG. 5, "B" is a view depicting an example of a captured image captured by the image sensor 51 of the camera main body 10 on which the multi-lens interchangeable lens 20 in which the monocular lenses 310 to $31_4$ and the light sources 32L and 32R are arranged as depicted in "A" of FIG. 5 is mounted.

The captured image captured by the image sensor 51 of the camera main body 10 on which the multi-lens interchangeable lens 20 having the monocular lenses $31_0$ to $31_4$ and the light sources 32L and 32R is mounted includes monocular images E0, E1, E2, E3, and E4 corresponding to the figures formed from the rays of light focused individually by the monocular lenses $31_0$ to $31_4$ and the spotlight figures PL and PR of the spotlight from the light sources 32L and 32R.

The region specification section 52 (FIG. 3) specifies, on the basis of the optical axis center position that is the unknown reference position of each monocular image E#i determined by the reference position calculation section 57, for each monocular lens $31_i$, a rectangular region of a predetermined size centered at the optical axis center position that is the unknown reference position of the monocular image E#i from within the region of the captured image upon which rays of the light passing the monocular lens $31_i$ are applied, as a region of the monocular image E # i.

Consequently, the monocular image E # i corresponding to the monocular lens $31_i$ becomes an image similar to a captured image obtained by performing imaging using an independent camera from the position of the monocular lens $31_i$, that is, an image obtained by imaging performed from a visual point at the position of the monocular lens $31_i$.

Therefore, a parallax occurs between two freely-selected monocular images E # i and E # j from among the monocular images E0 to E4 corresponding to the monocular lenses $31_0$ to $31_4$, respectively. In other words, the same imaging target appearing in the monocular images E # i and E # j appears at positions displaced from each other according to the parallax.

<Attachment Error of Multi-Lens Interchangeable Lens 20>

Figure 6:
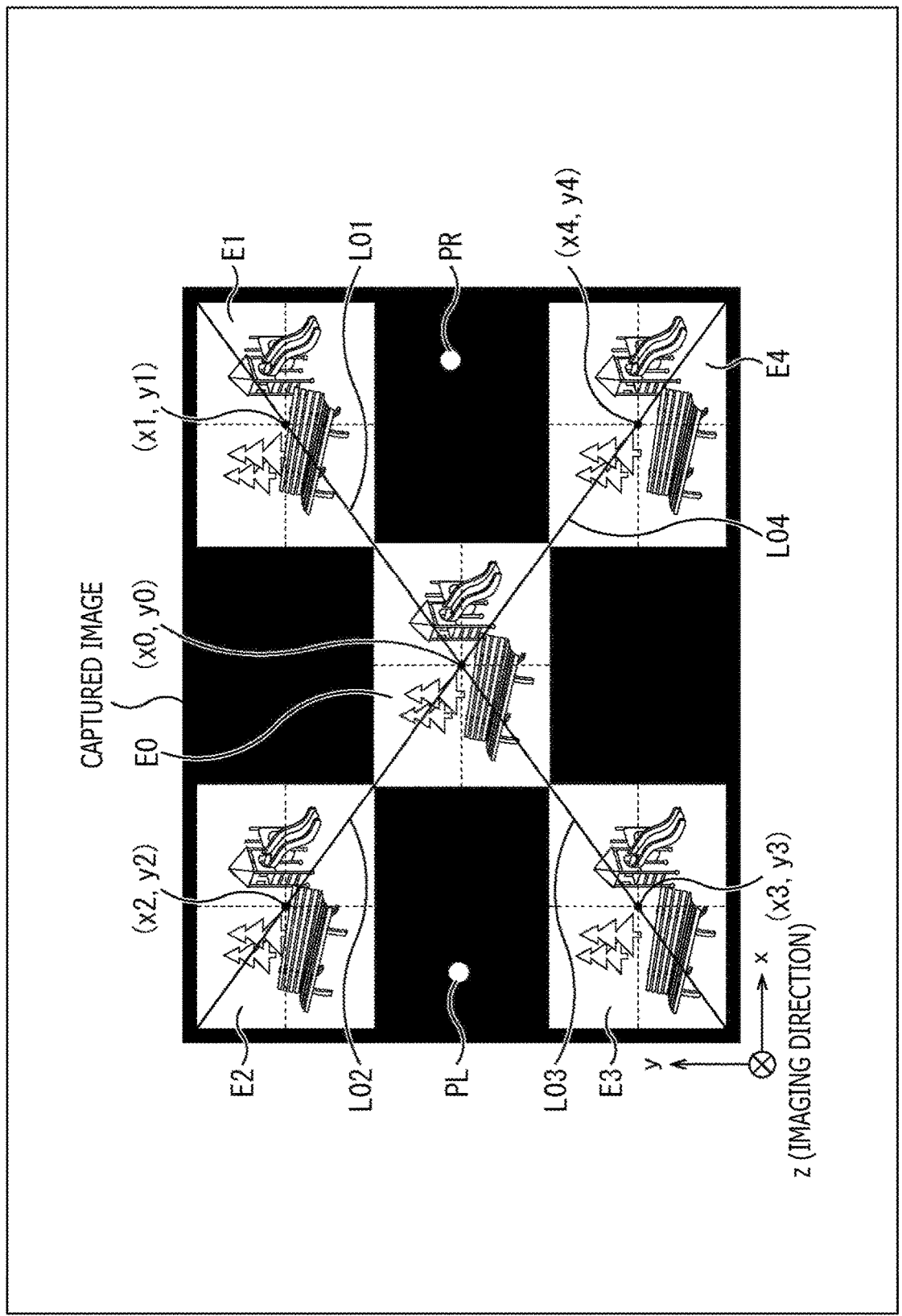
FIG. 6 is a view illustrating an attachment error when the multi-lens interchangeable lens 20 is attached to (mounted on) the camera main body 10.

FIG. 6 is a view illustrating an attachment error when the multi-lens interchangeable lens 20 is attached to (mounted on) the camera main body 10.

In particular, FIG. 6 depicts an example of a captured image captured by the camera system in which the multi-lens interchangeable lens 20 is attached to the camera main body 10.

In the case where the multi-lens interchangeable lens 20 is attached to the camera main body 10, the attachment position of the multi-lens interchangeable lens 20 with respect to the light receiving face of the image sensor 51 of the camera main body 10 may be displaced especially in a rotational direction principally among the horizontal direction (x direction), the vertical direction (y direction), and the rotational direction. In particular, the attachment position of the multi-lens interchangeable lens 20 changes when the multi-lens interchangeable lens 20 is attached to the camera main body 10, when an impact is applied to the camera system in which the multi-lens interchangeable lens 20 is attached to the camera main body 10, or in a like case.

Now, for example, the error of an actual attachment position with respect to a designed attachment position of the multi-lens interchangeable lens 20 is referred to as an attachment error. The attachment error changes when the multi-lens interchangeable lens 20 is attached to the camera main body 10, when an impact is applied to the camera system in which the multi-lens interchangeable lens 20 is attached to the camera main body 10, or in a like case, similarly to the attachment position of the multi-lens interchangeable lens 20.

As described hereinabove with reference to FIG. 5, the monocular image E # i is an image similar to an image obtained by imaging performed from the visual point at the position of the monocular lens $31_i$, and accordingly, the monocular images E0 to E4 are images whose visual points are different from each other.

In the case where, for example, parallax information is to be determined using the monocular images E0 to E4 that are images of different visual points, the baseline length and the baseline angle described hereinabove with reference to FIG. 4 are required for each of the monocular lenses $31_0$ to $31_4$.

Since the monocular lenses $31_0$ to $31_4$ are fixed to the multi-lens interchangeable lens 20, the baseline lengths are fixed values that do not change by the attachment error and can be measured in advance.

On the other hand, the baseline angle changes by the attachment error in the rotational direction of the multi-lens interchangeable lens 20. Accordingly, in order to determine accurate parallax information using the monocular images E0 to E4, it is necessary to cope with the attachment error in the rotational direction.

Here, the attachment errors in the horizontal direction and the vertical direction do not matter and can be ignored in the case where image distortion arising from a lens aberration of the monocular lens $31_i$ is small. However, in the case where the image distortion arising from a lens aberration is great and it is necessary to perform distortion correction for the image distortion, in order to perform appropriate distortion correction, it is necessary to accurately grasp the optical axis center position of the monocular image E # i. In order to accurately grasp the optical center position of the monocular image E # i, it is necessary to grasp the attachment errors in the horizontal direction and the vertical direction.

Now, as depicted in FIG. 6, (the coordinates of) the optical center positions of the monocular images E0 to E4 in a certain xy coordinate system (two-dimensional coordinate system) are represented as (x0, y0), (x1, y1), (x2, y2), (x3, y3), and (x4, y4).

Further, the monocular image E0 corresponding to the monocular lens $31_0$ positioned in the middle (at the center) from among the monocular lenses $31_0$ to $31_4$ is also referred to as a middle image E0 and the monocular images E1 to E4 corresponding to the monocular lenses $31_1$ to $31_4$ positioned peripherally are also referred to as peripheral images E1 to E4.

Taking one monocular image from among the monocular images E0 to E4, in particular, for example, the middle image E0, as a reference, relative optical axis center positions (hereinafter also referred to as relative optical axis center positions) (dx1, dy1), (dx2, dy2), (dx3, dy3), and (dx4, dy4) of the peripheral images E1 to E4 can be determined in accordance with the expressions (1).

[Math. 1]

$(dx1, dy1) = (x1-x0, y1-y0)$ $(dx2, dy2) = (x2-x0, y2-y0)$ $(dx3, dy3) = (x3-x0, y3-y0)$ $(dx4, dy4) = (x4-x0, y4-y0)$ (1)

The relative optical axis center positions (dx1, dy1), (dx2, dy2), (dx3, dy3), and (dx4, dy4) are equal to the optical axis center positions (x1, y1), (x2, y2), (x3, y3), and (x4, y4) of the peripheral images E1 to E4 in the case where the optical axis center position (x0, y0) of the middle image E0 is the origin of the xy coordinate system.

The relative optical axis center position (dx # i, dy # i) (here, i=1, 2, 3, 4) can be regarded as a vector in a direction of a baseline interconnecting the optical axis center position (x0, y0) of the middle image E0 and the optical center position (x # i, y # i) of the peripheral image E # i. According to the relative optical axis center position (dx # i, dy # i), a baseline angle $(\tan^{-1}((y \# i - y0)/(x \# i - x0)) = \tan^{-1}(dy \# i / dx \# i)$ representative of a direction of the baseline L0 # i interconnecting the optical axis center position (x0, y0) of the middle image E0 and the optical center position (x # i, y # i) of the peripheral image E # i can be determined.

Accordingly, if the relative optical axis central position (dx # i, dy # i) can be determined, then the baseline angle representative of the direction of the baseline L0 # i at the time can be determined, and accurate parallax information that is not influenced by the attachment error in the rotational direction can be determined using the baseline angle.

In the present technology, in the case where the optical axis center positions (x0, y0) to (x4, y4) of the monocular images E0 to E4 on the known captured image in which a predetermined imaging target at a known distance captured by the image sensor 51 appears, i.e., the optical axis center position (x0, y0) of the middle image E0, is the origin, the relative optical axis center positions (dx1, dy1) to (dx4, dy4) of the monocular images E1 to E4 are determined as known reference positions. Further, in the present technology, using the known reference positions ((x0, y0) to (x4, y4) or (dx1, dy1) to (dx4, dy4)) and the captured image, in the case where the optical axis center positions (x0', y0') to (x4', y4') of the monocular images E0 to E4 on the captured image upon imaging of the captured image, i.e., the optical axis center position (x0', y0') of the middle image E0, is the origin, the relative optical axis center positions (dx1', dy1') to (dx4', dy4') of the monocular images E1 to E4 are determined as unknown reference positions.

If the relative optical axis center positions (dx1', dy1') to (dx4', dy4') of the monocular images E1 to E4 on the captured image as the unknown reference positions are obtained, then it is possible to determine baseline angles upon imaging of the captured image and determine accurate parallax information that is not influenced by the attachment error in the rotational direction using the baseline angles.

The reference position calculation section 57 of FIG. 3 uses the relative optical axis center positions (dx1, dy1) to (dx4, dy4) as the known reference positions to determine the relative optical axis center positions (dx1', dy1') to (dx4', dy4') of the monocular images E1 to E4 on the captured image as the unknown reference positions, respectively, by the first calculation method.

<First Calculation Method for Determining Relative Optical Axis Center Position (Dx # i', Dy # i') of Monocular Image E # i on Captured Image as Unknown Reference Position)

Figure 7:
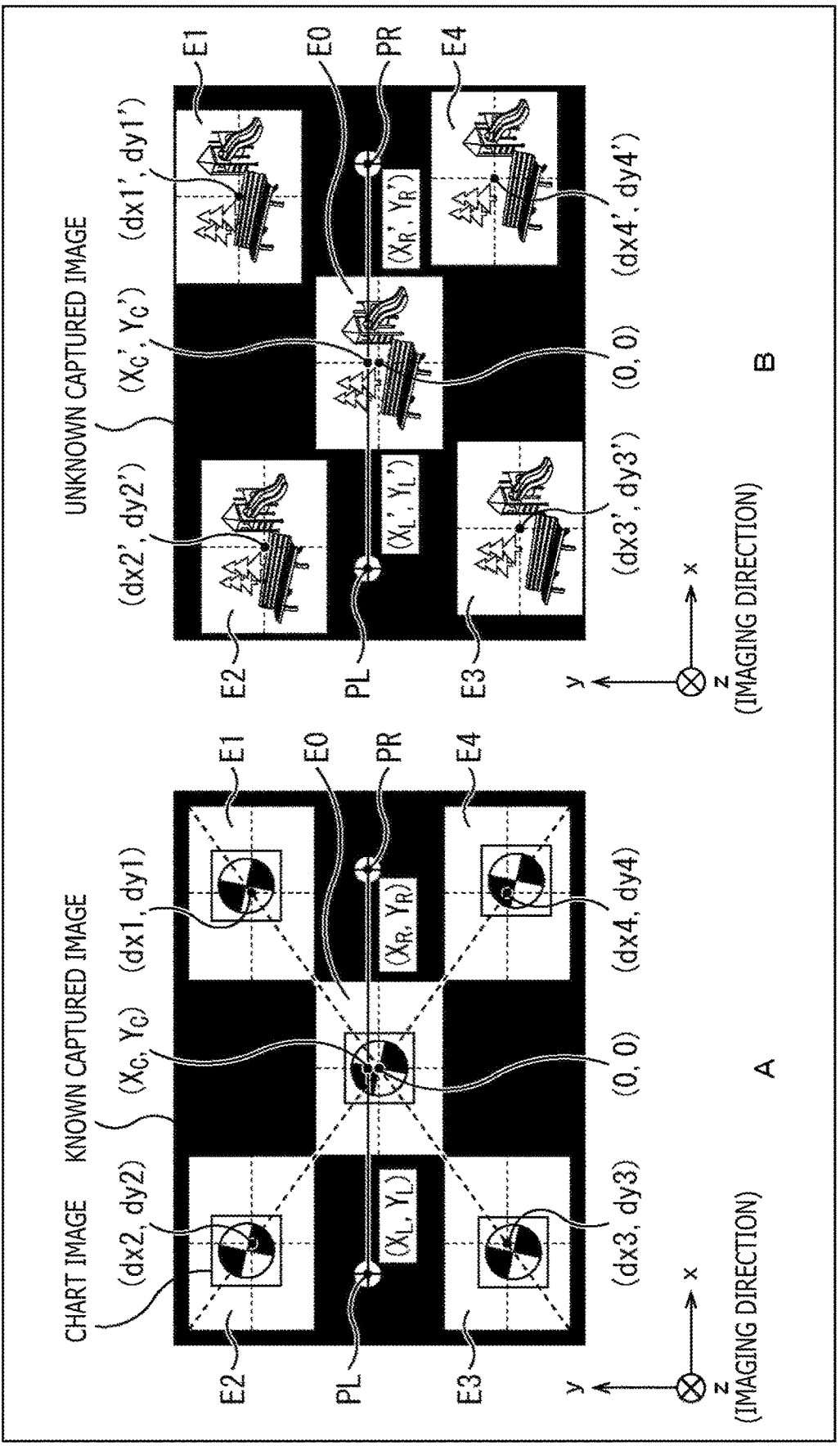
FIG. 7 is a view illustrating a first calculation method for determining relative optical axis center positions (dx1', dy1') to (dx4', dy4') as unknown reference positions.

FIG. 7 is a view illustrating the first calculation method for determining the relative optical axis center positions (dx1', dy1') to (dx4', dy4') as the unknown reference positions.

Here, in order to simplify the description in the following, an xy coordinate system in which the origin is the optical axis center position (x0, y0) of the middle image E0 is adopted. In this case, the relative optical axis center positions (dx1, dy1), (dx2, dy2), (dx3, dy3) and (dx4, dy4) and the optical axis center positions (x1, y1), (x2, y2), (x3, y3) and (x4, y4) are respectively equal to each other, as described above.

In FIG. 7, "A" depicts an example of a known captured image in which a predetermined imaging target is imaged in the camera system in which the multi-lens interchangeable lens 20 is attached to the camera main body 10.

An imaging target appearing in a known captured image is, for example, a chart image in which a predetermined chart such as a circle that is equally divided into four by line segments passing the center of the circle is drawn. The known captured image is, for example, captured with the chart image arranged at a position of a known distance on the optical axis of the monocular lens $31_0$ such that the center of the circle as a chart of the chart image appears at a predetermined point on the middle image E0, that is, for example, the optical axis center position (x0, y0)=(0, 0) of the middle image E0. Accordingly, the known captured image is an image obtained by capturing a chart image in which a predetermined chart is drawn, with the chart image being placed at a known distance.

Since the known captured image is captured in such a manner as describe above, the chart image in which the center of a circle as a chart is positioned at the optical axis center position (x0, y0)=(0, 0) appears in the middle image E0 on the known captured image. Meanwhile, in the peripheral image E # i, the chart image appears, similarly as in the middle image E0. However, in the peripheral image E # i, the position of the circle as a chart is displaced from the position of the circle as a chart appearing in the middle image E0 according to the parallax with respect to the middle image E0.

Accordingly, while, in the middle image E0 on the known captured image, the center of the circle as a chart is positioned at the optical axis center position (x0, y0)=(0, 0), in the peripheral image E # i, the center of the circle as a chart is displaced according to the parallax with respect to the middle image E0, from the optical axis center position (x # i, y # i).

Since the chart image is placed at the known distance, the parallax between the peripheral image E # i and the middle image E0 can be determined from the known distance and the baseline length and the baseline angle between the monocular lens $31_i$ and the monocular lens $31_0$ at the time when the known captured image is captured.

Here, capturing of the known captured image can be performed, for example, before the multi-lens interchangeable lens 20 is shipped from a factory or the like. Accordingly, the baseline angle upon capturing of the known captured image can be measured upon capturing of the known captured image. Alternatively, upon capturing of the known captured image, the attachment of the multi-lens interchangeable lens 20 can be adjusted such that the baseline angle becomes a predetermined value such as a designed value.

Since the optical axis center position (x # i, y # i) of the peripheral image E # i is a position after movement from the center of the circle as a chart appearing in the peripheral image E # i according to the parallax with respect to the middle image E0, the optical axis center position (x # i, y # i) can be determined from the parallax between the middle image E0 and the position of the center of the circle as a chart appearing in the peripheral image E # i.

Meanwhile, since the center of the circle as a chart of the chart image appears at the optical axis center position (x0, y0) (=(0, 0)) of the middle image E0 in the known captured image, the optical axis center position (x0, y0) of the middle image E0 can be determined by detecting the position of the center of the circle as a chart from the middle image E0.

As described above, the optical axis center position (x0, y0) of the middle image E0 on the known captured image and the optical axis center positions (x1, y1) to (x4, y4) of the peripheral images E1 to E4 can be determined from the known captured image.

According to the known reference position that is the optical axis center position (x0, y0) of the middle image E0 on the known captured image and the known reference positions that are the optical axis center positions (x # i, y # i) of the peripheral images E # i, the relative optical axis center positions (dx # i, dy # i) as the relative known reference positions that are relative known reference positions of the peripheral images E # i with reference to the known reference position (x0, y0) of the monocular image E0 can be determined. The relative optical axis center positions (dx # i, dy # i) as the relative known reference positions are stored as lens information into the storage section 41 of FIG. 3.

It is to be noted that, as the lens information, not only is it possible to adopt the relative known reference positions (relative optical axis center positions) (dx # i, dy # i) (i=1, 2, 3, 4), but it is also possible to adopt the known reference positions (optical axis center positions) (x # i, y #1) (i=0, 1, 2, 3, 4). This is because the relative known reference positions (x # i, y # i) can be determined in accordance with the expression (1) from the known reference positions (x # i, y # i) and are information (substantially) equivalent to the known reference positions (x # i, y #1).

In the case where the relative optical axis center positions (dx1', dy1') to (dx4', dy4') as the unknown reference positions are to be determined by the first calculation method, not only the relative known reference positions (dx # i, dy # i) (or the known reference positions (x # i, y #1)) but also the known light positions $(X_L, Y_L)$ and $(X_R, Y_R)$ that are the positions of the spotlight figures PL and PR of spotlight from the light sources 32L and 32R on the known captured image are determined.

For example, the position of the center of gravity of the spotlight figure PL on the known captured image can be adopted as a known light position $(X_L, Y_L)$ of the spotlight figure PL. Similarly, the position of the center of gravity of the spotlight figure PR on the known captured image can be adopted as a known light position $(X_R, Y_R)$ of the spotlight figure PR.

In the first calculation method, further, a midpoint $(X_C, Y_C)$ of the known light positions $(X_L, Y_L)$ and $(X_R, Y_R)$ is determined from the known light positions $(X_L, Y_L)$ and $(X_R, Y_R)$, and the known light positions $(X_L, Y_L)$ and $(X_R, Y_R)$ and the midpoint $(X_C, Y_C)$ are stored as lens information into the storage section 41 of FIG. 3.

It is to be noted that, in the first calculation method, the midpoint $(X_C, Y_C)$ of the known light positions $(X_L, Y_L)$ and $(X_R, Y_R)$ can be excluded from the lens information. This is because the midpoint $(X_C, Y_C)$ of the known light positions $(X_L, Y_L)$ and $(X_R, Y_R)$ can be determined from the known light positions $(X_L, Y_L)$ and $(X_R, Y_R)$.

In the first calculation method, the (relative) optical axis center positions (dx1', dy1') to (dx4', dy4') as the unknown reference positions on an unknown captured image are determined, on the basis of the relative optical axis center positions (hereinafter also simply referred to as optical axis center positions) (dx # i, dy # i) as the relative known reference positions (hereinafter also simply referred to as known reference positions) and the known light positions $(X_L, Y_L)$ and $(X_R, Y_R)$.

In FIG. 7, "B" depicts an example of an unknown captured image captured by the camera system in which the multi-lens interchangeable lens 20 is attached to the camera main body 10.

The unknown captured image is an image captured without such a restriction as that when the known captured image is captured (such a restriction that the distance to an imaging target is known or a like restriction) by the camera system in which the multi-lens interchangeable lens 20 is attached to the camera main body 10.

Upon capturing of an unknown captured image, an attachment error in the rotational direction different from that upon capturing of the known captured image may occur.

In the xy coordinate system having the origin (0, 0) at the optical axis center position (x0', y0') of the middle image E0 on the unknown captured image, the optical axis center positions (x # i', y #1') (i=1, 2, 3, 4) of the peripheral images E # i on the unknown captured image are equal to relative optical axis center positions (dx # i', dy # i')=(x # i', y # i')−(x0', y0') of the peripheral images E # i with reference to the optical axis center position (x0', y0') of the middle image E0.

Here, the unknown light positions that are positions of the spotlight figures PL and PR of the spotlight from the light sources 32L and 32R on the unknown captured image are represented by $(X_L', Y_L')$ and $(X_R', Y_R')$, respectively.

The unknown light positions $(X_L', Y_L')$ and $(X_R', Y_R')$ can be determined from the spotlight figures PL and PR on the unknown captured image, similarly to the known light positions $(X_L, Y_L)$ and $(X_R, Y_R)$.

Further, the midpoint of the unknown light positions $(X_L', Y_L')$ and $(X_R', Y_R')$ is represented as $(X_C', Y_C')$.

Now, if the relative rotational error that is an attachment error in the rotational direction upon capturing of an unknown captured image with reference to an attachment error in the rotational direction upon capturing of the known captured image is represented by $\theta_{Error}$, then the relative rotational error $\theta_{Error}$ can be determined in accordance with an expression (2) using known light positions $(X_L, Y_L)$ and $(X_R, Y_R)$ included in lens information and unknown light positions $(X_L', Y_L')$ and $(X_R', Y_R')$ obtained from an unknown captured image.

[Math. 2]

$$\theta_{Error} = \operatorname{atan}\frac{Y_R' - Y_L'}{X_R' - X_L'} - \operatorname{atan}\frac{Y_R - Y_L}{X_R - X_L} \quad \text{(provided, } X_R > X_L, X_R' > X_L'\text{)} \quad (2)$$

According to the expression (2), the relative rotational error $\theta_{Error}$ is an angle representing a direction of a straight line interconnecting the unknown light positions $(X_L', Y_L')$ and $(X_R', Y_R')$ with reference to an angle representing a direction of a straight line interconnecting the known light positions $(X_L, Y_L)$ and $(X_R, Y_R)$, and as the distance between the known light positions $(X_L, Y_L)$ and $(X_R, Y_R)$ increases (as the distance between the unknown light positions $(X_L', Y_L')$ and $(X_R', Y_R)$ increases), the accuracy increases. Accordingly, the relative rotational error $\theta_{Error}$ can be determined with a high degree of accuracy by placing the light sources 32L and 32R as far as possible.

It is to be noted that, in the case where three or more light sources are provided in the multi-lens interchangeable lens 20, the rotational error $\theta_{Error}$ is determined in accordance with the expression (2) for each of the pairs of two light sources obtained from the three or more light sources, and an average value or the like of the rotational errors $\theta_{Error}$ obtained for the pairs can be adopted as the final rotational error $\theta_{Error}$.

The relative rotational error $\theta_{Error}$ is a rotational angle between the unknown light position $(X_L', Y_L')$ (or $(X_R', Y_R')$) and the known light position $(X_L, Y_L)$ (or $(X_R, Y_R)$), and the relative optical axis center position (dx # i', dy # i') as the unknown reference position on the unknown captured image on which the relative rotational error $\theta_{Error}$ occurs can be determined by rotation of the optical axis center position (dx # i, dy # i) as the known reference position according to the relative rotational error $\theta_{Error}$, in accordance with expression (3).

[Math. 3]

Xxxxx (3)

$$\begin{pmatrix} dx1' \\ dy1' \end{pmatrix} = \begin{pmatrix} \cos\theta\text{Error} & -\sin\theta\text{Error} \\ \sin\theta\text{Error} & \cos\theta\text{Error} \end{pmatrix} \begin{pmatrix} dx1 \\ dy1 \end{pmatrix}$$

$$\begin{pmatrix} dx2' \\ dy2' \end{pmatrix} = \begin{pmatrix} \cos\theta\text{Error} & -\sin\theta\text{Error} \\ \sin\theta\text{Error} & \cos\theta\text{Error} \end{pmatrix} \begin{pmatrix} dx2 \\ dy2 \end{pmatrix}$$

$$\begin{pmatrix} dx3' \\ dy3' \end{pmatrix} = \begin{pmatrix} \cos\theta\text{Error} & -\sin\theta\text{Error} \\ \sin\theta\text{Error} & \cos\theta\text{Error} \end{pmatrix} \begin{pmatrix} dx3 \\ dy3 \end{pmatrix}$$

$$\begin{pmatrix} dx4' \\ dy4' \end{pmatrix} = \begin{pmatrix} \cos\theta\text{Error} & -\sin\theta\text{Error} \\ \sin\theta\text{Error} & \cos\theta\text{Error} \end{pmatrix} \begin{pmatrix} dx4 \\ dy4 \end{pmatrix}$$

In the case where the optical axis center positions (dx1', dy1') to (dx4', dy4') of the monocular images E1 to E4 on the unknown captured image as the unknown reference positions are determined by the first calculation method, that is, in the case where they are determined in accordance with the expression (2) and the expression (3), the attachment errors in the horizontal direction and the vertical direction can be determined by determining a parallel movement amount between the unknown light positions ($X_L'$, $Y_L'$) and ($X_R'$, $Y_R'$) of the spotlight figures PL and PR of the light sources 32L and 32R on the unknown captured image and the known light positions ($X_L$, $Y_L$) and ($X_R$, $Y_R$) of the spotlight figures PL and PR of the light sources 32L and 32R on the known captured image, respectively.

In particular, an attachment error $X_{Error}$ in the horizontal direction and an attachment error $Y_{Error}$ in the vertical direction can be determined, for example, in accordance with expression (4).

[Math. 4]

$$X\text{Error} = X_c' - X_c = \frac{X_L' + X_R'}{2} - \frac{X_L + X_R}{2}$$
$$Y\text{Error} = Y_c' - Y_c = \frac{Y_L' + Y_R'}{2} - \frac{Y_L + Y_R}{2}$$ (4)

It is to be noted that, in the expression (4), the parallel movement amount between the midpoint ($X_C'$, $Y_C'$) of the unknown light positions ($X_L'$, $Y_L'$) and ($X_R'$, $Y_R'$) of the spotlight figures PL and PR of the light sources 32L and 32R on the unknown captured image and the midpoint ($X_C$, $Y_C$) of the known light positions ($X_L$, $Y_L$) and ($X_R$, $Y_R$) of the spotlight figures PL and PR of the light sources 32L and 32R on the known captured image is determined as the attachment error $X_{Error}$ in the horizontal direction and the attachment error $Y_{Error}$ in the vertical direction. However, as the attachment error $X_{Error}$ in the horizontal direction and the attachment error $Y_{Error}$ in the vertical direction, for example, a parallel movement amount between the unknown light position ($X_L'$, $Y_L'$) and the known light position ($X_L$, $Y_L$) and a parallel movement amount between the unknown light position ($X_R'$, $Y_R'$) and the known light position ($X_R$, $Y_R$) can be determined, in addition to the above.

Figure 8:
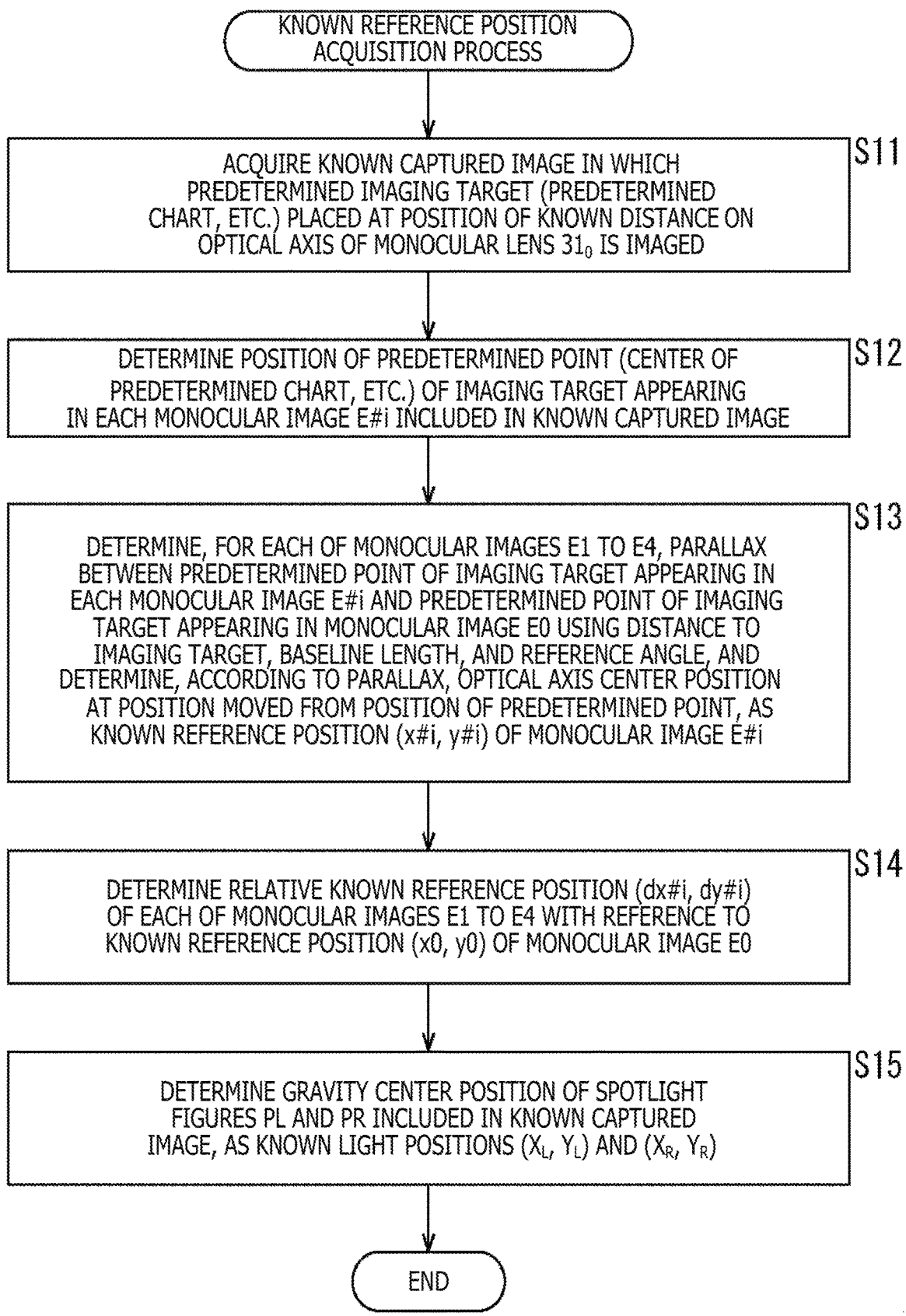
FIG. 8 is a flow chart illustrating an example of a known reference position acquisition process in the case where unknown reference positions (dx1', dy1') to (dx4', dy4') are determined by the first calculation method.

FIG. 8 is a flow chart illustrating an example of a known reference position acquisition process in the case where the optical axis center positions (dx1', dy1') to (dx4', dy4') of the monocular images E1 to E4 on the unknown captured image as unknown reference positions are determined by the first calculation method.

In the known reference position acquisition process of FIG. 8, the optical axis center positions (dx # i, dy # i) as the known reference positions and so forth that are required in the case where the optical axis center positions (dx # i, dy # i) as the unknown reference positions are determined by the first calculation method are acquired.

The known reference position acquisition process can be performed by the camera main body 10, a computer hereinafter described, or the like. An apparatus that performs the known reference position acquisition process is referred to as an acquisition processing apparatus for the convenience of description.

In step S11, the acquisition processing apparatus acquires a known captured image obtained by capturing a chart image as a predetermined imaging target placed at a position at a known distance on the optical axis of the monocular lens 31$_0$ by the camera system in which the multi-lens interchangeable lens 20 is attached to the camera main body 10. Then, the processing advances to step S12.

In step S12, the acquisition processing apparatus determines the position of a predetermined point of the chart image as the predetermined imaging target appearing in the monocular images E # i included in the known captured image, for example, of the center of a circle as a chart. Then, the processing advances to step S13.

In step S13, the acquisition processing apparatus uses the distance to the chart image as the imaging target and the baseline length and baseline angle of the multi-lens interchangeable lens 20 to determine a parallax, for each of the monocular images (peripheral images) E1 to E4, between the center of the circle as the predetermined point of the chart image as the imaging target appearing in the monocular image E # i and the center of the circle as the predetermined point of the chart image as the imaging target appearing in the monocular image (middle image) E0.

Further, the acquisition processing apparatus determines, for each of the monocular images E1 to E4, an optical center position (position on the known captured image) (x # i, y # i) of the monocular image E # i that is at a position moved, according to the parallax of the center of the circle as the predetermined point of the chart image as the imaging target appearing in the monocular image E # i, from the position of the center of the circle as the known reference position (x # i, y # i) of the monocular image E # i. Further, the acquisition processing apparatus determines an optical axis center position (x0, y0) that is a position of the center of the circle of the chart image as the imaging target appearing in the monocular image E0 as a known reference position (x0, y0) of the monocular image E0. Then, the processing advances from step S13 to step S14.

In step S14, the acquisition processing apparatus uses the known reference position (x # i, y # i) determined in step S13 to determine, for each of the monocular images E1 to E4, a (relative) known reference position (dx # i, dy # i) of the monocular image E # i with reference to the known reference position (x0, y0) of the monocular image E0, in accordance with the expression (1). Then, the processing advances to step S15.

In step S15, the acquisition processing apparatus determines the position of the center of gravity of each of the spotlight figures PL and PR of the spotlight from the light sources 32L and 32R on the known captured image, as known light positions ($X_L$, $Y_L$) and ($X_R$, $Y_R$). Then, the known reference position acquisition process ends therewith.

The (relative) known reference positions (dx # i, dy # i) determined in step S14 and the known light positions ($X_L$, $Y_L$) and ($X_R$, $Y_R$) determined in step S15 are stored as part of lens information into the storage section 41 of FIG. 3.

Figure 9:
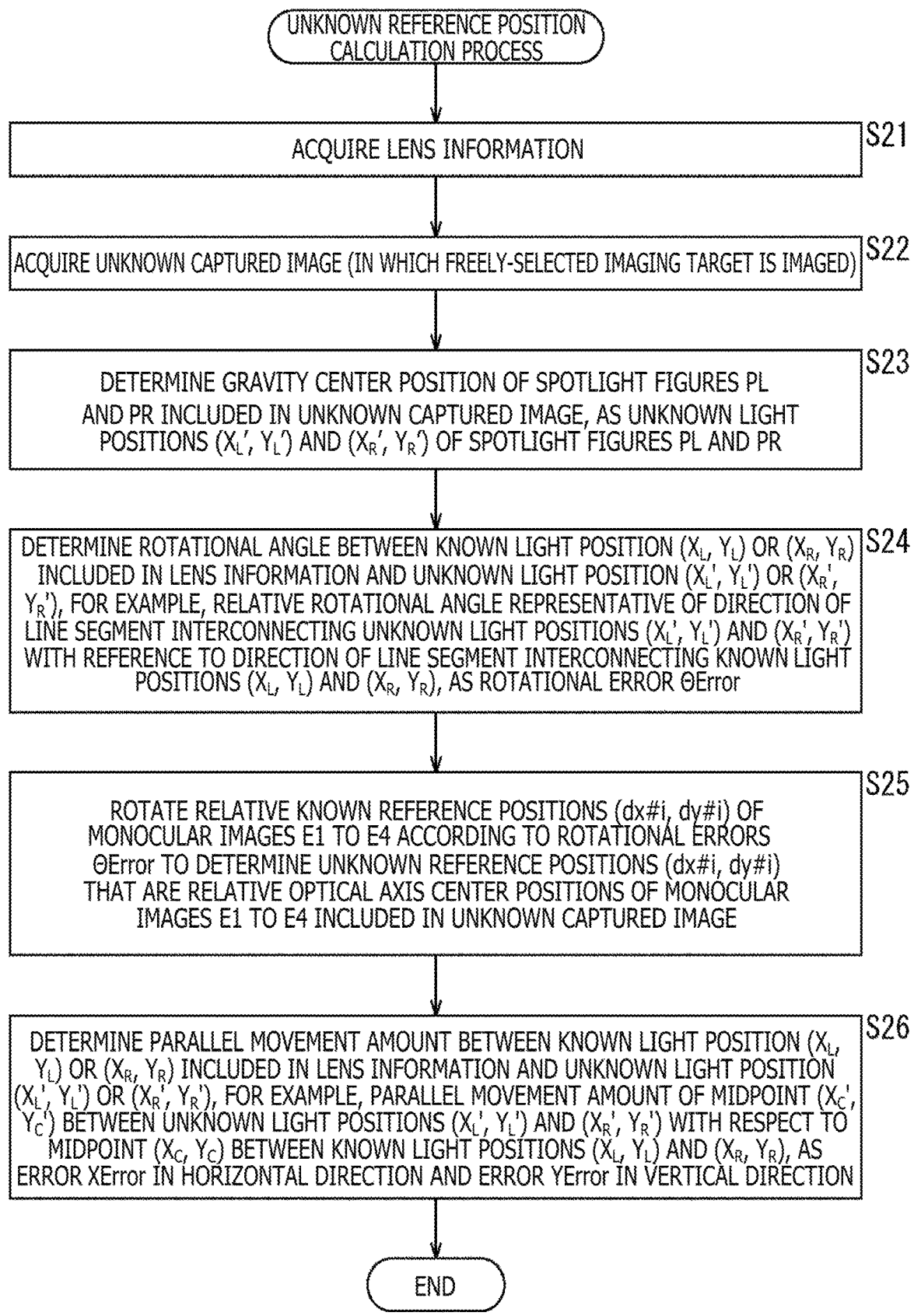
FIG. 9 is a flow chart illustrating an example of an unknown reference position acquisition process in the case where unknown reference positions (dx1', dy1') to (dx4', dy4') and so forth are determined by the first calculation method.

FIG. 9 is a flow chart illustrating an example of an unknown reference position calculation process for determining relative optical axis center positions (dx1', dy1') to (dx4', dy4') of the monocular images E1 to E4 on an unknown captured image as unknown reference positions and so forth by the first calculation method.

In step S21, the reference position calculation section 57 (FIG. 3) acquires lens information supplied from the communication section 56, and the processing advances to step S22.

In particular, if the multi-lens interchangeable lens 20 is mounted on the camera main body 10, then the communication section 56 performs communication with the communication section 42 of the multi-lens interchangeable lens 20, and receives lens information of the multi-lens interchangeable lens 20 transmitted from the communication section 42 and supplies the lens information to the reference position calculation section 57. The reference position calculation section 57 acquires the lens information supplied from the communication section 56 in such a manner as described above.

In step S22, the reference position calculation section 57 acquires an unknown captured image that is a captured image in which a freely-selected imaging target is imaged, and the processing advances to step S23. In particular, the reference position calculation section 57 acquires, as an unknown captured image, a captured image captured by the image sensor 51 in the camera system in which the multi-lens interchangeable lens 20 is attached to the camera main body 10.

In step S23, the reference position calculation section 57 determines the position of the center of gravity of the spotlight figures PL and PR of the spotlight from the light sources 32L and 32R included in the unknown captures image, as unknown light positions ($X_L'$, $Y_L'$) and ($X_R'$, $Y_R'$) Then, the processing advances to step S24.

In step S24, the reference position calculation section 57 determines the rotational angle between the known light position ($X_L$, $Y_L$) (or ($X_R$, $Y_R$)) included in the lens information and the unknown light position ($X_L'$, $Y_L'$) (or ($X_R'$, $Y_R'$)) determined in step S23, as the (relative) rotational error $\theta_{Error}$. Then, the processing advances to step S25.

In particular, the reference position calculation section 57 determines a relative angle representative of a direction of a line segment interconnecting the unknown light positions ($X_L'$, $Y_L'$) and ($X_R'$, $Y_R'$) with reference to a direction of a line segment interconnecting the known light positions ($X_L$, $Y_L$) and ($X_R$, $Y_R$) included in the lens information, as the rotational error $\theta_{Error}$, for example, in accordance with the expression (2).

In step S25, the reference position calculation section 57 rotates the relative optical axis center position (dx # i, dy # i) as the relative known reference position included in the lens information, according to the rotational error $\theta_{Error}$ determined in step S24, in accordance with the expression (3), to determine a (relative) optical axis center position (dx # i', dy # i') as the unknown reference position of each of the monocular images E1 to E4 included in the unknown captured image that suffers from the rotational error $\theta_{Error}$. Then, the processing advances to step S26.

In step S26, the reference position calculation section 57 determines a parallel movement amount between the known light position ($X_L$, $Y_L$) or ($X_R$, $Y_R$) included in the lens information and the unknown light position ($X_L'$, $Y_L'$) or ($X_R'$, $Y_R'$) of the spotlight figures PL and PR of the light sources 32L and 32R on the unknown captured image, as the attachment error $X_{Error}$ in the horizontal direction and the attachment error $Y_{Error}$ in the vertical direction, respectively. The unknown reference position calculation process ends therewith.

In particular, the reference position calculation section 57 determines the parallel movement amount of the midpoint ($X_C'$, $Y_C'$) of the unknown light positions ($X_L'$, $Y_L'$) and ($X_R'$, $Y_R'$) with respect to the midpoint ($X_C$, $Y_C$) of the known light positions ($X_L$, $Y_L$) and ($X_R$, $Y_R$), as the attachment error $X_{Error}$ in the horizontal direction and the attachment error $Y_{Error}$ in the vertical direction, respectively.

It is to be noted that, in the case where the attachment error $X_{Error}$ in the horizontal direction and the attachment error $Y_{Error}$ in the vertical direction are not required, the process in step S26 can be omitted.

<Region Specification Process of Monocular Image>

Figure 10:
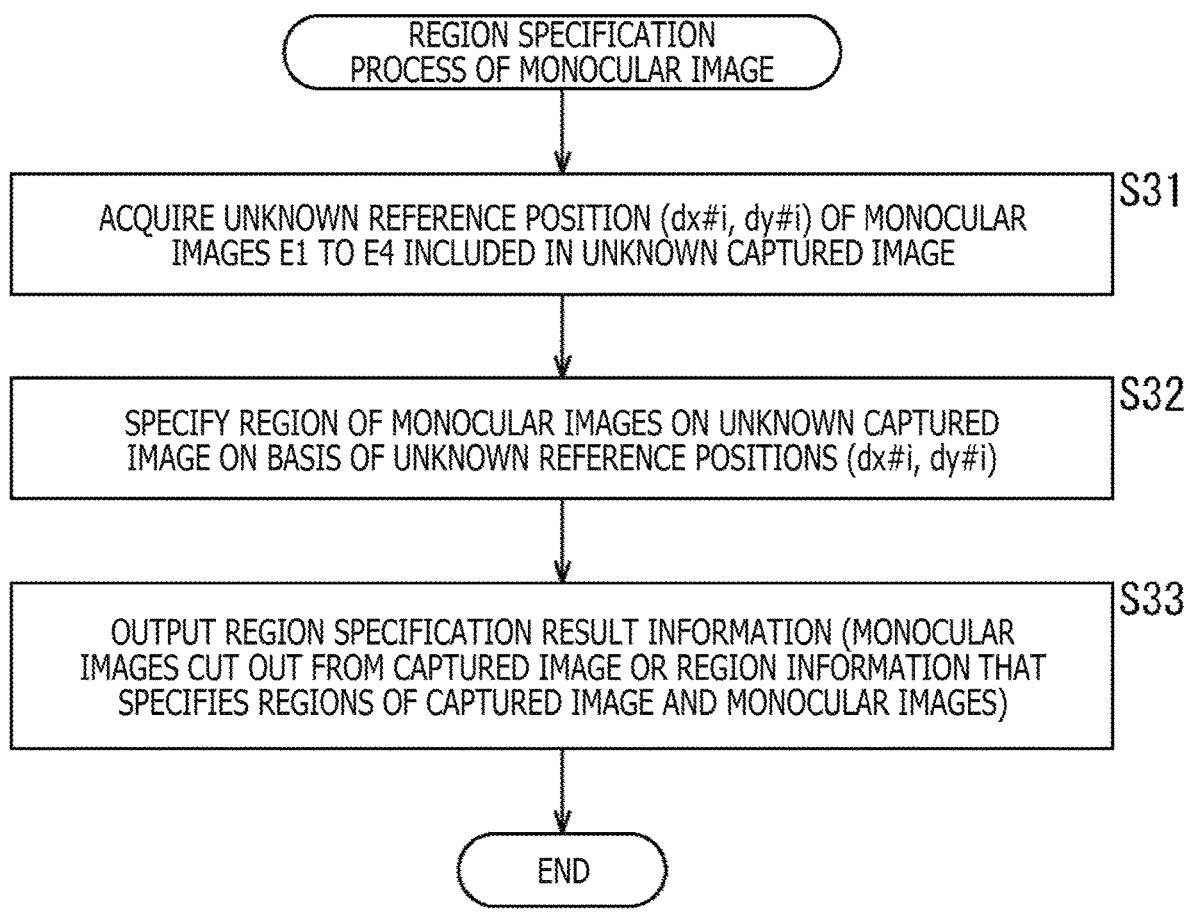
FIG. 10 is a flow chart illustrating an example of a region specification process performed by a region specification section 52 for specifying a region of each monocular image E # i on an unknown captured image.

FIG. 10 is a flow chart illustrating an example of a region specification process for specifying the region of each monocular image E # i on an unknown captured image performed by the region specification section 52 of FIG. 3.

In step S31, the region specification section 52 acquires the relative optical axis center position (dx # i, dy # i) supplied from the reference position calculation section 57 as the unknown reference position of the monocular images E1 to E4 included in the unknown captured image. Then, the processing advances to step S32.

In step S32, the region specification section 52 specifies the region of the monocular images E1 to E4 on the unknown captured image on the basis of the optical axis center positions (dx # i, dy # i) as the unknown reference position. In particular, the region specification section 52 specifies a rectangular region of a predetermined size centered at the unknown reference position (dx # i', dy # i') on the unknown captured image in the xy coordinate system used, for example, when the known reference position (dx # i, dy #1) is determined, as the region of the monocular image E # i (i=1, 2, 3, 4).

Further, the region specification section 52 specifies a rectangular region of a predetermined size centered at the origin of the unknown captured image, as a region of the monocular image E0. Then, the processing advances from step S32 to step S33.

In step S33, the region specification section 52 extracts the monocular images E0 to E4 from the captured image and outputs them as region specification result information. Then, the processing ends.

It is to be noted that the region specification section 52 can output a set of a captured image and region information representative of the regions of the peripheral images E # i on the captured image, as region specification result information, in place of the monocular images E0 to E4, as explained with reference to FIG. 3.

In the manner described above, the multi-lens interchangeable lens 20 includes the monocular lenses $31_0$ to $31_4$ arranged so as not to overlap with each other (as viewed) in the optical axis direction and transmits lens information including, for example, the optical axis center positions (dx # i, dy # i) (or (x # i, y # i)) as (relative) known reference positions of the monocular images E # i on the known captured image on which a chart image at a predetermined distance appears, to, for example, the camera main body 10 as an external apparatus. Further, the camera main body 10 receives lens information and determines, in regard to each monocular image E # i on the unknown captured image, an optical axis center position (dx # i', dy # i') as an unknown reference position on the monocular image E # i, on the basis of known reference positions (dx # i, dy #1) included in the lens information.

Accordingly, it is possible to easily obtain, on the basis of the optical axis center positions (dx # i', dy # i') as the unknown reference positions, images of a plurality of visual points, that is, monocular images E # i where the visual point is the position of the monocular lenses $31_i$.

Further, from the optical axis center positions (dx # i', dy # i') as the unknown reference positions, a baseline angle ($\tan^{-1}$(dy # i/dx # i)) representative of the direction of each baseline L0 # i (FIG. 6) can be determined, and it is possible to use the baseline angle to determine accurate parallax information that is not influenced by the attachment error in the rotational direction of the multi-lens interchangeable lens 20.

Here, for example, it is assumed that the xy coordination system in which the origin is given by the optical axis center position (x0, y0) of the monocular image E0 on the known captured image is adopted, and that the attachment error $X_{Error}$ in the horizontal direction and the attachment error $Y_{Error}$ in the vertical direction are 0. In this case, in the unknown captured image, the optical axis center position that is the unknown reference position (x0', y0') of the monocular image E0 is the origin, and the region of the monocular image E0 is a region centered at the origin.

On the other hand, in the case where the attachment error $X_{Error}$ in the horizontal direction or the attachment error $Y_{Error}$ in the vertical direction is not 0, in the unknown captured image, the optical axis center position of the monocular image E0 is displaced from the origin by the attachment error $X_{Error}$ in the horizontal direction and by the attachment error $Y_{Error}$ in the vertical direction.

In this case, if, assuming that the optical axis center position that is the unknown reference position (x0', y0') of the monocular image E0 is the origin, a rectangular region of a predetermined size centered at the origin is specified as a region of the monocular image E0, then since the optical axis center position that is the actual unknown reference position (x0', y0') is displaced from the origin, the rectangular region of the predetermined size centered at the position displaced from the actual optical axis center position of the monocular image E0 on the unknown captured image is specified as the region of the monocular image E0.

As a result, also in regard to each of the other monocular images E1 to E4, a rectangular region of the predetermined size centered at a position displaced from the optical axis center position (x # i', y # i') of the monocular image E # i on the unknown captured image is specified as the region of the monocular image E # i.

In particular, in the case where the attachment error $X_{Error}$ in the horizontal direction or the attachment error $Y_{Error}$ in the vertical direction is not 0, the rectangular regions of the predetermined size centered at the positions displaced by a same parallel displacement amount from the optical axis center positions (x # i', y # i') of the monocular image E # i on the unknown captured image are specified as the regions of the monocular images E # i.

However, not only in the case where the attachment error $X_{Error}$ in the horizontal direction or the attachment error $Y_{Error}$ in the vertical direction is not 0 but also in the case where the attachment error $X_{Error}$ in the horizontal direction and the attachment error $Y_{Error}$ in the vertical direction are 0, the baseline angle ($\tan^{-1}$(dy # i/dx # i) upon imaging of the unknown captured image can be determined from the optical axis center position (dx # i', dy # i') as a relative unknown reference position with reference to the position of the monocular image E0.

Accordingly, a baseline angle obtained in regard to a monocular image E # i centered at a position displaced by the same parallel movement amount from the optical axis center position (x # i', y # i') is equal to a baseline angle obtained in regard to a monocular image E # i centered at the optical axis center position (x # i', y # i') on the unknown captured image.

In particular, also in the case where the attachment error $X_{Error}$ in the horizontal direction or the attachment error $Y_{Error}$ in the vertical direction is not 0, a same baseline angle as that in the case where the attachment error $X_{Error}$ in the horizontal direction and the attachment error $Y_{Error}$ in the vertical direction are 0 is obtained. Then, using the baseline angle, accurate parallax information that is not influenced by the attachment error of the multi-lens interchangeable lens 20 can be determined from the monocular image E # i whose region on the unknown captured image is specified.

As described above, since a same value can be determined as the baseline angle irrespective of the attachment error $X_{Error}$ in the horizontal direction and the attachment error $Y_{Error}$ in the vertical direction, in the following, in order to simplify the description, it is assumed that the attachment error $X_{Error}$ in the horizontal direction and the attachment error $Y_{Error}$ in the vertical direction are 0 (the attachment error $X_{Error}$ in the horizontal direction and the attachment error $Y_{Error}$ in the vertical direction are not mentioned).

In this case, the optical axis center position of the monocular image E0 included in the unknown captured image coincides with the optical axis center position of the monocular image E0 included in the known captured image, that is, in the present embodiment, the origin of the xy coordinate system when the known reference position (dx # i, dy # i) is determined.

Second Embodiment of Camera System to Which Present Technology Is Applied

Figure 11:
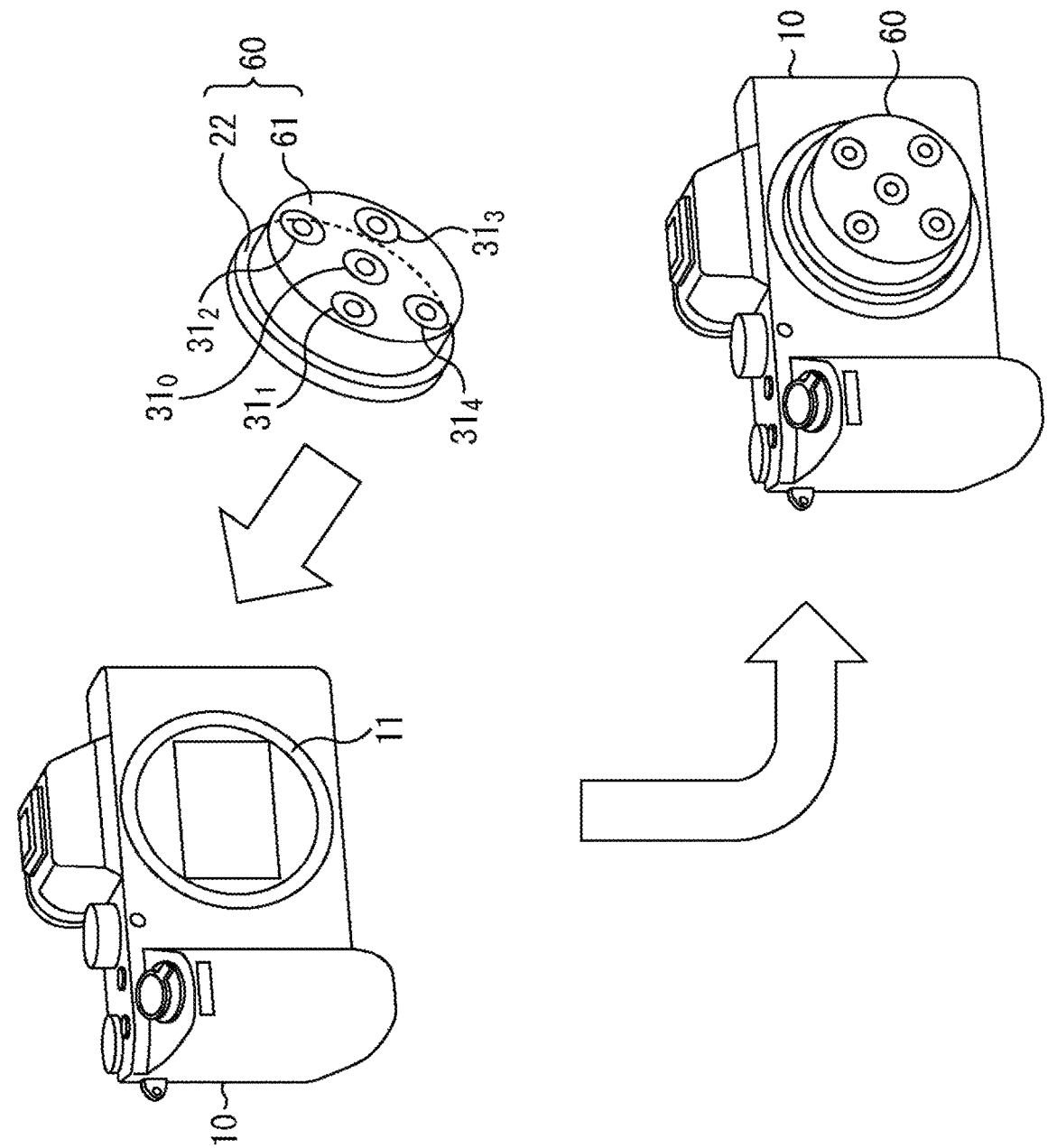
FIG. 11 is a perspective view depicting an example of a configuration of a second embodiment of a camera system to which the present technology is applied.

FIG. 11 is a perspective view depicting an example of a configuration of a second embodiment of a camera system to which the present technology is applied.

It is to be noted that, in FIG. 11, elements corresponding to those in the case of FIG. 1 are denoted by identical reference signs and, in the following, description of them is suitably omitted.

Referring to FIG. 11, the camera system of FIG. 11 includes a camera main body 10 and a multi-lens interchangeable lens 20.

Accordingly, the camera system of FIG. 11 is configured similarly to that in the case of FIG. 1.

However, in the camera system of FIG. 11, the multi-lens interchangeable lens 20 does not include the light sources 32L and 32R. Accordingly, the camera system of FIG. 11 is different from that in the case of FIG. 11, in which the multi-lens interchangeable lens 20 includes the light sources 32L and 32R, in that the multi-lens interchangeable lens 20 does not include the light sources 32L and 32R.

Figure 12:
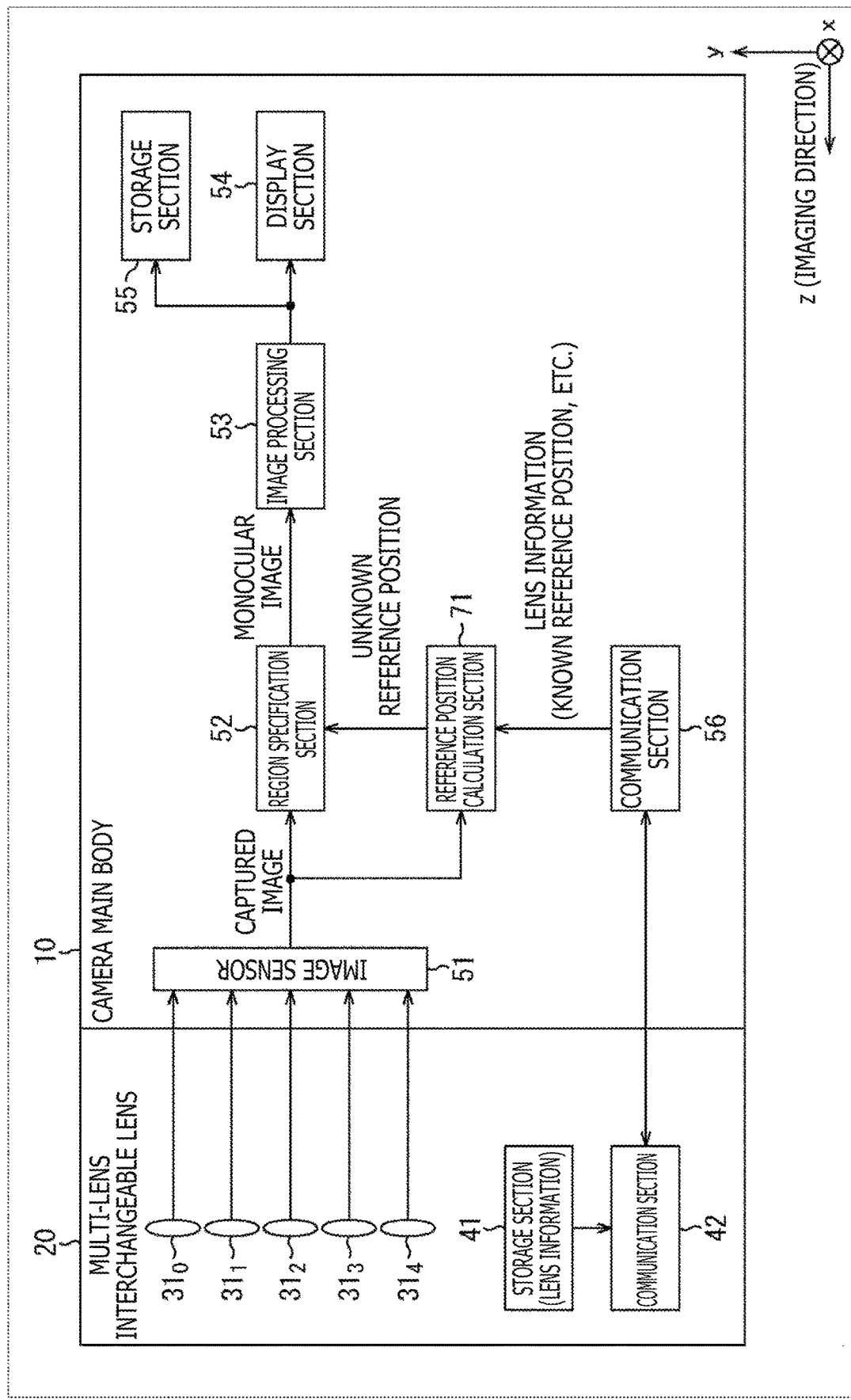
FIG. 12 is a block diagram depicting an example of an electric configuration of the camera system.

FIG. 12 is a block diagram depicting an example of an electric configuration of the camera system of FIG. 11.

It is to be noted that, in FIG. 12, elements corresponding to those in the case of FIG. 3 are denoted by identical reference signs and, in the following, description of them is suitably omitted.

In the camera system of FIG. 12, the multi-lens interchangeable lens 20 includes a storage section 41 and a communication section 42.

It is to be noted that, in FIG. 12, the multi-lens interchangeable lens 20 is different from that in the case of FIG. 1, in that it does not include the light sources 32L and 32R as described hereinabove with reference to FIG. 11.

On the other hand, the multi-lens interchangeable lens 20 of FIG. 12 is common to that in the case of FIG. 3, in that lens information stored in the storage section 41 includes optical axis center positions (dx # i, dy # i) as known reference positions of the monocular images E # i on a known captured image.

However, the multi-lens interchangeable lens 20 of FIG. 12 is different from that in the case of FIG. 3 in that the lens information stored in the storage section 41 does not include known light positions $(X_L, Y_L)$ and $(X_R, Y_R)$ of the spotlight figures PL and PR of the light sources 32L and 32R.

Further, the multi-lens interchangeable lens 20 of FIG. 12 is different from that in the case of FIG. 3 in that lens information stored in the storage section 41 includes a reference angle.

The reference angle is an angle representing a direction of a baseline L0 # i upon imaging of the known captured image, that is, an angle representative of a direction of a line interconnecting a known reference position (x0, y0) of the monocular image E0 on the known captured image and a known reference position (x # i, y # i) of a different monocular image E # i (i=1, 2, 3, 4), in short, an angle of a direction from the origin toward the known reference position (dx # i, dy # i).

In the camera system of FIG. 12, the camera main body 10 includes an image sensor 51, a region specification section 52, an image processing section 53, a display section 54, a storage section 55, a communication section 56, and a reference position calculation section 71.

Accordingly, the camera main body 10 of FIG. 12 is common to that in the case of FIG. 3, in that it includes the image sensor 51 through the communication section 56. However, the camera main body 10 of FIG. 12 is different from that in the case of FIG. 3, in that it includes the reference position calculation section 71 in place of the reference position calculation section 57.

The reference position calculation section 71 determines unknown reference positions (dx # i', dy # i') that are the optical axis center positions on monocular images E # i included in an unknown captured image supplied from the image sensor 51, on the basis of the known reference positions (dx # i, dy # i) and reference angles included in the lens information from the communication section 56, and supplies the unknown reference positions (dx # i', dy # i') to the region specification section 52.

<Overview of Imaging Performed Using Multi-Lens Interchangeable Lens 20>

Figure 13:
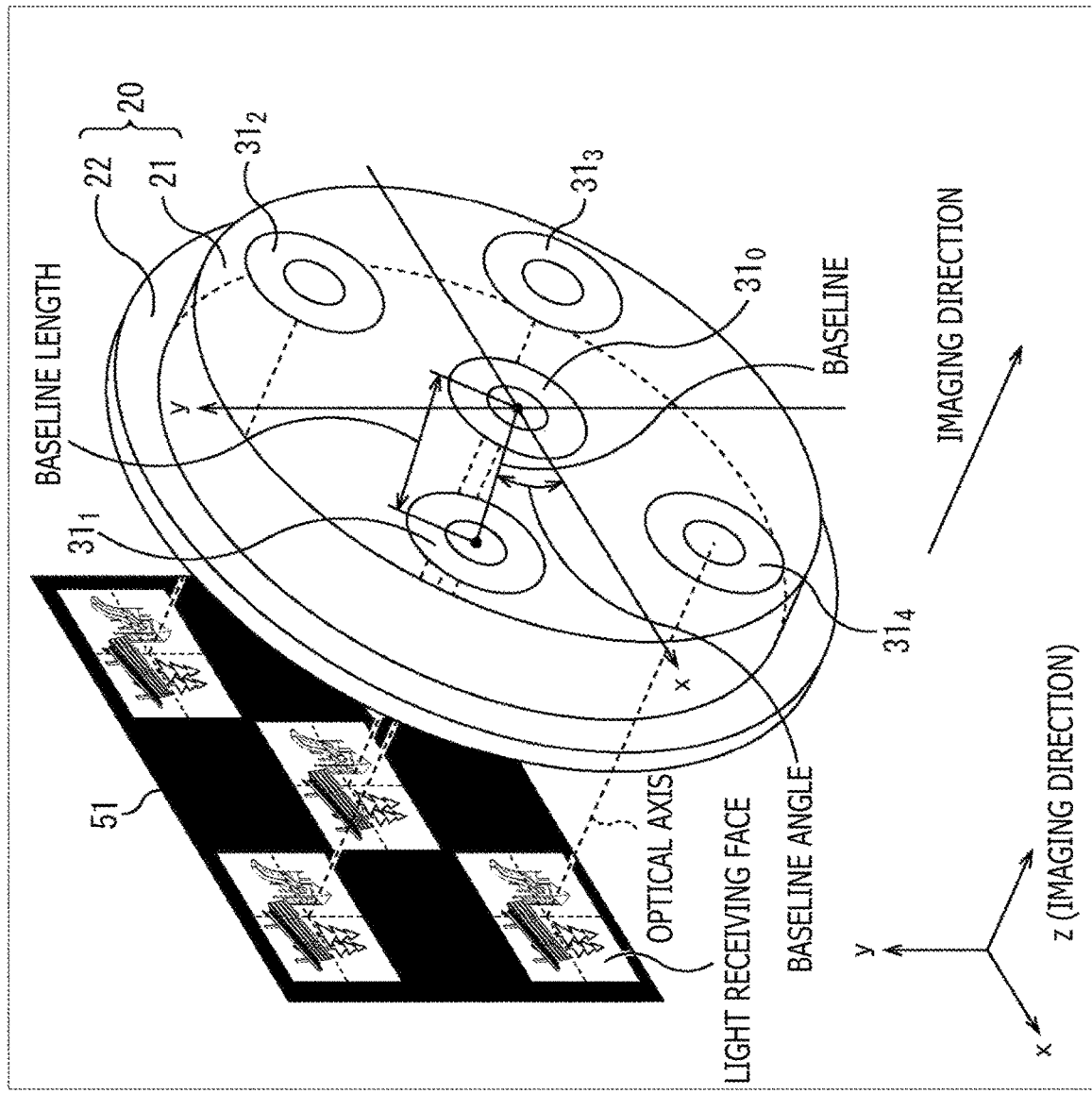
FIG. 13 is a view illustrating an overview of capturing of a captured image performed using the multi-lens interchangeable lens 20.

FIG. 13 is a view illustrating an overview of capturing of a captured image using the multi-lens interchangeable lens 20 of FIG. 11.

As described hereinabove, the multi-lens interchangeable lens 20 of FIG. 11 does not include the light sources 32L and 32R. Although the image sensor 51 of the camera main body 10 on which the multi-lens interchangeable lens 20 of FIG. 11 is mounted captures a captured image including monocular images corresponding to figures formed by rays of light focused by the monocular lenses $31_i$, the captured image does not include spotlight figures PL and PR of spotlight emitted from the light sources 32L and 32R.

Figure 14:
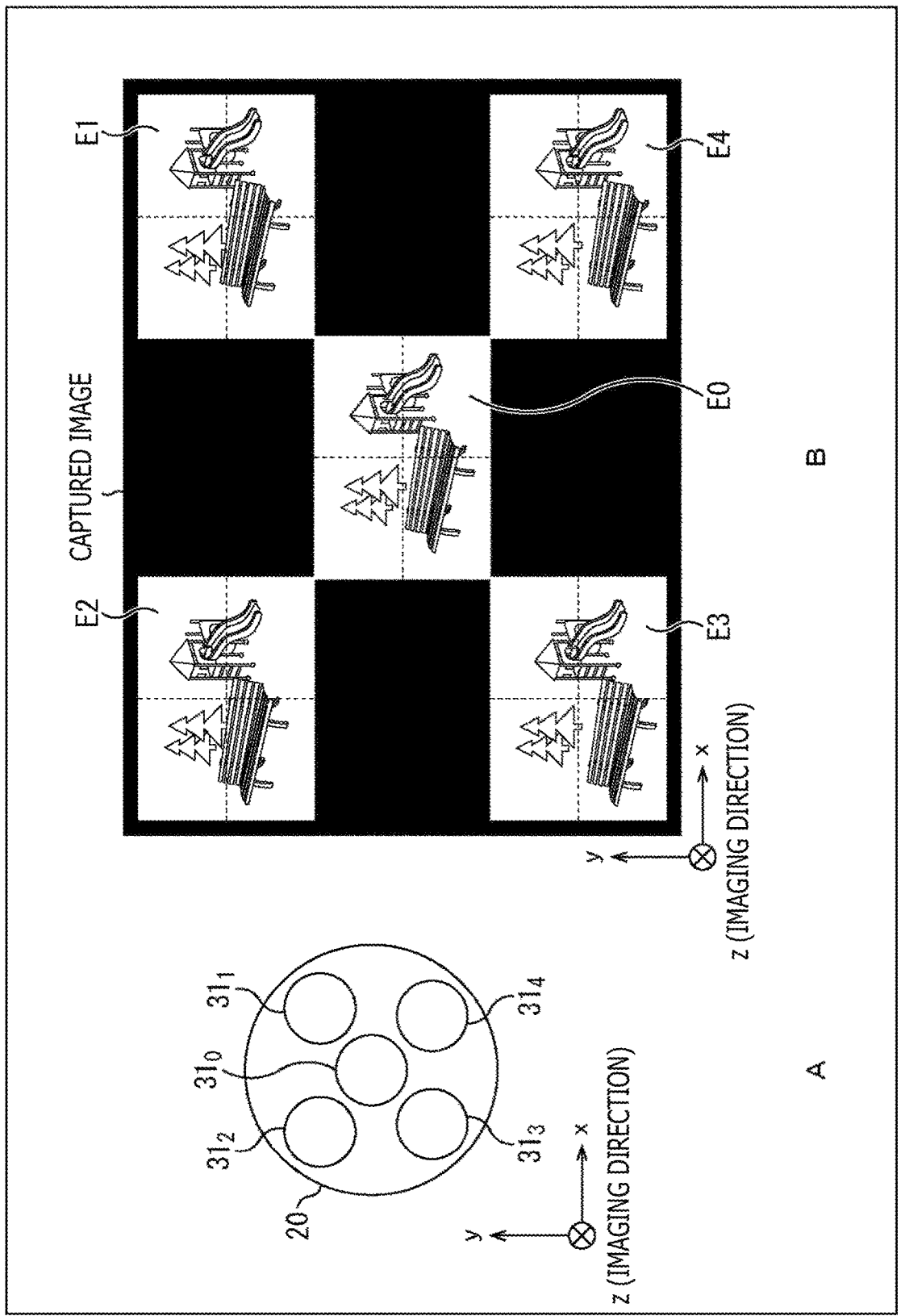
FIG. 14 is a view depicting an example of arrangement of monocular lenses $31_0$ to $31_4$ in the multi-lens interchangeable lens 20 and a captured image captured using the multi-lens interchangeable lens 20.

FIG. 14 is a view depicting an example of arrangement of the monocular lenses $31_0$ to $31_4$ in the multi-lens interchangeable lens 20 of FIG. 11 and a captured image captured using the multi-lens interchangeable lens 20.

In FIG. 14, "A" is a rear elevational view depicting an example of arrangement of the monocular lenses $31_0$ to $31_4$ in the multi-lens interchangeable lens 20.

The arrangement of the monocular lenses $31_0$ to $31_4$ in "A" of FIG. 14 is similar to that in the case of "A" of FIG. 5, and therefore, description of the same is omitted.

In FIG. 14, "B" is a view depicting an example of a captured image captured by the image sensor 51 of the camera main body 10 on which the multi-lens interchangeable lens 20 in which the monocular lenses $31_0$ to $31_4$ are arranged as depicted in "A" of FIG. 14 is mounted.

The captured image of "B" of FIG. 14 is similar to that in the case of "B" of FIG. 5 except that it does not include the spotlight figures PL and PR, and therefore, description of the same is omitted.

The reference position calculation section 71 of FIG. 12 uses optical axis center positions (dx1, dy1) to (dx4, dy4), as the known reference positions, and the reference angles to determine optical axis center positions (dx # i', dy # i') as unknown reference positions of the monocular images E # i on the unknown captured image as the unknown reference positions, by a second calculation method.

If an optical axis center position (dx # i', dy # i') is determined successfully, then a region of a monocular image E # i on the unknown captured image can be specified using the optical axis center position (dx # i', dy # i'). Further, a baseline angle upon capturing of the unknown captured image is determined, and the baseline angle can be used to determine accurate parallax information that is not influenced by the attachment error in the rotational direction of the multi-lens interchangeable lens 20.

<Second Calculation Method for Determining Optical Axis Central Position (Dx # i', Dy # i') of Monocular Image E # i on Captured Image as Unknown Reference Position>

Figure 15:
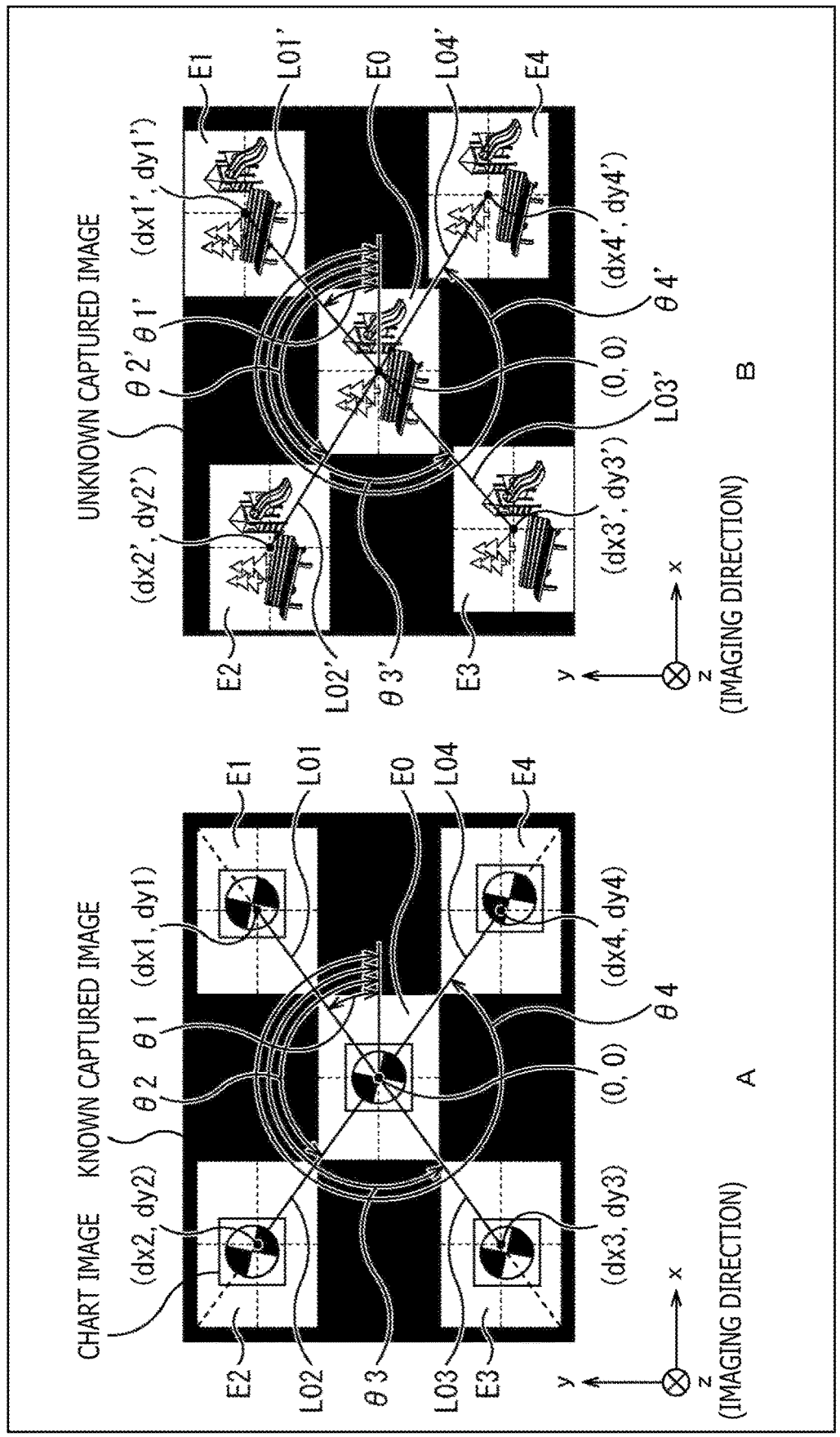
FIG. 15 is a view illustrating a second calculation method of determining (relative) optical axis center positions (dx1', dy1') to (dx4', dy4') as unknown reference positions.

FIG. 15 is a view illustrating a second calculation method for determining (relative) optical axis center positions (dx1', dy1') to (dx4', dy4') as unknown reference positions.

In FIG. 15, "A" depicts an example of a known captured image when a chart image as a predetermined imaging target is captured in the camera system in which the multi-lens interchangeable lens 20 of FIG. 11 is attached to the camera main body 10.

In the case where the second calculation method is adopted as the method for determining an optical axis center position (dx # i', dy # i') as an unknown reference position, a known captured image is used to determine an optical axis center position (dx # i, dy # i) as a known reference position, similarly as in the case where the first calculation method is adopted.

The known captured image of "A" of FIG. 15 is an image same as the known captured image of "A" of FIG. 7 except that it does not have the spotlight figures PL and PR. Accordingly, the known captured image of "A" of FIG. 15 is an image captured with a chart image arranged at a position of a known distance on the optical axis of the monocular lens $31_0$ such that the center of a circle as a chart of the chart image appears at the optical axis center position (x0, y0)=(0, 0) on the middle image E0.

In the known captured image of "A" of FIG. 15, the chart image in which the center of the circle as a chart is positioned at the optical axis center position (x0, y0)=(0, 0) appears in the middle image E0 on the known captured image, similarly as in the case of FIG. 7. Further, in the peripheral images E # i, the chart image appears, similarly as in the middle image E0. However, in the peripheral images E # i, the position of the circle as a chart is displaced from the position of the circle as a chart appearing in the middle image E0 according to the parallax from the middle image E0.

Accordingly, while, in the middle image E0 on the known captured image, the center of the circle as a chart is positioned at the optical axis center position (x0, y0)=(0, 0), in each peripheral image E # i, the center of the circle as a chart is displaced from the optical axis center position (x # i, y # i)=(dx # i, dy # i) according to the parallel from the middle image E0.

Since the chart image is placed at a known distance, the parallax between the peripheral image E # i and the middle image E0 can be determined from the known distance and a baseline length and a baseline angle between the monocular lens $31_i$ and the monocular lens $31_0$ when the known captured image is captured.

It is to be noted that, as described hereinabove with reference to FIG. 7, the baseline angle upon imaging of the known captured image can be measured upon capturing of the known captured image. Otherwise, upon capturing of the known captured image, the attachment of the multi-lens interchangeable lens 20 can be adjusted such that the baseline angle has a predetermined value such as a design value.

Here, it is assumed that, as the baseline angle representative of a direction of the baseline L0 # i interconnecting the optical axis center position (x0, y0)=(0, 0) of the middle image E0 and the optical axis center position (x # i, y # i)=(dx # i, dy # i) of each peripheral image E # i on the known captured image, an angle θ # i defined by the baseline L0 # i and the x axis as depicted in "A" of FIG. 15 is adopted. The baseline angle θ # i of the baseline L0 # i of the known captured image is the reference angle θ # i.

Since the optical axis center position (x # i, y # i)=(dx # i, dy # i) of the peripheral image E # i is a position displaced from the center of the circle as a chart appearing in the peripheral image E # i according to the parallax from the middle image E0, the optical axis center position (x # i, y # i)=(dx # i, dy # i) of the peripheral image E # i can be determined from the parallax between the position of the center of the circle as a chart appearing in the peripheral image E # i and the middle image E0.

It is to be noted that, since the center of the circle as a chart of a chart image appears at the optical axis center position (x0, y0) (=0, 0)) of the middle image E0 on the known captured image, the optical axis center position (x0, y0) of the middle image E0 can be determined by detecting the position of the center of the circle as a chart from the middle image E0. However, in the present embodiment, the optical axis center position (x0, y0) of the middle image E0 is the origin.

After the optical axis center position (x0, y0)=(0, 0) of the middle image E0 and the optical axis center positions (x # i, y # i) of the peripheral images E # i on the known captured image as the known reference positions are determined from the known captured image in such a manner as described above, the known reference positions (dx # i, dy # i)=(x # i, y # i)−(x0, y0)=(x # i, y # i)−(0, 0)=(x # i, y # i) of the peripheral images E # i with reference to the known reference position (x0, y0)=(0, 0) of the middle image E0 are determined and are stored as lens information into the storage section 41 of FIG. 12.

In the case where the second calculation method is adopted, in addition to the known reference positions (dx # i, dy # i), the reference angles θ # i are further stored as lens information into the storage section 41 of FIG. 12.

Then, in the second calculation method, each optical axis center position (dx # i', dy # i') as an unknown reference position on the unknown captured image is determined on the basis of the known reference position (dx # i, dy # i) and the reference angle θ # i.

In FIG. 15, "B" depicts an example of an unknown captured image captured by the camera system in which the multi-lens interchangeable lens 20 is attached to the camera main body 10.

As described hereinabove, upon capturing of an unknown captured image, an attachment error in the rotational direction different from that upon capturing of a known captured image possibly occurs.

Here, the (relative) optical axis center positions (dx # i', dy # i') (i=1, 2, 3, 4) of the peripheral images E # i with reference to the optical axis center position (x0', y0') of the middle image E0 on the unknown captured image are equal to the optical axis center positions (x # i', y # i') of the peripheral images E # i on the xy coordinate system on which the origin (0, 0) is given by the optical axis center position (x0', y0') of the middle image E0 on the unknown captured image.

It is assumed that a baseline angle representative of a direction of a baseline L0 # i' interconnecting the optical axis center position (x0', y0')=(0, 0) of the middle image E0 and the optical central position (x # i', y # i')=(sz # i', dy # i') of a peripheral image E # i on the unknown captured image upon capturing of an unknown captured image is represented as θ # i' as depicted in B of FIG. 15.

The baseline angle θ # i' upon capturing of an unknown captured image is displaced from the reference angle θ # i upon capturing of the known captured image by an attachment error in the rotational direction of the multi-lens interchangeable lens 20. Such a displacement of the baseline angle just described is represented by θ # i'−θ # i.

The optical axis center position (dx # i', dy # i') as the unknown reference position of a peripheral image E # i on an unknown captured image in which the baseline angle becomes θ # i' by an attachment error in the rotational direction of the multi-lens interchangeable lens 20 moves to a position where the optical center position (dx # i, dy # i) as the known reference position is rotated by the displacement θ # i'−θ # i of the baseline angle. Accordingly, the optical axis center position (dx # i', dy # i') as the unknown reference position of the peripheral image E # i on the unknown captured image can be determined in accordance with an expression (5) where the optical axis center position (dx # i, dy # i) as the known reference position is rotated by the displacement θ # i'−θ # i of the baseline angle.

[Math. 5]

$$\begin{pmatrix} dx1' \\ dy1' \end{pmatrix} = \begin{pmatrix} \cos(\theta1' - \theta1) & -\sin(\theta1' - \theta1) \\ \sin(\theta1' - \theta1) & \cos(\theta1' - \theta1) \end{pmatrix} \begin{pmatrix} dx1 \\ dy1 \end{pmatrix}$$

$$\begin{pmatrix} dx2' \\ dy2' \end{pmatrix} = \begin{pmatrix} \cos(\theta2' - \theta2) & -\sin(\theta2' - \theta2) \\ \sin(\theta2' - \theta2) & \cos(\theta2' - \theta2) \end{pmatrix} \begin{pmatrix} dx2 \\ dy2 \end{pmatrix}$$

$$\begin{pmatrix} dx3' \\ dy3' \end{pmatrix} = \begin{pmatrix} \cos(\theta3' - \theta3) & -\sin(\theta3' - \theta3) \\ \sin(\theta3' - \theta3) & \cos(\theta3' - \theta3) \end{pmatrix} \begin{pmatrix} dx3 \\ dy3 \end{pmatrix}$$

$$\begin{pmatrix} dx4' \\ dy4' \end{pmatrix} = \begin{pmatrix} \cos(\theta4' - \theta4) & -\sin(\theta4' - \theta4) \\ \sin(\theta4' - \theta4) & \cos(\theta4' - \theta4) \end{pmatrix} \begin{pmatrix} dx4 \\ dy4 \end{pmatrix}$$

(5)

In the case where the optical axis center positions (dxi', dy1') to (dx4', dy4') of the monocular images E1 to E4 on the captured image as the unknown reference positions are to be determined by the second calculation method, i.e., in accordance with the expression (5), the displacement θ # i'−θ # i of the baseline angle is required, and in order to determine the displacement θ # i'−θ # i of the baseline angle, the baseline angles θ # i' of the peripheral images E # i on the unknown captured image are required.

The baseline angles θ # i' of the peripheral image E # i on the unknown captured image can be determined, for example, from feature points that have the same feature and are individually extracted from the monocular images E # i (i=0, 1, 2, 3, 4) on the unknown captured image.

Figure 16:
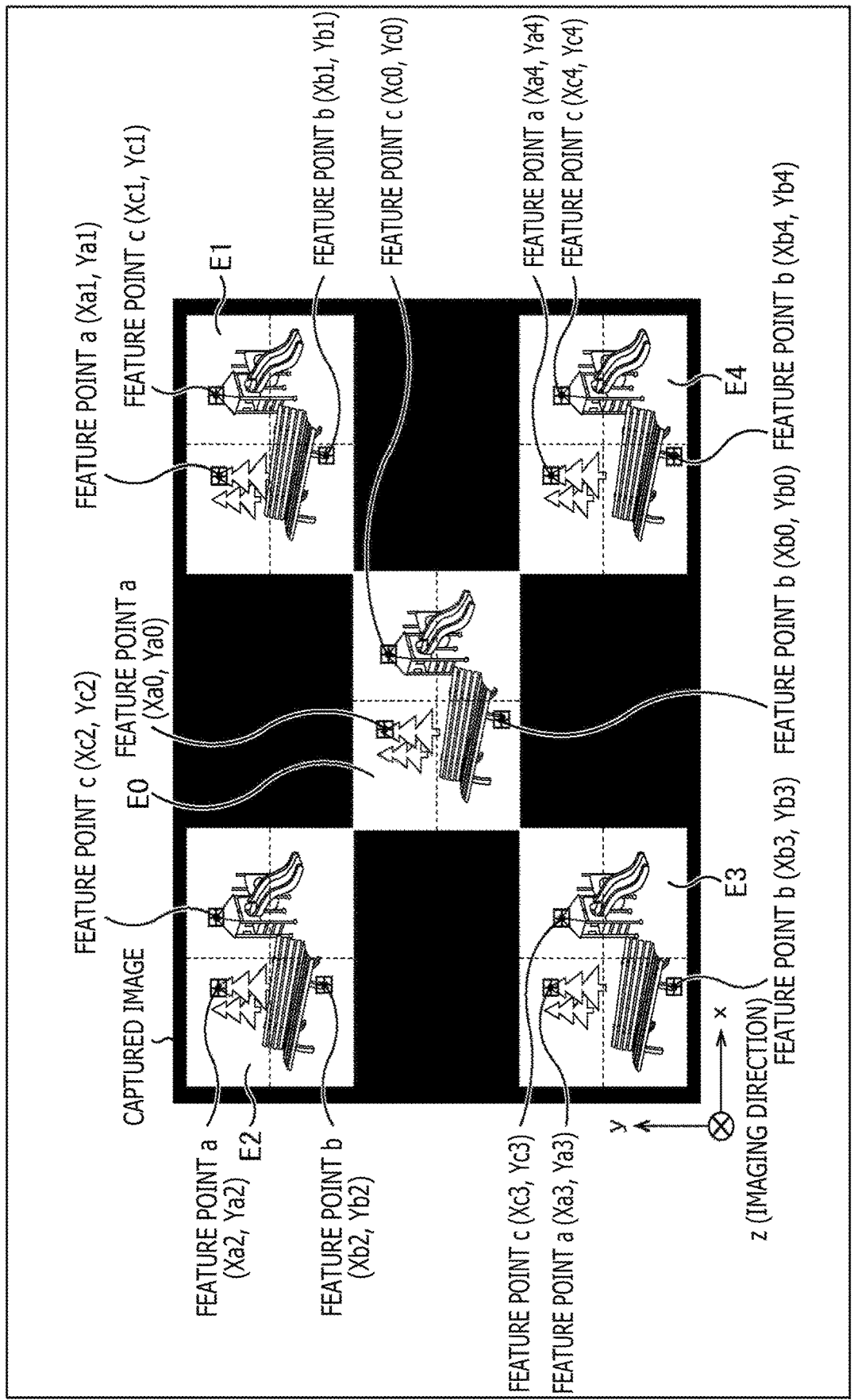
FIG. 16 is a view illustrating an example of extraction of a feature point from a monocular image E # i on an unknown captured image.

FIG. 16 is a view illustrating an example of extraction of a feature point from a monocular image E # i on an unknown captured image.

In extraction of a feature point, for example, from the monocular image E0 as a middle image that is one of the monocular images E0 to E4 on the unknown captured image, one or more candidate points that become candidates for a feature point are extracted, for example, by Harris corner detection or the like. Further, targeting the peripheral images E1 to E4 that are the remaining monocular images, points having a high correlation with the candidate points on the middle image E0 are detected by block matching or the like, and a candidate point or points with regard to which a point having a high correlation is detected from all of the peripheral images E1 to E4 are determined as the feature point or points of the middle image E0, and the points of the peripheral images E1 to E4 having a high correlation with the feature point are determined as featured points.

One or more points are extracted as feature points from the monocular images E # i on the unknown captured image in such a manner as described above.

In FIG. 16, three feature points "a," "b," and "c" are extracted from each monocular image E # i.

Here, the coordinate of the feature point "a" on the monocular image E # i is represented as (Xa # i, Ya # i). Similarly, the coordinate of the feature point "b" on the monocular image E # i is represented as (Xb # i, Yb # i), and the coordinate of the feature point "c" on the monocular image E # i is represented as (Xc # i, Yc # i).

The baseline angle θ # i' of the peripheral image E # i on the unknown captured image can be determined, for example, as an average value of angles representative of directions of lines interconnecting a feature point of the middle image E0 that is one of the monocular images and feature points of the peripheral images E # i that are the other monocular images, in accordance with expression (6).

[Math. 6]

$$\theta 1' = \left(\operatorname{atan}\frac{Ya1 - Ya0}{Xa1 - Xa0} + \operatorname{atan}\frac{Yb1 - Yb0}{Xb1 - Xb0} + \operatorname{atan}\frac{Yc1 - Yc0}{Xc1 - Xc0}\right)\bigg/3 \quad (6)$$

(provided, $Xa1 > Xa0$, $Ya1 > Ya0$,
$Xb1 > Xb0$, $Yb1 > Yb0$, $Xc1 > Xc0$, $Yc1 > Yc0$)

$$\theta 2' = \left(\operatorname{atan}\frac{Ya2 - Ya0}{Xa2 - Xa0} + \operatorname{atan}\frac{Yb2 - Yb0}{Xb2 - Xb0} + \operatorname{atan}\frac{Yc2 - Yc0}{Xc2 - Xc0}\right)\bigg/3 + \pi$$

(provided, $Xa2 < Xa0$, $Ya2 > Ya0$,
$Xb2 < Xb0$, $Yb2 > Yb0$, $Xc2 < Xc0$, $Yc2 > Yc0$)

$$\theta 3' = \left(\operatorname{atan}\frac{Ya3 - Ya0}{Xa3 - Xa0} + \operatorname{atan}\frac{Yb3 - Yb0}{Xb3 - Xb0} + \operatorname{atan}\frac{Yc3 - Yc0}{Xc3 - Xc0}\right)\bigg/3 + \pi$$

(provided, $Xa3 < Xa0$, $Ya3 < Ya0$,
$Xb3 < Xb0$, $Yb3 < Yb0$, $Xc3 < Xc0$, $Yc3 < Yc0$)

$$\theta 4' = \left(\operatorname{atan}\frac{Ya4 - Ya0}{Xa4 - Xa0} + \operatorname{atan}\frac{Yb4 - Yb0}{Xb4 - Xb0} + \operatorname{atan}\frac{Yc4 - Yc0}{Xc4 - Xc0}\right)\bigg/3 + 2\pi$$

(provided, $Xa4 > Xa0$, $Ya4 < Ya0$,
$Xb4 > Xb0$, $Yb4 < Yb0$, $Xc4 > Xc0$, $Yc4 < Yc0$)

The expression (6) indicates an average value of three angles representative of directions of lines interconnecting a feature point of the middle image E0 and feature points of the peripheral images E # i obtained in regard to the three feature points "a," "b," and "c." The baseline angle θ # i' of the expression (6) can have enhanced accuracy as the number of angles to be averaged increases, that is, as the number of feature points to be extracted from each monocular image E # i increases.

The displacement θ # i'−θ # i of the baseline angle determined using the baseline angle θ # i' obtained by the expression (6) can be a rotational angle between an angle representative of a direction of a line interconnecting a feature point of the middle image E0 that is one of the monocular images and a feature point of each of the peripheral images E # i that are the other monocular images, and the reference angle θ # i.

In the second calculation method, by determining the baseline angle θ # i' in accordance with the expression (6) and rotating the optical central position (dx # i, dy # i) as the known reference position by the displacement θ # i'−θ # i of the baseline angle determined using the baseline angle θ # i' in accordance with the expression (5), the optical axis center position (dx # i', dy # i') as the unknown reference position of the peripheral image E # i on the unknown captured image is determined.

Figure 17:
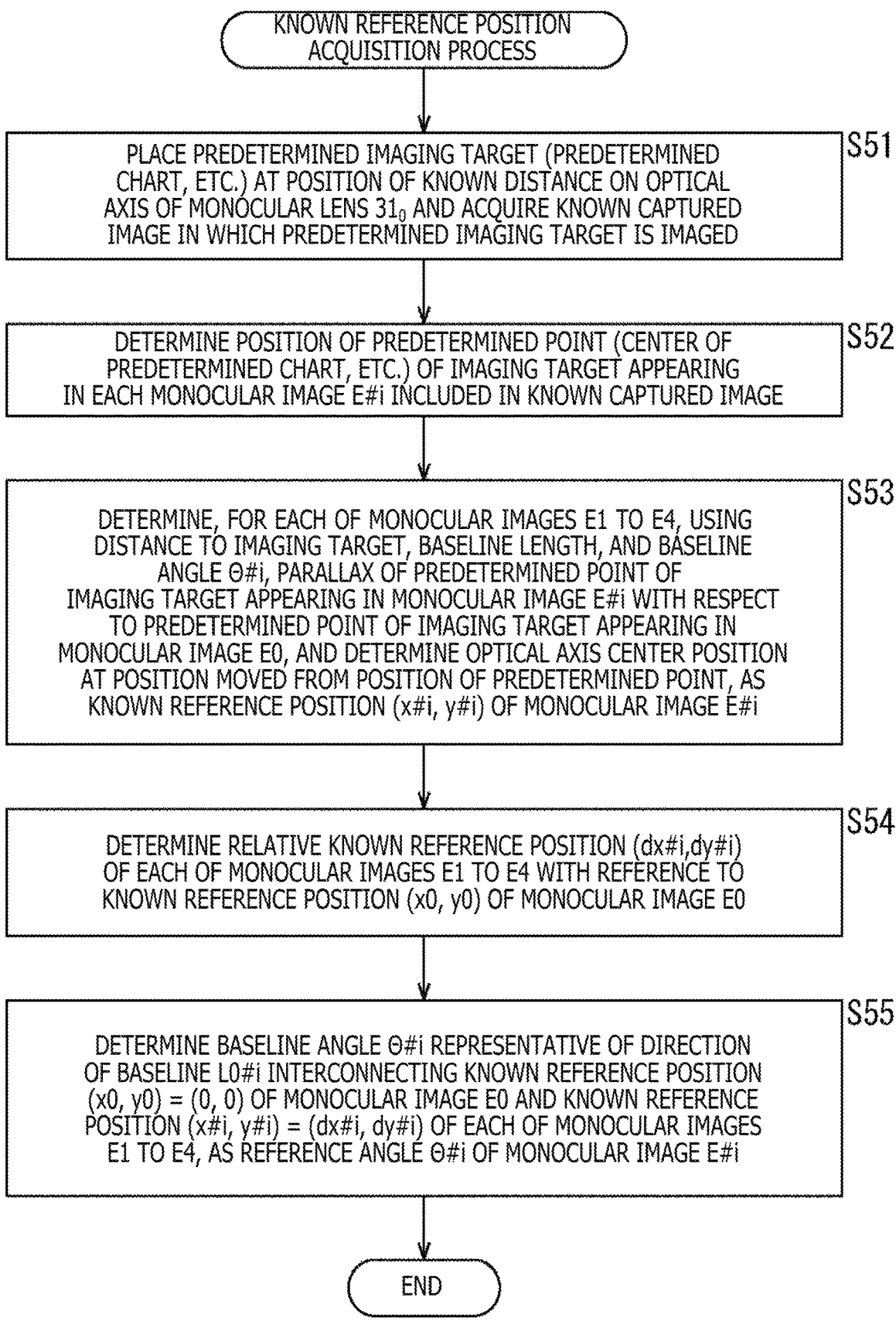
FIG. 17 is a flow chart illustrating an example of a known reference position acquisition process in the case where unknown reference positions (dx1', dy1') to (dx4', dy4') are determined by the second calculation method.

FIG. 17 is a flow chart illustrating an example of a known reference position acquisition process in the case where the optical axis center positions (dxi', dy1') to (dx4', dy4') of the monocular images E1 to E4 on the unknown captured image as the unknown reference positions are determined by the second calculation method are acquired.

In the known reference position acquisition process of FIG. 17, the optical axis center positions (dx # i, dy # i) as the known reference positions that are required in the case where the optical axis center positions (dx # i', dy # i') as the unknown reference positions are to be determined by the second calculation method.

The known reference position acquisition process of FIG. 17 can be performed by the camera main body 10, a computer, or the like as an acquisition processing apparatus, similarly as in the case of FIG. 8.

In the known reference position acquisition process of FIG. 17, the acquisition processing apparatus performs, in steps S51 to 54, processes similar to those in steps S11 to S14 of FIG. 8, respectively. Consequently, the acquisition processing apparatus determines, in step S54, a (relative) known reference position (dx # i, dy # i) of each monocular image E # i with reference to the known reference position (x0, y0) of the monocular image E0. Then, the processing advances to step S55.

In step S55, the acquisition processing apparatus determines a baseline angle θ # i=tan⁻¹(dy # i/dx # i) representative of a direction of a baseline L0 # i interconnecting the known reference position (x0, y0)=(0, 0) of the monocular image E0 that is a middle image and the known reference position (x # i, y # i)=(dx # i, dy # i) of each of the other monocular images E # i (i=1, 2, 3, 4) that are peripheral images on the known captured image, as a reference angle θ # i of the monocular image E # i. Then, the known reference position acquisition process ends therewith.

The known reference positions (dx # i, dy # i) determined in step S54 and the reference angles θ # i determined in step S55 are stored as part of lens information into the storage section 41 of FIG. 12.

Figure 18:
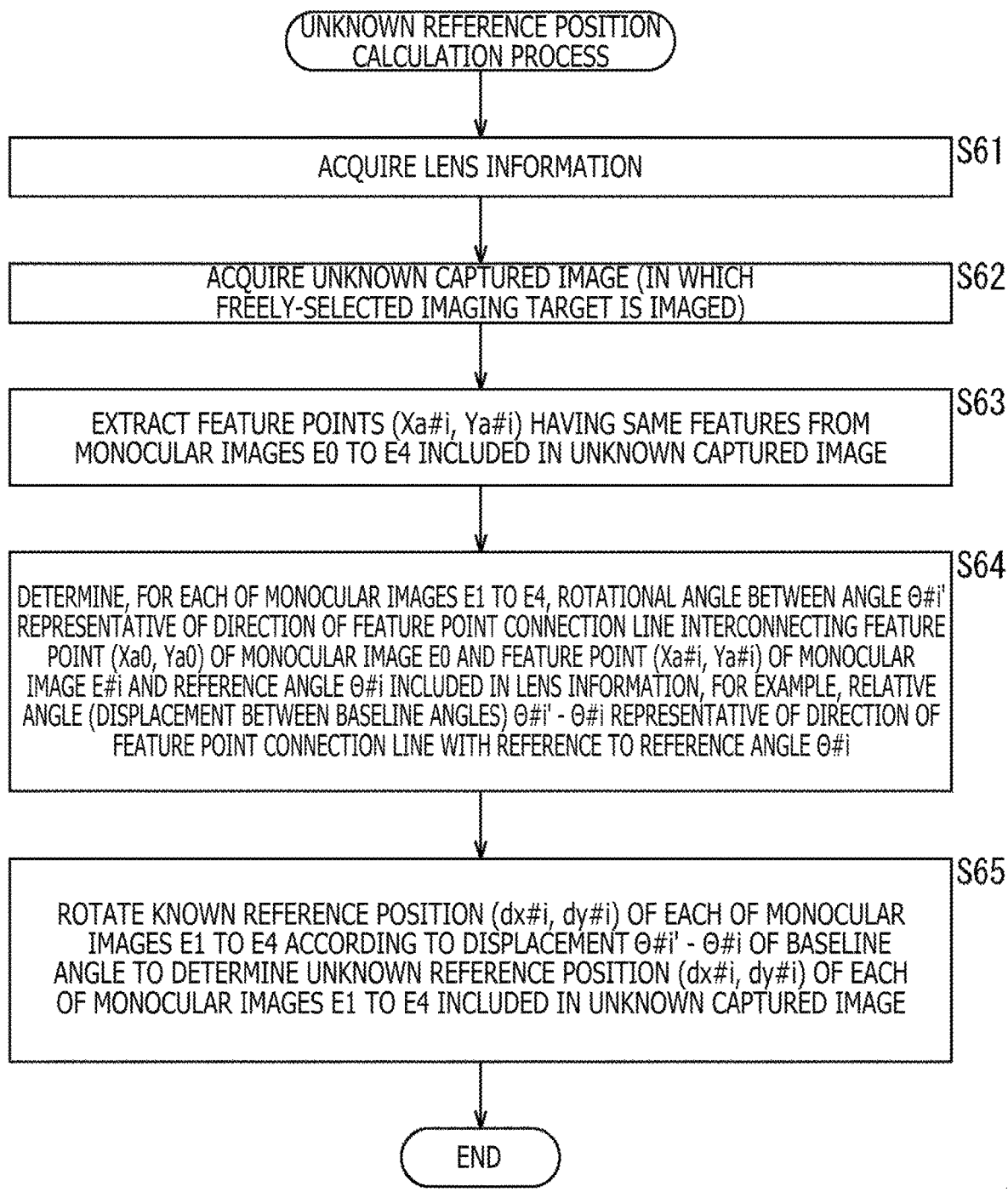
FIG. 18 is a flow chart illustrating an example of an unknown reference position acquisition process in the case where unknown reference positions (dx1', dy1') to (dx4', dy4') are determined by the second calculation method.

FIG. 18 is a flow chart illustrating an example of an unknown reference position calculation process for determining relative optical axis center positions (dx1', dy1') to (dx4', dy4') of the monocular images E1 to E4 on an unknown captured image as unknown reference positions by the second calculation method.

In steps S61 and S62, the reference position calculation section 71 (FIG. 12) performs processes similar to those in steps S21 and S22 of FIG. 9, respectively. Then, the processing advances to step S63. By the processes in step S61 and S62, the reference position calculation section 71 acquires the lens information of the multi-lens interchangeable lens 20 and an unknown captured image captured by the image sensor 51.

In step S63, the reference position calculation section 71 extracts feature points (Xa # i, Ya # i) having the same feature amounts from the monocular images E0 to E4 included in the unknown captured image (from regions estimated as the monocular images E0 to E4 (for example, from rectangular regions of a predetermined size centered at the origin and rectangular regions of a predetermined size centered at the optical axis center positions (dx # i, dy # i) as the known reference positions included in the lens information). Then, the processing advances to step S64.

It is to be noted that, as described with reference to the expression (6), although the accuracy of the baseline angle θ # i' of the expression (6) can be enhanced as the number of feature points to be extracted from each monocular image E # i increases, in order to simplify the description here, it is assumed that one feature point is extracted from each monocular image E # i included in the unknown captured image.

At step S64, the reference position calculation section 71 determines, for each of the monocular images E1 to E4 that are peripheral images on the unknown captured image, an angle representative of a direction of a feature point connection line that is a line interconnecting the feature point (Xa0, Ya0) of the monocular image E0 that is a middle image and a feature point (Xa # i, Ya # i) of the monocular image E # i that is a peripheral image, as a baseline angle θ # i of the monocular image E # i.

Further, the reference position calculation section 71 determines, for each of the monocular images E1 to E4 that are peripheral images on the unknown captured image, a rotational angle between the baseline angle θ # i' and the reference angle θ # i included in the lens information, in particular, for example, a relative angle θ # i'−θ # i representative of a direction of a feature point connection line with reference to the reference angle θ # i, as a displacement θ # i'−θ # i of the baseline angle arising from an attachment error in the rotational direction of the multi-lens interchangeable lens 20. Then, the processing advances from step S64 to step S65.

In step S65, the reference position calculation section 71 rotates the (relative) optical axis center position (dx # i, dy # i) as the known reference position included in the lens information according to the displacement θ # i'−θ # i of the baseline angle determined in step S64 in accordance with the expression (5) to determine a (relative) optical axis center position (dx # i', dy # i') as the unknown reference position on the unknown captured image in which the displacement θ # i'−θ # i of the baseline angle occurs. The unknown reference position calculation process ends therewith.

As described above, in the case where lens information includes optical axis center positions (dx # i, dy # i) as the known reference positions and reference angles θ # i, even if the multi-lens interchangeable lens 20 does not include the light sources 32L and 32R (FIG. 1), in regard to each monocular image E # i on the unknown captured image, an optical axis center position (dx # i, dy # i) as the unknown reference position on the monocular image E # i can be determined on the basis of the known reference positions (dx # i, dy # i) and the reference angles θ # i included in the lens information.

Accordingly, an image of a plurality of visual points, that is, monocular images E # i having visual points at the positions of the monocular lenses $31_i$, can be obtained easily from the unknown captured image on the basis of the optical axis center position (dx # i', dy # i') as the unknown reference position.

Further, from the optical axis center position (dx # i', dy # i') as the unknown reference position, a baseline angle $(\tan^{-1}(dy \# i'/dx \# i'))$ representative of a direction of the baseline L0 # i can be determined, and accurate parallax information that is not influenced by an attachment error in a rotational direction of the multi-lens interchangeable lens 20 can be determined using the baseline angle.

It is to be noted that, in the case where the multi-lens interchangeable lens 20 is attached to a camera main body different from the camera main body 10 to which the multi-lens interchangeable lens 20 is attached when the known reference position (dx # i, dy # i) is calculated, it possibly occurs that, due to a dispersion of the individual camera main body, the attachment position of the image sensor to the different camera main body is displaced from the attachment position of the image sensor 51 to the camera main body 10.

However, such displacement of the attachment position of the image sensor to the different camera main body as just described can be grasped as an attachment error of the multi-lens interchangeable lens 20 if the image sensor that is in a state in which the attachment position is displaced is used as a reference. Accordingly, even if the attachment position of the image sensor to the different camera main body to which the multi-lens interchangeable lens 20 is attached has some displacement, for example, in a rotational direction, the unknown reference position calculation process can calculate the optical axis center position (dx # i', dy # i') of the monocular image E # i on the unknown captured image as an unknown reference position similar to that in the case where the multi-lens interchangeable lens 20 is attached to the camera main body 10.

Further, the reference position calculation section 71 can determine a reference angle θ # i=$\tan^{-1}(dy \# i/dx \# i)$) from the known reference position (dx # i, dy # i). In the case where the reference angle θ # i is to be determined from the known reference position (dx # i, dy # i), the reference angle θ # i need not be included in the lens information.

<Example of Configuration of Image Processing Section 53>

Figure 19:
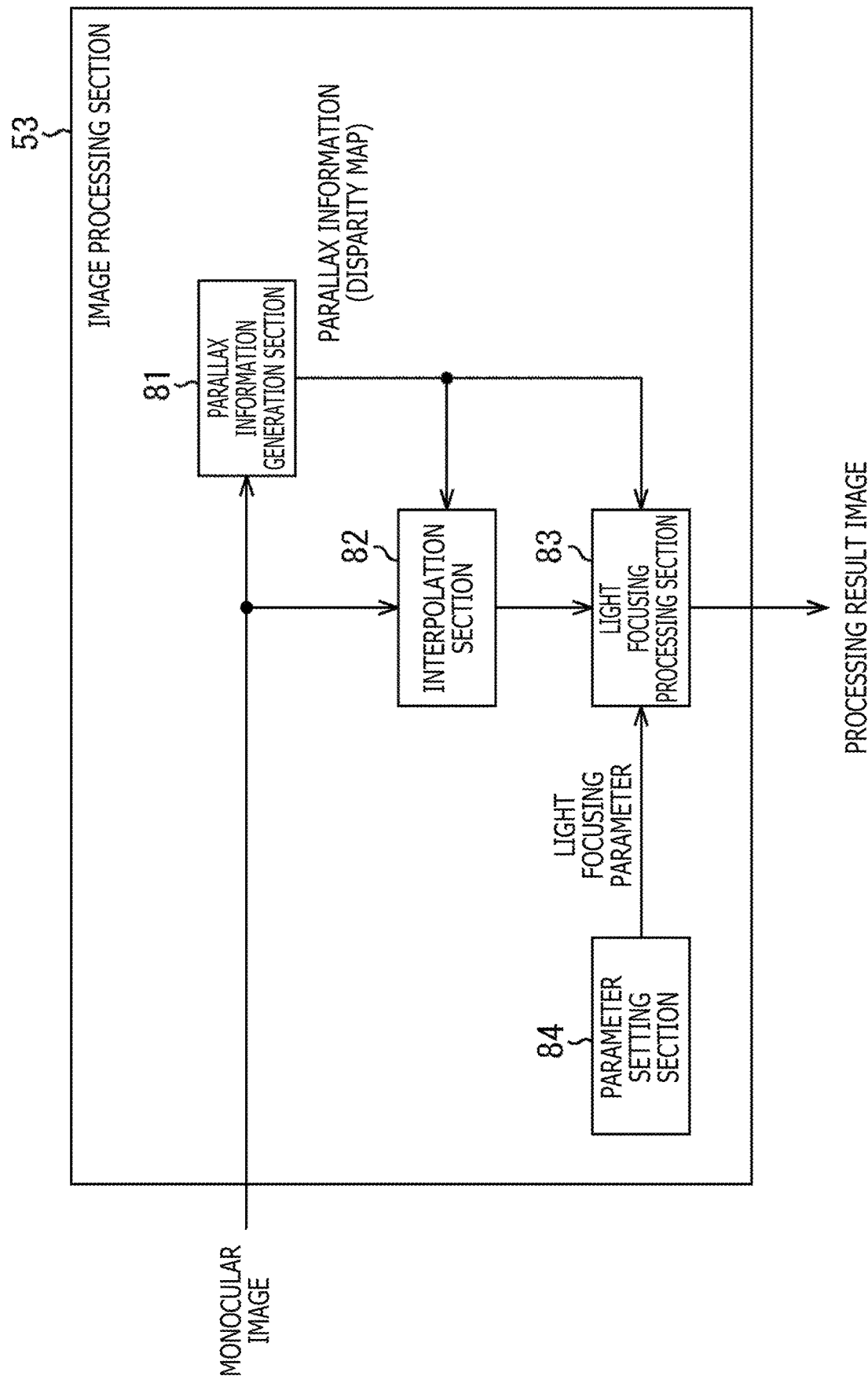
FIG. 19 is a block diagram depicting an example of a functional configuration of a portion of an image processing section 53, which performs refocusing.

FIG. 19 is a block diagram depicting an example of a functional configuration of a portion of the image processing section 53 of FIGS. 3 and 12 by which refocusing is performed.

Here, in the case where the multi-lens interchangeable lens 20 includes the monocular lenses $31_0$ to $31_4$ as depicted, for example, in FIG. 5, monocular images E0 to E4 corresponding to the monocular lenses $31_0$ to $31_4$ are supplied from the region specification section 52 to the image processing section 53. The monocular images E1 to E4 corresponding to the monocular lenses $31_0$ to $31_4$ supplied from the region specification section 52 to the image processing section 53 are images obtained by imaging performed from visual points at the positions of the monocular lenses $31_0$ to $31_4$ that are similar to the captured images obtained by imaging using cameras independent of each other from the positions of the monocular lenses $31_0$ to $31_4$, respectively. Therefore, the monocular images E1 to E4 are images of different visual points.

Referring to FIG. 19, the image processing section 53 includes a parallax information generation section 81, an interpolation section 82, a light focusing processing section 83, and a parameter setting section 84.

To the image processing section 53, monocular images E#i of a plurality of visual points, which are an image of a plurality of visual points, are successively supplied from the region specification section 52.

It is to be noted here that the visual point of each of the monocular images E#i is the position of the monocular lens $31_i$.

In the image processing section 53, the monocular images E#i are successively supplied to the parallax information generation section 81 and the interpolation section 82.

The parallax information generation section 81 determines parallax information using the monocular images E#i of a plurality of visual points supplied from the region specification section 52 and supplies the parallax information to the interpolation section 82 and the light focusing processing section 83.

In particular, the parallax information generation section 81 performs a process for determining parallax information, for example, between each of the monocular images E#i supplied from the region specification section 52 and each of the other monocular images E#j as image processing for the monocular images E#i of a plurality of visual points. Then, the parallax information generation section 81 generates, for example, for each of (the positions of) pixels of the monocular images, a map in which parallax information is registered, and supplies the maps to the interpolation section 82 and the light focusing processing section 83.

Here, for the parallax information, any information that can be converted into a parallax such as a disparity that represents a parallax in the number of pixels or a distance in the depthwise direction corresponding to a parallax can be adopted. In the present embodiment, for example, a disparity is adopted as the parallax information, and it is assumed that the parallax information generation section 81 generates a disparity map in which such disparities are registered, as a map in which parallax information is registered.

The interpolation section 82 uses a plurality of monocular images E#i from the region specification section 52 and disparity maps from the parallax information generation section 81 to generate, by interpolation, an image that is supposed to be obtained if imaging is performed from a visual point other than the visual points of the monocular images E#i, that is, other than the positions of the monocular lenses $31_i$.

The interpolation section 82 determines, as visual points for interpolation, plural points at substantially equal distances, for example, in a region in which the visual points of the monocular images E#i are distributed, i.e., a region in which the monocular lenses $31_i$ are distributed (for example, a region surrounded by connecting the positions of the monocular lenses $31_1$ to $31_4$ of FIG. 1 with straight lines). Then, the interpolation section 82 generates images of the visual points for interpolation (images that are supposed to be obtained in the case where imaging is performed from the points for interpolation) by interpolation.

It is to be noted that the interpolation section 82 can also use a point on the outer side of the region in which the monocular lenses $31_i$ are distributed as a visual point for interpolation, to generate an image of the visual point for interpolation.

After the interpolation section 82 generates images of visual points for interpolation, it supplies the monocular images E#i and the images of the visual points for interpolation to the light focusing processing section 83.

Here, an image generated by interpolation using a monocular image by the interpolation section 82 is also referred to as an interpolation image.

Further, the monocular images E#i and the interpolation images of the visual points for interpolation supplied from the interpolation section 82 to the light focusing processing section 83 are also collectively referred to as a visual point image.

Interpolation by the interpolation section 82 can be considered as a process of generating a visual point image of a greater number of visual points from monocular images E#i of a plurality of visual points. This process of generating a visual point image of a greater number of visual points can be recognized as a process of reproducing rays of light incident from an actual space point in the actual space.

The light focusing processing section 83 performs a light focusing process that is image processing equivalent to a process of using a visual point image of a plurality of visual points from the interpolation section 82 to focus rays of light from an imaging target having passed through an optical system such as a lens in a real camera on an image sensor or a film to form a figure of the imaging target.

In the light focusing process of the light focusing processing section 83, refocusing for generating (reconstructing) an image focusing on a freely-selected imaging target can be performed. The refocusing is performed using disparity maps from the focusing information generation section 81 and light focusing parameters from the parameter setting section 84.

The image obtained by the light focusing process of the light focusing processing section 83 is outputted as a processing result image (to the display section 54 or the storage section 55 (FIG. 3)).

The parameter setting section 84 sets a pixel of one monocular image E#i (for example, the monocular image E0) located at a position designated by an operation of an operation section not depicted by the user, a predetermined application, or the like, as a focusing target pixel for focusing (at which the imaging target appears). Then, the parameter setting section 84 supplies the pixel as a light focusing parameter to the light focusing processing section 83.

<Image Processing by Image Processing Section 53>

Figure 20:
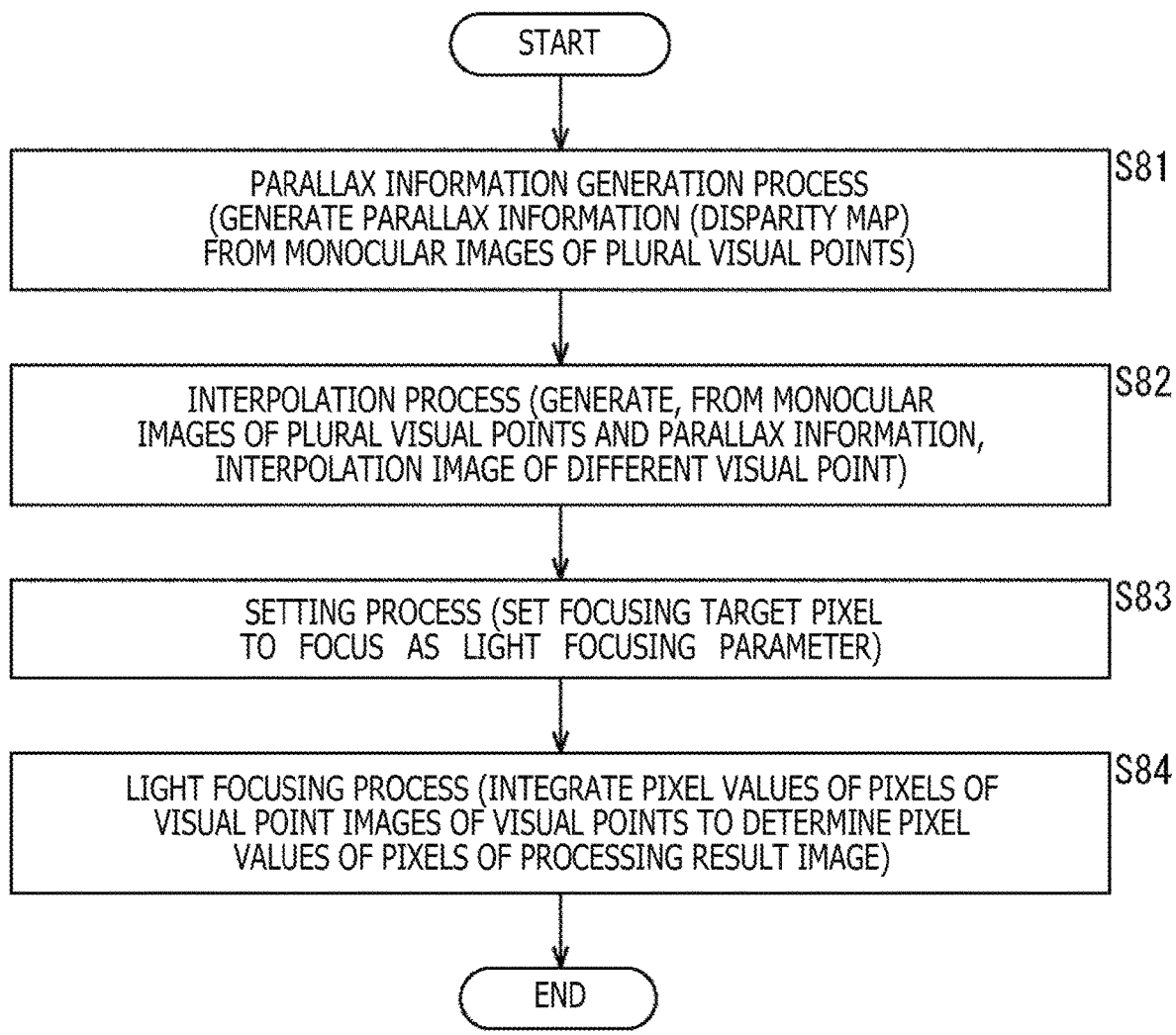
FIG. 20 is a flow chart illustrating an example of image processing performed by an image processing section 53.

FIG. 20 is a flow chart illustrating an example of image processing performed by the image processing section 53 of FIG. 19.

In the image processing section 53, monocular images E #i of a plurality of visual points that are an image of a plurality of visual points supplied from the region specification section 52 are supplied to the parallax information generation section 81 and the interpolation section 82.

In the image processing section 53, the parallax information generation section 81 performs in step S81 a parallax information generation process of using the monocular images E # i of a plurality of visual points from the region specification section 52 to determine parallax information and generating a disparity map in which the parallax information is registered.

The parallax information generation section 81 supplies the disparity map obtained by the parallax information generation process to the interpolation section 82 and the light focusing processing section 83. Then, the processing advances from step S81 to step S82.

In step S82, the interpolation section 82 performs an interpolation process of using the monocular images E # i of a plurality of visual points from the region specification section 52 and the disparity map from the parallax information generation section 81 to generate interpolation images of a plurality of visual points for interpolation other than the visual points of the monocular images E # i.

Further, the interpolation section 82 supplies the monocular images E # i of a plurality of visual points from the region specification section 52 and the interpolation images of a plurality of visual points for interpolation obtained by the interpolation process, as visual point images of a plurality of visual points, to the light focusing processing section 83. Then, the processing advances from step S82 to step S83.

In step S83, the parameter setting section 84 performs a setting process of setting a pixel of one visual point image (for example, the monocular image E0) located at a position designated by an operation of the user or the like, as a focusing target pixel for focusing.

The parameter setting section 84 supplies (information of) the focusing target pixel obtained by the setting process as a light focusing parameter to the light focusing processing section 83. Then, the processing advances from step S83 to step S84.

Here, the focusing target pixel can not only be set in accordance with designation of the user as described above but can also be set, for example, in accordance with designation from an application, designation by a rule determined in advance, or the like. For example, a pixel on which an imaging target having a movement at a speed equal to or higher than a predetermined speed or an imaging target that is moving continuously for a predetermined period of time or more appears can be set as a focusing target pixel.

In step S84, the light focusing processing section 83 performs a light focusing process equivalent to focusing rays of light from an imaging target on a virtual sensor not depicted using the visual point image of a plurality of visual points from the interpolation section 82, the disparity map from the parallax information generation section 81, and the focusing target pixel as a light focusing parameter from the parameter setting section 84. The image processing by the image processing section 53 ends therewith.

The light focusing processing section 83 supplies a processing result image obtained as a result of the light focusing process to the display section 54.

It is to be noted that, in the light focusing process, the entity of the virtual sensor by which rays of light are focused is, for example, a memory not depicted. In the light focusing process, pixel values of a visual point image of a plurality of visual points are integrated as luminance of rays of light focused by the virtual sensor into (the storage values of) the memory as the virtual sensor to determine pixel values of an image obtained by the light focusing of the rays of light.

In the light focusing process by the light focusing processing section 83, a reference shift amount BV, which is hereinafter described and is a pixel shift amount by which pixels of visual point images of a plurality of visual points are to be pixel-shifted, is set, and (the pixel values of) the pixels of the visual point images of a plurality of visual points are pixel-shifted and integrated according to the reference shift amount BV to determine pixel values of a processing result image focused at a focal point in an actual space and to generate a processing result image.

Here, the focal point is an actual space point in the actual space at which the focus is on, and in the light focusing process by the light focusing processing section 83, a focal plane that is a plane as a set of focal points is set using a focusing target pixel as a light focusing parameter from the parameter setting section 84.

It is to be noted that the image processing section 53 (FIG. 19) can include the light focusing processing section 83 alone.

For example, in the case where the light focusing process by the light focusing processing section 83 is to be performed using monocular images E # i captured by the region specification section 52 without using an interpolation image, the image processing section 53 can be configured without including the interpolation section 82. However, in the case where the light focusing process is performed using not only monocular images E # i but also an interpolation image, occurrence of ringing with an imaging target on which the focus is not on in the processing result image can be suppressed.

Further, in the case where, for example, parallax information of monocular images E # i is generated by an external apparatus using a distance sensor or the like and the parallax information can be acquired from the external apparatus, the image processing section 53 can be configured without including the parallax information generation section 81.

Furthermore, for example, in the case where the light focusing processing section 83 sets a focal plane in accordance with a rule determined in advance, the image processing section 53 can be configured without including the parameter setting section 84.

Further, the camera main body 10 can be configured without including the image processing section 53.

<Different Example of Configuration of Multi-Lens Interchangeable Lens>

Figure 21:
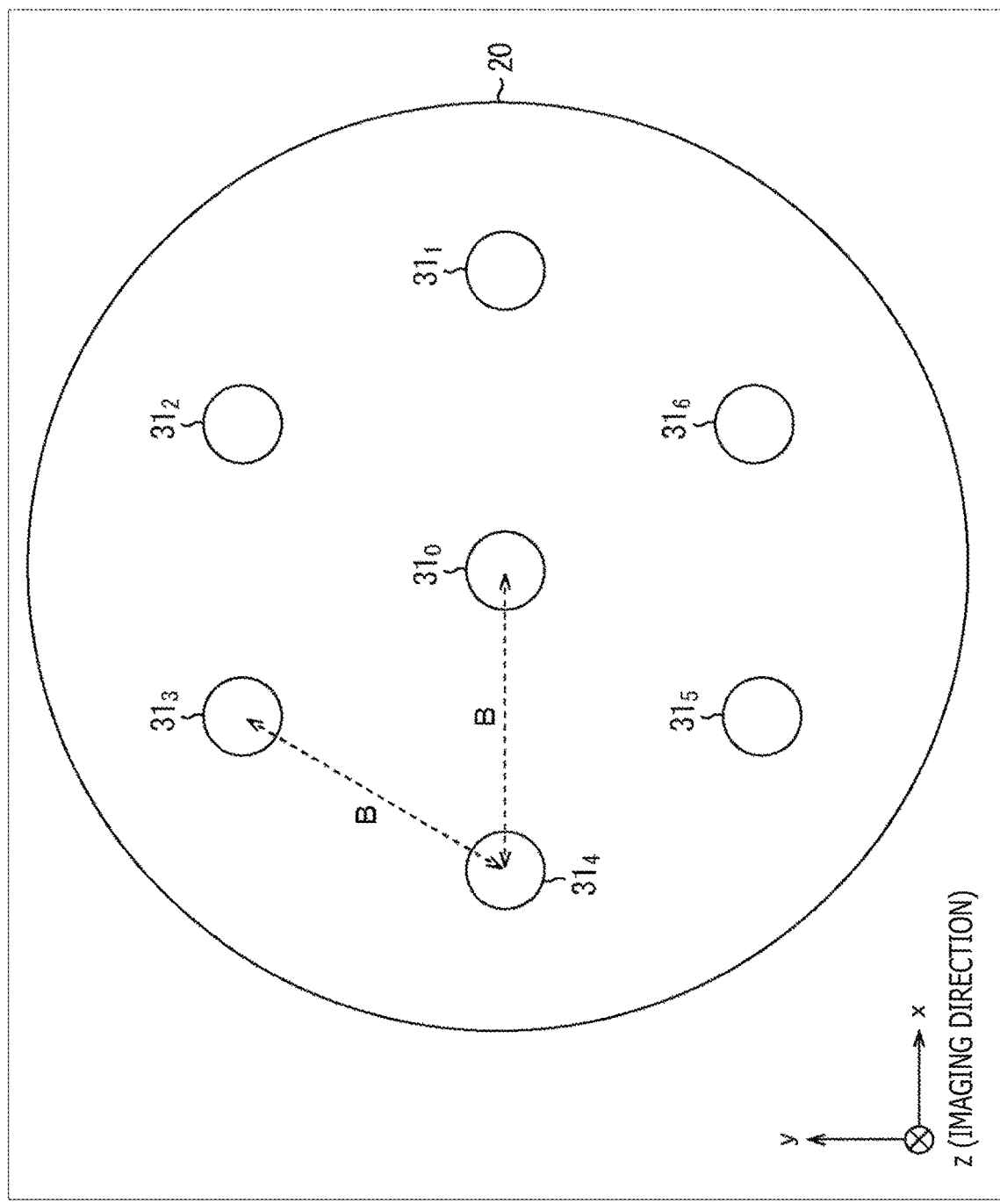
FIG. 21 is a rear elevational view depicting another example of a configuration of the multi-lens interchangeable lens 20.

FIG. 21 is a rear elevational view depicting a different example of a configuration of the multi-lens interchangeable lens 20.

In FIG. 21, the multi-lens interchangeable lens 20 includes seven monocular lenses $31_0$ to $31_6$, which are arranged on a two-dimensional plane such that they do not overlap with each other in an optical axis direction.

Further, in FIG. 21, the seven monocular lenses $31_0$ to $31_6$ are arranged such that, around the center given, for example, by the monocular lens $31_0$ that is one of them, the other six monocular lenses $31_1$ to $31_6$ configuring the vertices of a regular hexagon are arranged circumferentially.

Accordingly, in FIG. 21, the distance between (the optical axes of) one freely-selected monocular lens $31_i$ (i=0, 2, ..., 6) among the seven monocular lenses $31_0$ to $31_6$ and a different one monocular lens $31_j$ (j=0, 2, ..., 6) nearest to the monocular lens $31_i$ is an equal distance B.

In the following, description is given taking a case in which the multi-lens interchangeable lens 20 includes seven monocular lenses $31_0$ to $31_6$ as depicted in FIG. 21, as an example.

In the case where the multi-lens interchangeable lens 20 includes the seven monocular lenses $31_0$ to $31_6$ as depicted in FIG. 21, the monocular images E # i of a plurality of visual points supplied from the region specification section 52 (FIG. 3) to the parallax information generation section 81 and the interpolation section 82 of the image processing section 53 are monocular images E0 to E6 of seven visual points corresponding to the seven monocular lenses $31_0$ to $31_6$.

<Generation of Interpolation Image>

Figure 22:
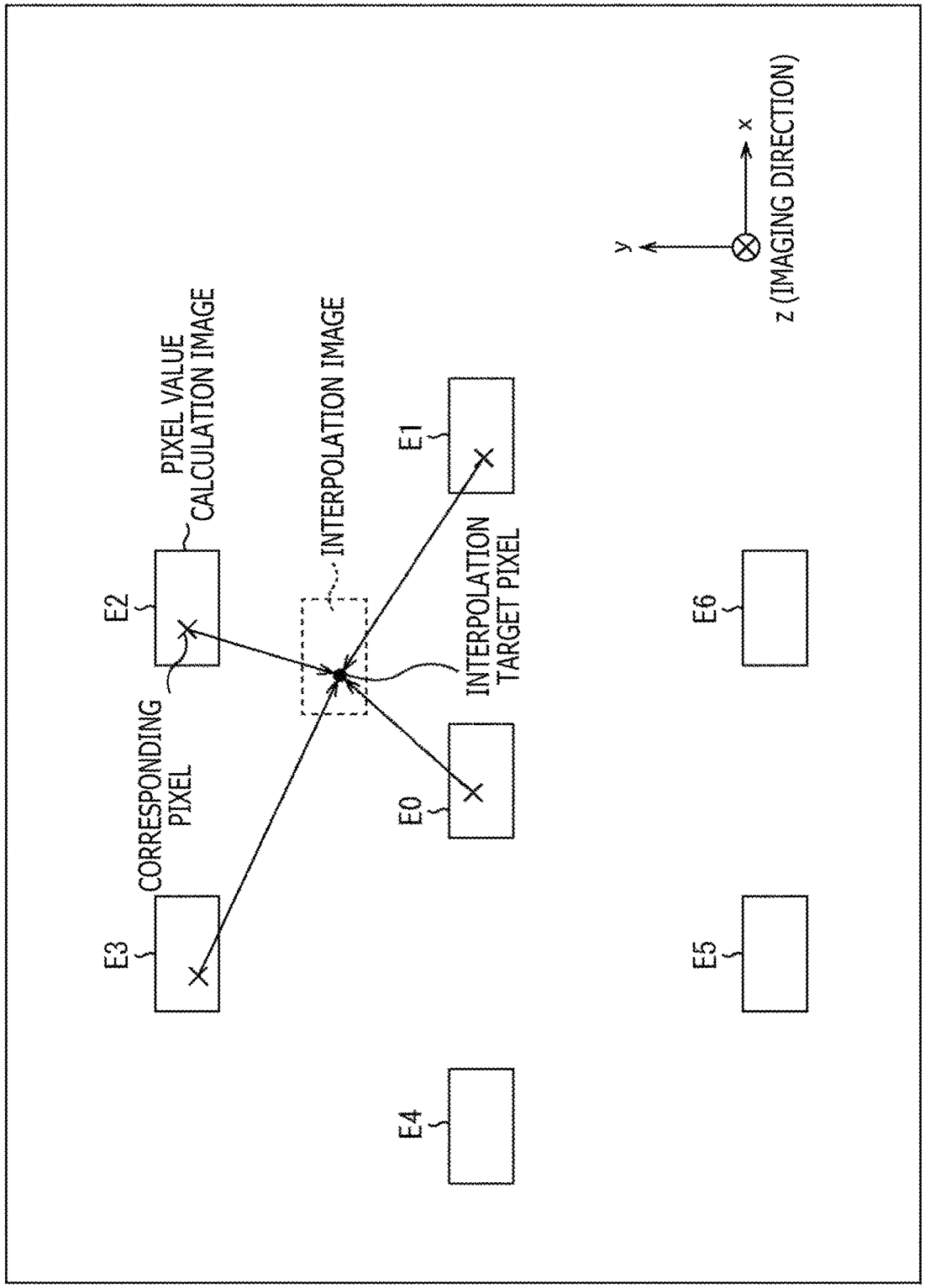
FIG. 22 is a view illustrating an example of generation of an interpolation image by an interpolation section 82.

FIG. 22 is a view illustrating an example of generation of an interpolation image by the interpolation section 82 of FIG. 19.

In the case where an interpolation image of a certain visual point is to be generated, the interpolation section 82 sequentially selects pixels of an interpolation image, as interpolation target pixels of a target of interpolation. Further, the interpolation section 82 selects the monocular images E # i of the visual points of all of the monocular images E0 to E6 of seven visual points or some (plural ones) of them near to the visual point of the interpolation image, as pixel value calculation images to be used for calculation of pixel values of the interpolation target pixels. The interpolation section 82 uses disparity maps from the parallax information generation section 81 and the visual points of the interpolation image to determine, from each of the monocular images E # i of a plurality of visual points selected as the pixel value calculation images, a corresponding pixel corresponding to the interpolation target pixel (a pixel at which a space point same as a space point that is supposed to appear on an interpolation target pixel if imaging is performed from the visual point of the interpolation image appears).

Then, the interpolation section 82 performs weighted addition of the pixel values of the corresponding pixels of the monocular images E # i of a plurality of visual points and determines weighted addition values obtained as a result of the weighted addition, as pixel values of the interpolation target pixels.

For the weight to be used for weighted addition of pixel values of corresponding pixels, such a value that increases in inverse proportion to the distance between the visual point of the monocular image E # i as a pixel value calculation image having the corresponding pixels and the visual point of the interpolation image having the interpolation target pixels.

<Generation of Disparity Map>

Figure 23:
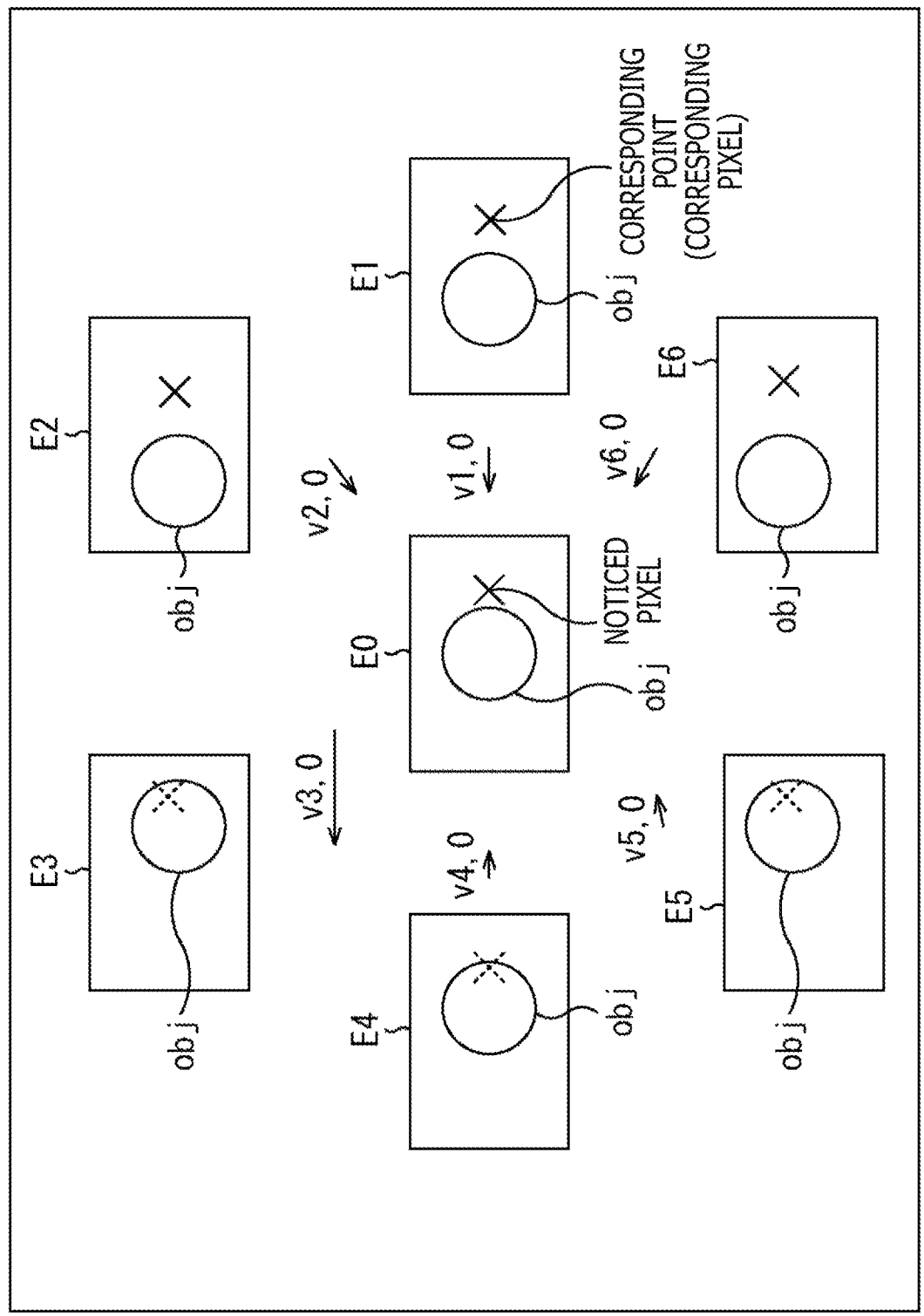
FIG. 23 is a view illustrating an example of generation of a disparity map by a parallax information generation section 81.

FIG. 23 is a view illustrating an example of generation of a disparity map by the parallax information generation section 81 of FIG. 19.

In particular, FIG. 23 depicts an example of monocular images E0 to E6 corresponding to the monocular lenses $31_0$ to $31_6$ of the region specification section 52.

In the monocular images E0 to E6 in FIG. 23, a predetermined object obj as a foreground appears on this side with respect to a predetermined background. Since the monocular images E0 to E6 are different from one another in visual point, for example, the positions (positions on monocular images) of the object obj appearing in the monocular images E1 to E6 are displaced from the position of the object obj appearing in the monocular image E0 each by a distance corresponding to a difference in visual point.

Now, it is assumed that the visual point (position) of a monocular lens $31_i$, that is, the visual point of the monocular image E # i corresponding to the monocular lens $31_i$, is represented as vp # i.

For example, in the case where a disparity map of the visual point vp0 of the monocular image E0 is to be generated, the parallax information generation section 81 sets the monocular image E0 as a noticed image E0 to be noticed. Further, the parallax information generation section 81 sequentially selects the pixels of the noticed image E0 as a noticed pixel to be noticed and detects a corresponding pixel (corresponding point) corresponding to the noticed pixel from each of the other monocular images E1 to E6.

As a method of detecting a corresponding pixel that corresponds to the noticed pixel of the noticed image E0 from each of the monocular images E1 to E6, for example, a method that utilizes the principle of triangulation such as stereo matching or multi-baseline stereo is available.

Here, a vector representative of a position displacement of a corresponding pixel of a monocular image E # i corresponding to a noticed pixel of the noticed image E0 is referred to as a disparity vector v # i,0.

The parallax information generation section 81 determines disparity vectors v1,0 to v6,0 for the monocular images E1 to E6, respectively. Then, the parallax information generation section 81 performs majority decision targeting, for example, the magnitude of the disparity vectors v1,0 to v6,0, and determines the magnitude of the disparity vector v # i,0 that wins the majority decision, as magnitude of the disparity of (the position of) the noticed pixel.

Here, in the case where the distance between the monocular lens $31_0$ by which the noticed image E0 is obtained and each of the monocular lenses $31_1$ to $31_6$ by which the monocular images E1 to E6 are obtained, respectively, is the equal distance B, as explained with reference to FIG. 21, when an actual space point appearing at the noticed pixel of the noticed image E0 also appears in the monocular images E1 to E6, the region specification section 52 determines, as the disparity vectors v1,0 to v6,0, vectors that are equal in magnitude to one another but different in orientation from one another.

In particular, in this case, the disparity vectors v1,0 to v6,0 are vectors that have directions reverse to those of the visual points vp1 to vp6 of the other monocular images E1 to E6 to the visual point vp0 of the noticed image E0 but have equal magnitudes to one another.

However, the monocular images E1 to E6 may possibly include an image that suffers from occlusion, that is, an image in which an actual space point appearing at the noticed pixel of the noticed image E0 is hidden by the foreground and does not appear.

For a monocular image (hereinafter also referred to as an occlusion image) E # i in which an actual space point appearing at the noticed pixel of the noticed image E0 does not appear, it is difficult to detect a correct pixel as the corresponding pixel corresponding to the noticed pixel.

Therefore, it is highly possible that, with respect to the occlusion image E # i, a disparity vector v # i,0 having a magnitude different from the disparity vector v # j,0 of the monocular image E # i in which an actual space point appearing at the noticed pixel of the noticed image E appears may be determined.

It is estimated that, among the monocular images E1 to E6, the number of images that suffer from occlusion is smaller than that of images that do not suffer from occlusion. Therefore, the parallax information generation section 81 performs majority decision targeting the magnitude of the disparity vectors v1,0 to v6,0 and determines the magnitude of the disparity vector v # i,0 that wins the majority decision, as a magnitude of the disparity of the noticed pixel, as described above.

In FIG. 23, among the disparity vectors v1,0 to v6,0, the three disparity vectors v1,0, v2,0, and v6,0 are vectors having an equal magnitude. Meanwhile, in the disparity vectors v3,0, v4,0, and v5,0, disparity vectors having an equal magnitude do not exist.

Therefore, the magnitude of the three disparity vectors v1,0, v2,0, and v6,0 is determined as the magnitude of the disparity of the noticed pixel.

It is to be noted that the direction of the disparity of the noticed pixel of the noticed image E0 with a freely-selected monocular image E # i can be recognized from a positional relationship between the visual point vp0 of the noticed image E0 (position of the monocular lens $31_0$) and the visual point vp # i of the monocular image E # i (position of the monocular lens $31_i$) (such as the direction from the visual point vp0 to the visual point vp # i).

The parallax information generation section 81 sequentially selects the pixels of the noticed image E0 as a noticed pixel and determines the magnitude of the disparity of the noticed pixel. Then, the parallax information generation section 81 generates a map in which the magnitude of the disparity of each of the pixels of the noticed image E0 is registered, for the position (xy coordinates) of the pixel, as a disparity map. Accordingly, the disparity map is a map (table) that associates positions of pixels and magnitudes of disparities of the pixels with each other.

Also the disparity map of the visual point vp # i of each of the other monocular images E # i can be generated similarly to the disparity map of the visual point vp0.

However, in generating a disparity map of any visual point vp # i other than the visual point vp #0, the majority decision of a disparity vector is performed after the magnitude of the disparity vectors is adjusted, on the basis of the positional relationship between the visual point vp # i of the monocular image E # i and the visual point vp # j of each of the monocular images E # i other than the monocular image E # i (positional relationship between the monocular lenses $31_i$ and $31_j$) (distance between the visual point vp # i and the visual point vp # j).

In particular, for example, in the case where a disparity map is generated using the monocular image E4 as a noticed image, the disparity vector obtained between the noticed image E4 and the monocular image E1 has a magnitude equal to twice the magnitude of the disparity vector obtained between the noticed image E4 and the monocular image E0. This is because, while the baseline length that is a distance between the optical axes of the monocular lens $31_4$ by which the noticed image E4 is obtained and the monocular lens $31_0$ by which the monocular image E0 is obtained is the distance B, the baseline length between the monocular lens $31_4$ by which the noticed image E4 is obtained and the monocular lens $31_1$ by which the monocular image E1 is obtained is the distance 2B.

Therefore, it is assumed now that the distance B that is the baseline length between the monocular lens $31_0$ and a different monocular lens $31_i$ is referred to as a reference baseline length that becomes a reference for determining a disparity. The majority decision of a disparity vector is performed by adjusting the magnitude of the disparity vectors such that the baseline length is converted into the reference baseline length B.

In other words, for example, since the baseline length B of the monocular lens $31_4$ by which the noticed image E4 is obtained and the monocular lens $31_0$ by which the monocular image E0 is obtained is equal to the reference baseline length B, the disparity vector obtained between the noticed image E4 and the monocular image E0 is adjusted to one time in magnitude.

Meanwhile, since, for example, the baseline length 2B of the monocular lens $31_4$ by which the noticed image E4 is obtained and the monocular lens $31_1$ by which the monocular image E1 is obtained is equal to twice the reference baseline length B, the disparity vector obtained between the noticed image E4 and the monocular image E1 is adjusted in magnitude to ½ time that is equal to the ratio between the reference baseline length B and the baseline length 2B of the monocular lens $31_4$ and the monocular lens $31_1$.

Also the disparity vector obtained between the noticed image E4 and any other monocular image E # i is similarly adjusted in magnitude to a value that is equal to the ratio to the reference baseline length B.

Then, using the disparity vector after the adjustment in magnitude, majority decision of a disparity vector is performed.

It is to be noted that the parallax information generation section 81 can decide a disparity of (each pixel of) each monocular image E # i with accuracy of a pixel of a monocular image, for example. Further, the disparity of each monocular image E # i can be determined with accuracy of a pixel or less that is accuracy finer than a pixel of the monocular image E # i (for example, with accuracy of a subpixel equal to a ¼ pixel or the like).

In the case where a disparity is determined with accuracy of a pixel or less, in processing in which the disparity is used, not only is it possible to use a disparity of accuracy of a pixel or less as it is but it is also possible to convert the disparity of the accuracy of a pixel or less into and use it as an integer by rounding down or rounding up the decimal point of the disparity or rounding off.

Here, the magnitude of a disparity registered in a disparity map is hereinafter also referred to as a registered disparity. For example, in the case where a vector as a disparity is represented in a two-dimensional coordinate system in which an axis from left to right is determined as an x axis and an axis from bottom to top is determined as a y axis, a registered disparity is equal to an x component of the disparity between each pixel of the monocular image E0 and the monocular image E4 of the left neighboring visual point with respect to the monocular image E0 (vector representative of a pixel displacement from a pixel of the monocular image E0 to a corresponding pixel of the monocular image E4 corresponding to the pixel).

<Refocusing by Light Focusing Process>

Figure 24:
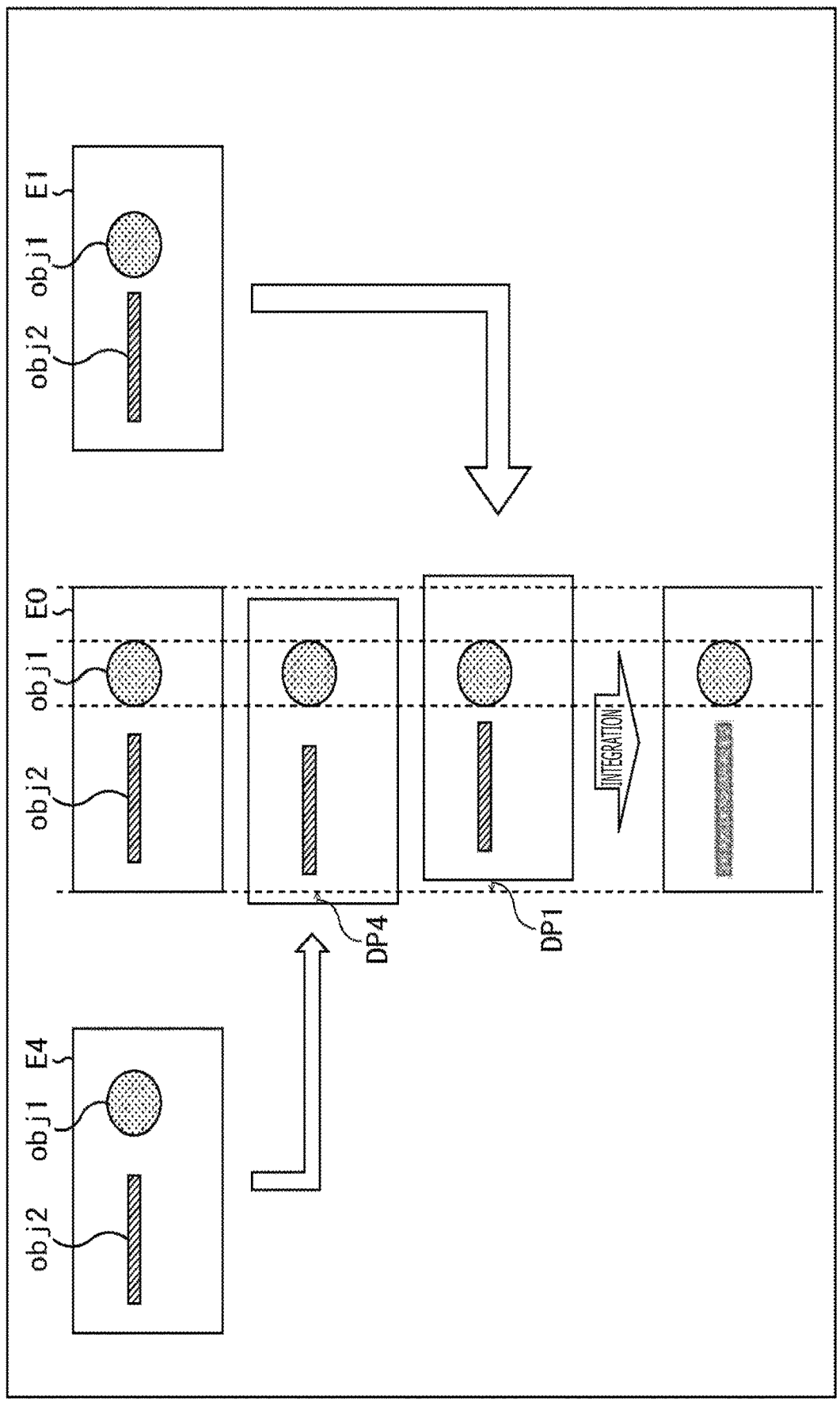
FIG. 24 is a view illustrating an overview of refocusing by a light focusing process performed by a light focusing processing section 83.

FIG. 24 is a view illustrating an overview of refocusing by a light focusing process performed by the light focusing processing section 83 of FIG. 19.

It is to be noted that, in FIG. 24, in order to simplify description, three images that are the monocular image E0, the monocular image E1 of the right neighboring visual point with respect to the monocular image E0, and the monocular image E4 of the left neighboring visual point with respect to the monocular image E0 are used as visual point images of a plurality of visual points to be used for a light focusing process.

Referring to FIG. 24, two objects obj1 and obj2 appear in the monocular images E0, E1, and E4. For example, the object obj1 is positioned on the near side while the object obj2 is positioned on the deep side.

Now, it is assumed, for example, that refocusing for focusing on (adjusting the focus to) the object obj1 is to be performed to obtain an image as viewed from the visual point of the monocular image E0 as a processing result image after the refocusing.

Here, the disparity of the visual point of the processing result image (here, the visual point of the monocular image E0) with respect to a pixel at which the object obj1 of the monocular image E0 appears is represented as DP0. Meanwhile, the disparity of the visual point of the processing result image with respect to a pixel at which the object obj1 of the monocular image E1 appears is represented as DP1, and the disparity of the visual point of the processing result image with respect to a pixel at which the object obj1 of the monocular image E4 appears is represented as DP4.

It is to be noted that, since, in FIG. 24, the visual point of the processing result image is equal to the visual point of the monocular image E0, the disparity DP0 of the visual point of the processing result image with respect to the pixel at which the object obj1 of the monocular image E0 appears is (0, 0).

In regard to the monocular images E0, E1, and E4, a processing result image focusing on the object obj1 can be obtained by pixel-shifting the monocular images E0, E1, and E4 according to the disparities DP0, DP1, and DP4, respectively, and integrating the monocular images E0, E1, and E4 after the pixel-shifting.

In particular, if the monocular images E0, E1, and E4 are pixel-shifted such that the disparities DP0, DP1, and DP4 are cancelled (in the reverse direction to the disparities DP0, DP1, and DP4), then in the monocular images E0, E1, and E4 after the pixel-shifting, the positions of the pixels at which the object obj1 appears coincide with each other.

Accordingly, by integrating the monocular images E0, E1, and E4 after the pixel shift, a processing result image focusing on the object obj1 can be obtained.

It is to be noted that, in the monocular images E0, E1, and E4 after the pixel-shifting, the positions of pixels at which the object obj2 at a position in the depthwise direction different from that of the object obj1 appears do not coincide with each other. Therefore, the object obj2 appearing in the processing result image is blurred.

Further, as described above, since the visual point of the processing result image here is the visual point of the monocular image E0 and the disparity DP0 is (0, 0), there is substantially no necessity to perform pixel-shifting for the monocular image E0.

In the light focusing process by the light focusing processing section 83, by pixel-shifting the pixels of a visual point image of a plurality of visual points such that the disparity of the visual point of the processing result image (here, the visual point of the monocular image E0) with respect to focusing target pixels on which a focusing target appears is cancelled and integrating the pixels, an image in which refocusing is performed for the focusing target is determined as the processing result image.

<Disparity Conversion>

Figure 25:
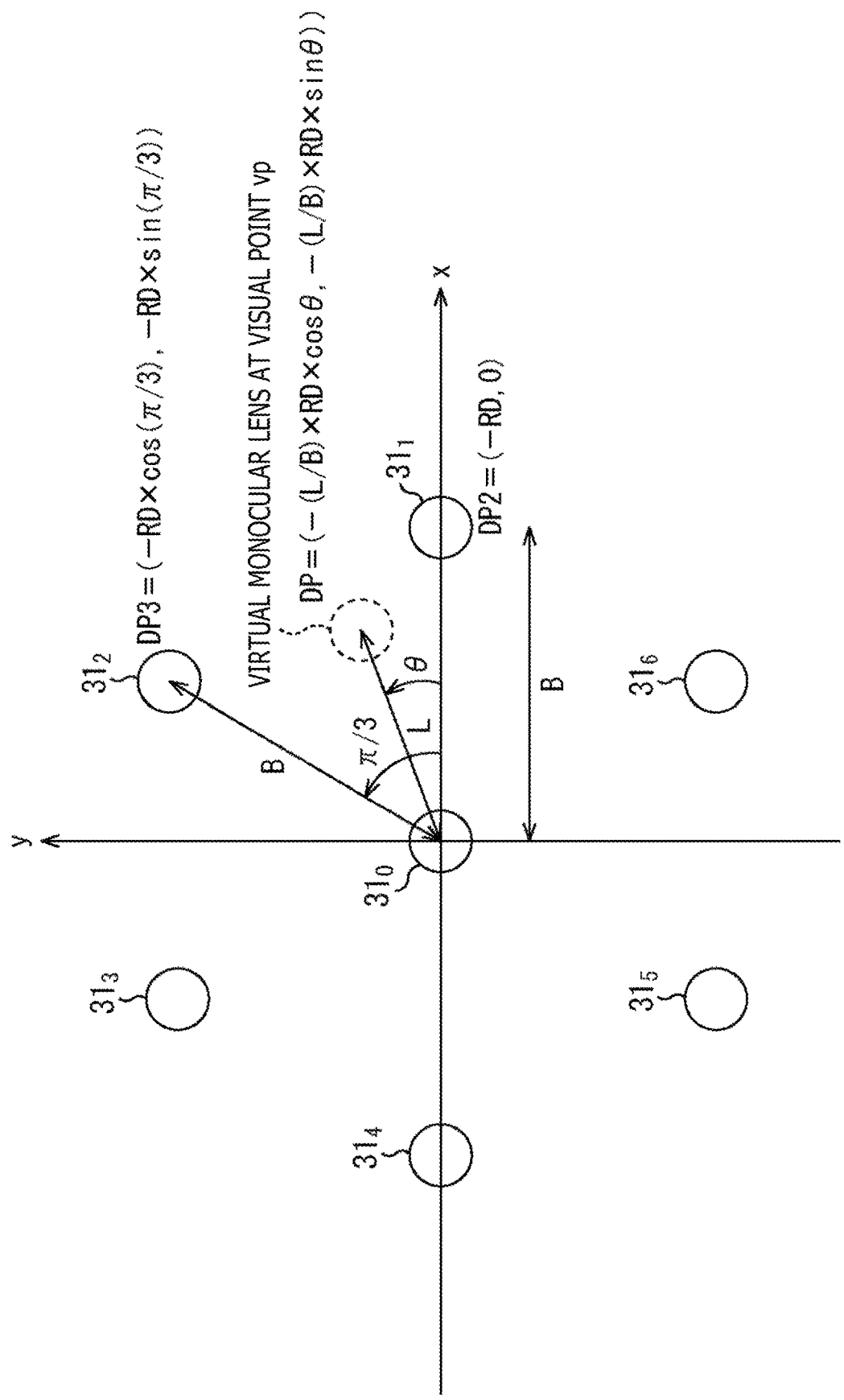
FIG. 25 is a view illustrating an example of disparity conversion.

FIG. 25 is a view illustrating an example of disparity conversion.

As described hereinabove with reference to FIG. 23, a registered disparity registered in the disparity map is equal to an x component of a disparity of a pixel of the monocular image E0 with respect to each pixel of the monocular image E4 at the left adjacent visual point with respect to the monocular image E0, in a portion other than the region suffering from occlusion.

In the refocusing, it is necessary to pixel-shift a visual point image such that the disparity of the focusing target pixel is cancelled.

If a certain visual point is noticed now as a noticed visual point, then upon pixel-shifting of a visual point image of the noticed visual point in refocusing, the disparity of a focusing target pixel of the processing result image with respect to the visual point image of the noticed visual point, that is, for example, the disparity of the focusing target pixel of the monocular image E0 here, is required.

The disparity of the focusing target pixel of the monocular image E0 with respect to the visual point image of the noticed visual point can be determined from the registered disparity of the focusing target pixel of the monocular image E0 (corresponding pixel of the monocular image E0 corresponding to the focusing target pixel of the processing result image), taking the direction of the noticed visual point from the visual point of the processing result image into account.

Now, the direction of the noticed visual point from the visual point of the monocular image E0, which is the visual point of the processing result image, is represented by an angle in the counterclockwise direction with the x axis set to 0 [radian].

For example, the monocular lens $31_1$ is positioned in a spaced relationship in the +x direction by the reference baseline length B from the visual point of the monocular image E0, which is the visual point of the processing result image, and the direction of the visual point of the monocular image E1 corresponding to the monocular lens $31_1$ from the visual point of the monocular image E0, which is the visual point of the processing result image, is 0 [radian]. In this case, (the vector as) the disparity DP1 of the focusing target pixel of the monocular image E0 with respect to the monocular image E1 (visual point image) corresponding to the monocular lens $31_1$ can be determined from the registered disparity RD of the focusing target pixel by $(-RD, 0) = (-(B/B) \times RD \times \cos \theta, -(B/B) \times RD \times \sin \theta)$, taking 0 [radian] that is the direction of the visual point of the monocular image E1 corresponding to the monocular lens $31_1$ into account.

Meanwhile, for example, the monocular lens $31_2$ is at a position spaced in the direction of $\pi/3$ by the reference baseline length B from the visual point of the monocular image E0, which is the visual point of the processing result image, and the direction of the visual point of the monocular image E3 corresponding to the monocular lens $31_2$ from the visual point of the monocular image E0, which is the visual point of the processing result image, is $\pi/3$ [radian]. In this case, the disparity DP2 of the focusing target pixel of the monocular image E0 with respect to the monocular image E3 corresponding to the monocular lens $31_2$ can be determined from the registered disparity RD of the focusing target pixel by $(-RD \times \cos(\pi/3), -RD \times \sin(\pi/3)) = (-(B/B) \times RD \times \cos(\pi/3), -(B/B) \times RD \times \sin(\pi/3))$, taking $\pi/3$ [radian] that is the direction of the visual point of the monocular lens $31_2$ into account.

Here, an interpolation image obtained by the interpolation section 82 can be deemed as an image captured through a virtual lens positioned at a visual point vp of the interpolation image. It is assumed that the visual point vp of the image captured through the virtual lens is at a position spaced away by a distance L in the direction of the angle θ [radian] from the visual point of the monocular image E0, which is the visual point of the processing result image. In this case, the disparity DP of the focusing target pixel of the monocular image E0 with respect to the visual point image of the visual point vp (image captured through the virtual lens) can be determined from the registered disparity RD of the focusing target pixel as $(-(L/B) \times RD \times \cos \theta, -(L/B) \times RD \times \sin \theta)$, taking the angle θ that is the direction of the visual point vp into account.

To determine the disparity of the pixel of the monocular image E0 with respect to the visual point image of the noticed visual point from the registered disparity RD by taking the direction of the noticed visual point in account in such a manner as described above, that is, to convert the registered disparity RD into the disparity of the pixel of the monocular image E0 (pixel of the processing result image) with respect to the visual point image of the noticed visual point, is also referred to as disparity conversion.

In the refocusing, the disparity of the focusing target pixel of the monocular image E0 with respect to the visual point image of each visual point is determined by disparity conversion from the registered disparity RD of the focusing target pixel, and the visual point image of each visual point is pixel-shifted so as to cancel the disparity of the focusing target pixel.

In the refocusing, the visual point image is pixel-shifted so as to cancel the disparity of the focusing target pixel with respect to the visual point image, and the shift amount of this pixel-shifting is also referred to as a focusing shift amount.

Here, the visual point of the i-th visual point image among a visual point image of a plurality of visual points obtained by the interpolation section 82 is hereinafter also referred to as a visual point vp # i. The focusing shift amount of the visual point image of the visual point vp # i is also referred to as a focusing shift amount SV # i.

The focusing shift amount SV # i of the visual point image of the visual point vp # i can be determined uniquely by disparity conversion from the registered disparity RD of the focusing target pixel taking the direction of the visual point vp # i from the visual point of the monocular image E0, which is the visual point of the processing target image, into account.

Here, by the disparity conversion, (a vector as) a disparity $(-(L/B) \times RD \times \cos \theta, -(L/B) \times RD \times \sin \theta)$ is determined from the registered disparity RD as described hereinabove.

Accordingly, the disparity conversion can be recognized as, for example, an arithmetic operation of multiplying the registered disparity RD by $-(L/B) \times \cos \theta$ and $-(L/B) \times \sin \theta$, an arithmetic operation of multiplying-1 time the registered disparity RD by $(L/B) \times \cos \theta$ and $(L/B) \times \sin \theta$, or the like.

Here, it is assumed that, for example, the disparity conversion is recognized as an arithmetic operation of multiplying-1 time the registered disparity RD by $(L/B) \times \cos \theta$ and $(L/B) \times \sin \theta$.

In this case, the value of the target of the disparity conversion, that is, -1 time the registered disparity RD here, is a value that becomes a reference for determining a focusing shift amount of the visual point image of the visual points, and is hereinafter also referred to as a reference shift amount BV.

Since the focusing shift amount is determined uniquely depending upon the disparity conversion of the reference shift amount BV, according to setting of the reference shift amount BV, a pixel shift amount by which a pixel of the visual point image of the visual points is to be pixel-shifted is set substantially in refocusing by the setting.

It is to be noted that, in the case where -1 time the registered disparity RD is adopted as the reference shift amount BV, the reference shift amount BV when the focusing target pixel is to be focused, that is, -1 time the registered disparity RD of the focusing target pixel, is equal to the x component of the disparity of the focusing target image with respect to the monocular image E1, as described hereinabove.

<Light Focusing Process in Which Refocusing Is Performed>

Figure 26:
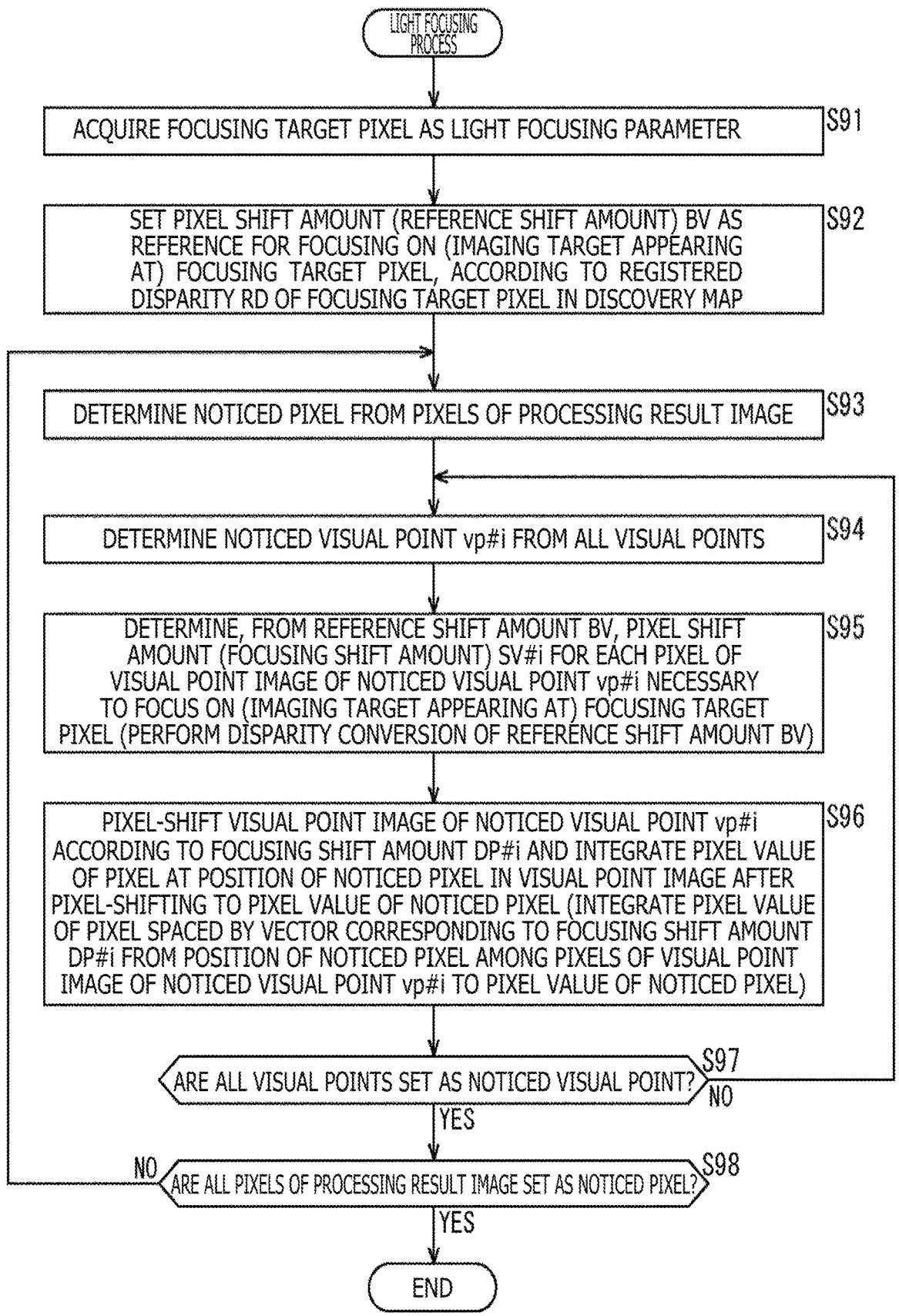
FIG. 26 is a flow chart illustrating an example of a light focusing process in which refocusing is performed.

FIG. 26 is a flow chart illustrating an example of a light focusing process in which refocusing is performed.

In step S91, the light focusing processing section 83 acquires (information of) a focusing target pixel as a light focusing parameter from the parameter setting section 84. Then, the processing advances to step S92.

In particular, for example, the monocular image E0 or the like among the monocular images E0 to E6 corresponding to the monocular lenses 310 to 316 is displayed on the display section 54. If the user designates one position on the monocular image E0, then the parameter setting section 84 sets a pixel at the position designated by the user, as a focusing target pixel, and supplies (information representative of) the focusing target pixel as a light focusing parameter to the light focusing processing section 83.

In step S91, the light focusing processing section 83 acquires the focusing target pixel supplied from the parameter setting section 84 in such a manner as described above.

In step S92, the light focusing processing section 83 acquires the registered disparity RD of the focusing target pixel registered in the disparity map from the parallax information generation section 81. Then, the light focusing processing section 83 sets a reference shift amount BV according to the registered disparity RD of the focusing target pixel, in particular, sets, for example, -1 time the registered disparity RD of the focusing target pixel, as the reference shift amount BV. Then, the processing advances from step S92 to step S93.

In step S93, the light focusing processing section 83 sets, for example, an image corresponding to the monocular image E0, which is one of the visual point images of a plurality of visual points from the interpolation section 82, i.e., an image that has the same size as that of the monocular image E0 as viewed from the visual point of the monocular image E0 and has a pixel value of 0 as an initial value, as a processing result image. Further, the light focusing processing section 83 determines, from among the pixels of the processing result image, one of pixels that are yet to be determined as a noticed pixel, as a noticed pixel. Then, the processing advances from step S93 to step S94.

In step S94, the light focusing processing section 83 determines, from among the visual points of the visual point image from the interpolation section 82, one visual point vp # i that is yet to be determined as a noticed visual point, (in regard to the noticed pixel), as a noticed visual point vp # i. Then, the processing advances to step S95.

In step S95, the light focusing processing section 83 determines, from the reference shift amount BV, a focusing shift amount SV # i for each pixel of the visual point image of the noticed visual point vp # i necessary to focus on the focusing target pixel (to adjust the focus on the imaging target appearing on the focusing target pixel).

In particular, the light focusing processing section 83 performs disparity conversion of the reference shift amount BV taking the direction of the noticed visual point vp # i from the visual point of the monocular image E0, which is the visual point of the processing result image, into account. Then, the light focusing processing section 83 acquires a value (vector) obtained as a result of the disparity conversion, as a focusing shift amount SV # i of each pixel of the visual point image of the noticed visual point vp # i.

Thereafter, the processing advances from step S95 to step S96, in which the light focusing processing section 83 performs pixel-shifting of each pixel of the visual point image of the noticed visual point vp # i according to the focusing shift amount SV # i and integrates the pixel value of the pixel at the position of the noticed pixel of the visual point image after the pixel-shifting, with the pixel value of the noticed pixel.

In particular, the light focusing processing section 83 integrates the pixel value of the pixel spaced by the vector corresponding to the focusing shift amount SV # i (here, for example, −1 time the focusing shift amount SV # i) from the position of the noticed pixel among the pixels of the visual point image of the noticed visual point vp # i, with the pixel value of the noticed pixel.

Then, the processing advances from step S96 to step S97, in which the light focusing processing section 83 decides whether or not all visual points of the visual point image from the interpolation section 82 have been made a noticed visual point.

In the case where it is decided in step S97 that all visual points of the visual point image from the interpolation section 82 are yet to be made a noticed visual point, the processing returns to step S94, and thereafter, similar processes to those described above are repeated.

On the other hand, in the case where it is decided in step S97 that all visual points of the monocular image from the interpolation section 82 have been made a noticed visual point, the processing advances to step S98.

In step S98, the light focusing processing section 83 decides whether or not all of the pixels of the processing result image have been set as a noticed pixel.

In the case where it is decided at step S98 that all of the pixels of the processing result image are yet to be set as a noticed pixel, the processing returns to step S93, at which the light focusing processing section 83 newly determines, from among the pixels of the processing result image, one of pixels that are yet to be determined as a noticed pixel, as a noticed pixel. Thereafter, similar processes to those described above are repeated.

On the other hand, in the case where it is decided at step S98 that all of the pixels of the processing result image have been set as a noticed pixel, the light focusing processing section 83 outputs a processing result image and then ends the light focusing process.

It is to be noted that, by the light focusing process of FIG. 26, a processing result image in which the focus is on an imaging target positioned on a focal plane (in the proximity of the focal plane) given by a plane whose distance in the depthwise direction in the actual space is fixed (does not demonstrate a change) is generated using visual point images of a plurality of visual points.

In such a light focusing process of FIG. 26 as described above, the reference shift amount BV is set according to the registered disparity RD of the focusing target pixel and does not change depending upon the noticed pixel or the noticed visual point vp # i. Therefore, in the light detection process of FIG. 26, the reference shift amount BV is set irrespective of the noticed pixel or the noticed visual point vp # i.

Meanwhile, while the focusing shift amount SV # i changes depending upon the noticed visual point vp # i and the reference shift amount BV, in the light focusing process of FIG. 26, the reference shift amount BV does not change depending upon the noticed pixel or the noticed visual point vp # i, as described above. Accordingly, while the focusing shift amount SV # i changes depending upon the noticed visual point vp # i, it does not change depending upon the noticed pixel. In other words, the focusing shift amount SV # i has a same value among the pixels of a visual point image of one visual point, irrespective of the noticed pixel.

Although the process in step S95 of determining the focusing shift amount SV # i in FIG. 26 configures a loop for repeatedly calculating the focusing shift amount SV # i for the same visual point vp # i in regard to different noticed pixels (loop from step S93 to step S98), as described above, the focusing shift amount SV # i has the same value among the pixels of the visual point image of one visual point, irrespective of the noticed pixel.

Accordingly, it is sufficient if the process in step S95 for determining the focusing shift amount SV # i in FIG. 26 is performed only once for one visual point.

<Acquisition of Unknown Reference Position (dx # i, dy # i) Utilizing Server>

Figure 27:
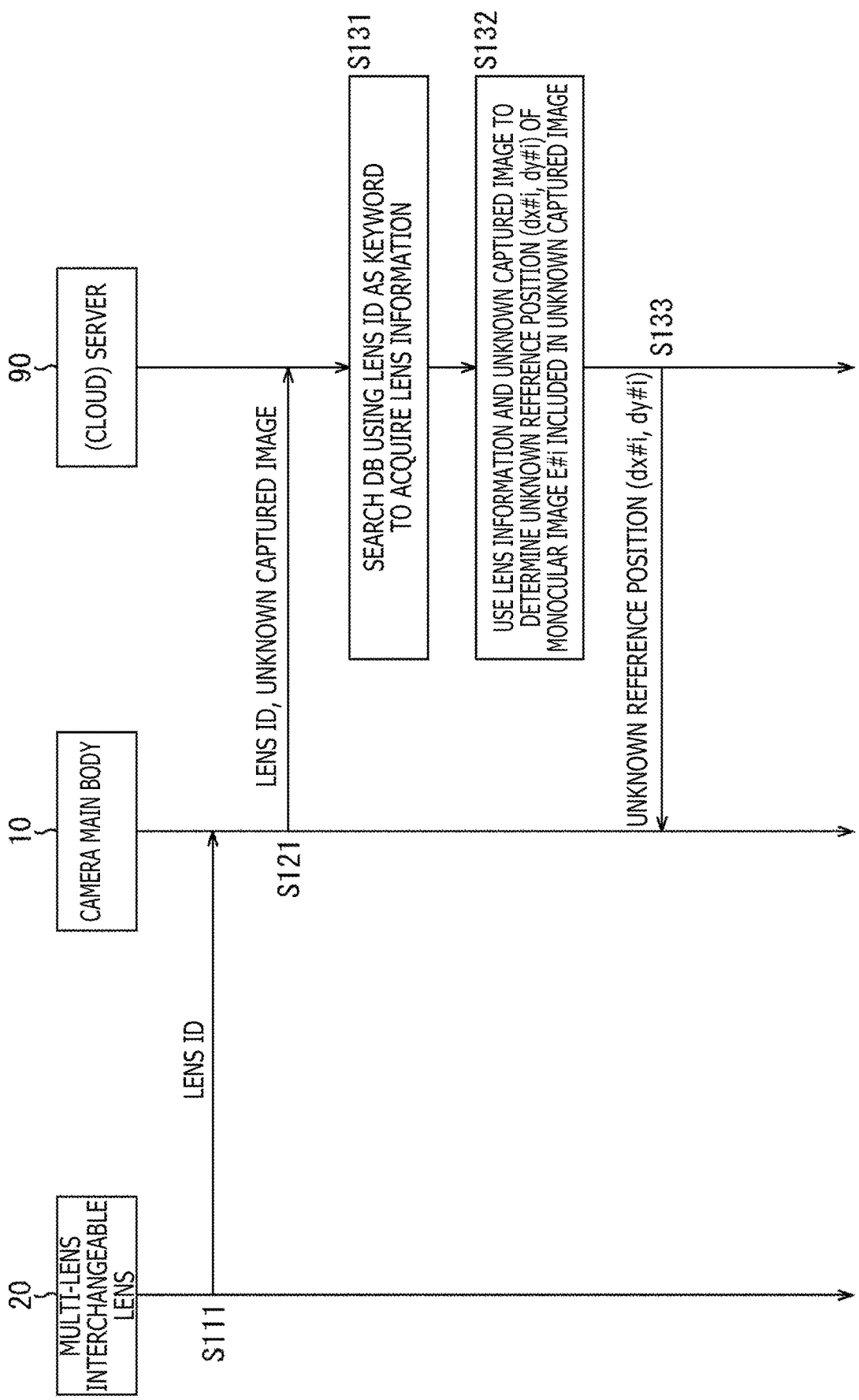
FIG. 27 is a view illustrating an example of a process of acquiring an unknown reference position (dx # i', dy # i') of an unknown captured image utilizing a server.

FIG. 27 is a view illustrating an example of a process for acquiring an unknown reference position (dx # i', dy # i') of an unknown captured image utilizing a server.

It is to be noted that, in FIG. 27, it is assumed that, in the storage section 41 of the multi-lens interchangeable lens 20, the lens ID of the multi-lens interchangeable lens 20 is stored as lens information, and a database in which the lens ID and other lens information (known reference positions (dx # i, dy # i) and so forth) of the multi-lens interchangeable lens 20 specified by the lens ID are associated with each other is prepared.

For example, if the multi-lens interchangeable lens 20 is mounted on the camera main body 10, then in step S1111, the communication section 42 of the multi-lens interchangeable lens 20 (FIG. 3) (FIG. 12) transmits the lens ID as lens information stored in the storage section 41 to the camera main body 10.

The communication section 56 of the camera main body 10 (FIG. 3) (FIG. 12) receives the lens ID from the multi-lens interchangeable lens 20.

Then, in the camera system (FIG. 1) (FIG. 11) in which the multi-lens interchangeable lens 20 is mounted on the camera main body 10, if an unknown captured image is captured, then in step S121, the communication section 56 of the camera main body 10 transmits the lens ID from the multi-lens interchangeable lens 20 and the unknown captured image to, for example, a server 90 on a cloud.

The server 90 receives the lens ID and the unknown captured image from the camera main body 10. Further, in step S131, the server 90 searches the database (DB) using the lens ID from the camera main body 10 as a keyword and acquires the known reference positions (dx # i, dy # i) and the known light positions $(X_L, Y_L)$ and $(X_R, Y_R)$ or the reference angles θxi as the other lens information of the multi-lens interchangeable lens 20 specified by the lens ID.

Then, in step S132, the server 90 uses the known reference positions (dx # i, dy # i) and the known light positions $(X_L, Y_L)$ and $(X_R, Y_R)$ or the reference angles θxi as the lens information of the multi-lens interchangeable lens 20 searched from the database, to determine unknown reference positions (dx # i', dy # i') of the monocular images E # i included in the unknown captured image from the camera main body 10.

Further, in step S133, the server 90 transmits the unknown reference positions (dx # i', dy # i') to the camera main body 10.

In the camera main body 10 (FIG. 3), the communication section 56 receives the unknown reference positions (dx # i', dy # i') from the server 90 and supplies them to the region specification section 52. The region specification section 52 uses the unknown reference positions (dx # i', dy # i') from the server 90 to specify regions of the monocular images E # i on the unknown captured image.

The unknown reference positions (dx # i', dy # i') can be determined by the server 90 separately from the camera main body 10 as described above. In this case, the camera main body 10 can be configured without including the reference position calculation section 57 (FIG. 3) or the reference position calculation section 71 (FIG. 12).

It is to be noted that, after the server 90 determines the unknown reference positions (dx # i', dy # i') of the monocular images E # i included in the unknown captured image, the server 90 can use the unknown reference positions (dx # i', dy # i') to specify regions of the monocular images E # i on the unknown captured image and transmit region specification result information representative of a result of the specification of the regions to the camera main body 10.

In this case, the camera main body 10 can be configured without including the reference position calculation section 57 or 71 and the region specification section 52.

Further, the camera main body 10 can be configured without including the image processing section 53 and transmit an unknown captured image or monocular images E # i specified from the unknown captured image to the server 90. In this case, the server 90 can specify, as occasion demands, the monocular images E # i from the unknown captured image and use the monocular images E # i specified from the unknown captured image or the monocular images E # i transmitted from the camera main body 10 to perform image processing similar to that by the image processing section 53. Then, the server 90 can transmit a processing result image obtained by the image processing to the camera main body 10.

<Description of Computer to Which Present Technology Is Applied>

While the series of processes by the region specification section 52, the image processing section 53, communication section 56, the reference position calculation sections 57 and 71, and so forth described above can be executed by hardware, it may otherwise be executed by software. In the case where the series of processes is executed by software, a program that constructs the software is installed into a computer for universal use or the like.

Figure 28:
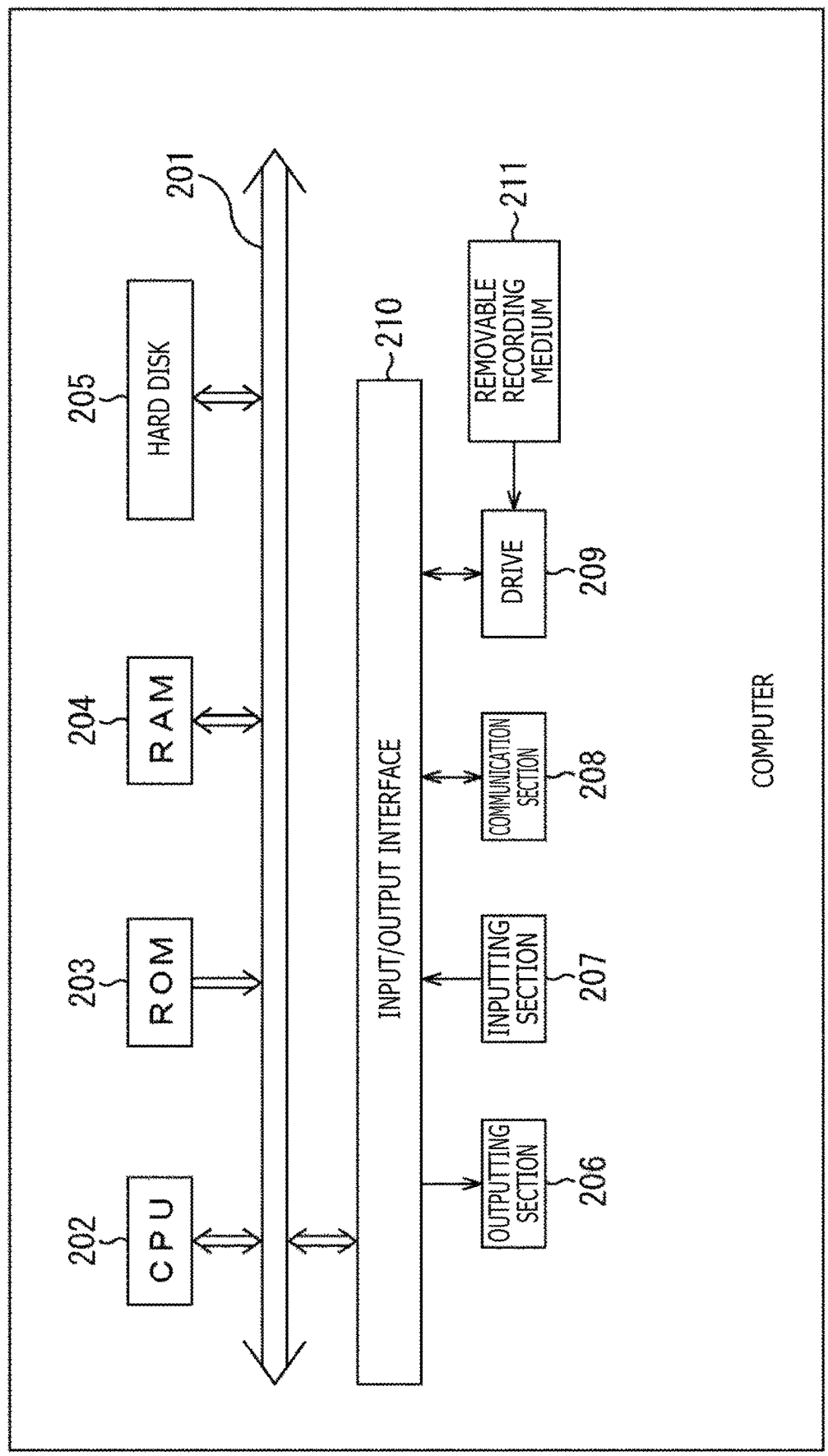
FIG. 28 is a block diagram depicting an example of a configuration of an embodiment of a computer to which the present technology is applied.

FIG. 28 is a block diagram depicting an example of a configuration of an embodiment of a computer into which a program for executing the series of processes described hereinabove is installed.

The program can be recorded in advance into a hard disk 205 as a recording medium or a ROM 203 built in the computer.

Alternatively, the program can be stored (recorded) in a removable recording medium 211. Such a removable recording medium 211 as just described can be provided as what is generally called package software. Here, as the removable recording medium 211, for example, a flexible disk, a CD-ROM (Compact Disc Read Only Memory), an MO (Magneto Optical) disk, a DVD (Digital Versatile Disc), a magnetic disk, a semiconductor memory, and so forth are available.

It is to be noted that the program can not only be installed into the computer from such a removable recording medium 211 as described above but can also be downloaded into the computer through a communication network or a broadcasting network and installed into the built-in hard disk 205. In particular, the program can be transferred, for example, from a download site to the computer by wireless transmission through an artificial satellite for digital satellite broadcasting or can be transferred to the computer by wired transmission through a network such as a LAN (Local Area Network) or the Internet.

The computer has a CPU (Central Processing Unit) 202 built therein, and an input/output interface 210 is connected to the CPU 202 through a bus 201.

If an inputting section 207 is operated by a user to input an instruction to the CPU 202 through the input/output interface 210, then the CPU 202 executes the program stored in the ROM 203 (Read Only Memory) in accordance with the instruction. As an alternative, the CPU 202 loads the program stored in the hard disk 205 into a RAM (Random Access Memory) 204 and executes the program.

Consequently, the CPU 202 performs the processes in accordance with the flow charts described hereinabove or performs processes that are performed by the configuration of the block diagram described above. Then, for example, the CPU 202 outputs a result of the processes from an outputting section 206 or transmits the result of the processes from a communication section 208, through the input/output interface 210, and further causes the result of the processes to be recorded on the hard disk 205, as occasion demands.

It is to be noted that the inputting section 207 includes a keyboard, a mouse, a microphone, and so forth. Meanwhile, the outputting section 206 includes an LCD (Liquid Crystal Display), a speaker, and so forth.

It is to be noted here that, in the present specification, the processes to be executed by the computer in accordance with the program are not necessarily required to be performed in a time series in accordance with the order described as the flow charts. In other words, the processes performed by the computer in accordance with the program include processes that are executed in parallel or individually (for example, by parallel processes or processes by objects).

Further, the program may be processed by a single computer (processor) or may be distributed to and processed by a plurality of computers. Furthermore, the program may be transferred to and processed by a remote computer.

Further, in the present specification, the term system signifies a set of plural components (devices, modules (parts), or the like) and it does not matter whether or not all components are included in the same housing. Accordingly, not only plural devices accommodated in individual housings and connected to each other through a network but also one apparatus including plural modules accommodated in one housing are systems.

Further, the embodiment of the present technology is not limited to the embodiments described hereinabove, and various alterations can be made without departing from the subject matter of the present disclosure.

For example, the present technology can assume a configuration for cloud computing in which one function is shared and processed cooperatively by plural devices through a network.

Further, the steps described hereinabove in connection with the flow charts can not only be executed by a single device but can also be executed by sharing by plural devices.

Furthermore, where one step includes plural processes, the plural processes included in the one step can be executed by a single device and also can be executed by sharing by plural devices.

Further, the advantageous effects described in the present specification are exemplary to the last and are not restrictive, and other advantageous effects may be applicable.

It is to be noted that the present technology can assume such a configuration as described below.

<1>
An information processing apparatus, including:
a communication section configured to receive, when an interchangeable lens including monocular lenses that are plural lenses arranged so as not to overlap with each other in an optical axis direction is mounted on a camera main body that includes an image sensor, known reference positions that are positions on a captured image on which a predetermined imaging target imaged by the image sensor appears, the positions corresponding to predetermined rays of light on monocular images corresponding to figures formed from rays of light focused by the monocular lenses; and
a reference position calculation section configured to determine unknown reference positions that are positions corresponding to the predetermined rays of light on the monocular images corresponding to the monocular lenses on a different captured image captured by the image sensor, on the basis of the known reference positions.

<2>
The information processing apparatus according to <1>, in which
the captured image includes an image on which the predetermined imaging target at a known distance appears.

<3>
The information processing apparatus according to <1> or <2>, further including:
a region specification section configured to specify regions for plural monocular images corresponding to the plural monocular lenses on the different captured image, on the basis of the unknown reference positions.

<4>
The information processing apparatus according to any one of <1> to <3>, in which
the interchangeable lens includes plural light sources for emitting light,
the communication section receives the known reference positions and known light positions that are light irradiation positions of the plural light sources on the captured image, and
the reference position calculation section determines the unknown reference positions on the basis of the known reference positions and the unknown light positions.

<5>
The information processing apparatus according to <4>, in which
the reference position calculation section
determines a rotational angle between a light irradiation position of each of the plural light sources on the different captured image and the known light positions, and
determines the unknown reference positions by rotating the known reference positions according to the rotational angles.

<6>
The information processing apparatus according to <4> or <5>, in which
the reference position calculation section further determines a parallel movement amount between the light irradiation positions of the light sources on the different captured image and the known light positions.

<7>
The information processing apparatus according to any one of <1> to <3>, in which
the reference position calculation section
extracts a feature point having a same feature from plural monocular images corresponding to the plural monocular lenses on the different captured image,
determines a rotational angle between an angle representing a direction of a line interconnecting the feature point of one monocular image among the plural monocular images and the feature point of a different monocular image and a reference angle that is an angle representing a direction of a line interconnecting the known reference position of the one monocular image and the known reference position of the different monocular image, and
determines the unknown reference positions by rotating the known reference positions according to the rotational angle.

<8>
The information processing apparatus according to <7>, in which
the communication section receives the known reference positions and the reference angles.

<9>
The information processing apparatus according to <3>, further including:
a light focusing processing section configured to perform a light focusing process for shifting and integrating pixels of visual point images of a plurality of visual points including the plural monocular images specified from the different captured image to generate a processing result image in which a distance in a depthwise direction is focused at a focus point at a predetermined distance.

<10>
The information processing apparatus according to <9>, in which
the light focusing processing section sets a shift amount by which pixels of the visual point image are to be shifted, according to parallax information of the visual point images of the plurality of visual points.

<11>
The information processing apparatus according to <9> or <10>, in which the visual point images of the plurality of visual points include the plural monocular images and plural interpolation images generated by interpolation using the plural monocular images.

<12>
The information processing apparatus according to <11>, further including:
a parallax information generation section configured to generate parallax information of the plural monocular images; and
an interpolation section configured to generate the plural interpolation images of visual points different from each other using the monocular images and the parallax information.

<13>
An information processing method by an information processing apparatus, including:
receiving, when an interchangeable lens including monocular lenses that are plural lenses arranged so as not to overlap with each other in an optical axis direction is mounted on a camera main body that includes an image sensor, known reference positions that are positions on a captured image on which a predetermined imaging target imaged by the image sensor appears, the positions corresponding to predetermined rays of light on monocular images corresponding to figures formed from rays of light focused by the monocular lenses; and determining unknown reference positions that are positions corresponding to the predetermined rays of light on the monocular images corresponding to the monocular lenses on a different captured image captured by the image sensor, on the basis of the known reference positions.

<14>

A program for causing a computer to function as:

a communication section configured to receive, when an interchangeable lens including monocular lenses that are plural lenses arranged so as not to overlap with each other in an optical axis direction is mounted on a camera main body that includes an image sensor, known reference positions that are positions on a captured image on which a predetermined imaging target imaged by the image sensor appears, the positions corresponding to predetermined rays of light on monocular images corresponding to figures formed from rays of light focused by the monocular lenses, and a reference position calculation section configured to determine unknown reference positions that are positions corresponding to the predetermined rays of light on the monocular images corresponding to the monocular lenses on a different captured image captured by the image sensor, on the basis of the known reference positions.

<15>

An interchangeable lens, including:

monocular lenses that are plural lenses arranged so as not to overlap with each other in an optical axis direction;

a storage section configured to store, when the interchangeable lens is mounted on a camera main body that includes an image sensor, known reference positions that are positions on a captured image on which a predetermined imaging target imaged by the image sensor appears, the positions corresponding to predetermined rays of light on monocular images corresponding to figures formed from rays of light focused by the monocular lenses; and a communication section configured to transmit the known reference position to the outside.

<16>

The interchangeable lens according to <15>, further including:

plural light sources for emitting light to the image sensor, in which the storage section stores the known reference positions and known light positions that are irradiation positions of light of the plural light sources on the captured image, and the communication section transmits the known reference positions and the known light positions.

<17>

The interchangeable lens according to <16>, in which the two light sources are arranged on a line interconnecting two points remotest from each other on a plane of the interchangeable lens on which the plural monocular lenses are arranged.

<18>

The interchangeable lens according to <16> or <17>, in which the plural light sources are provided such that irradiation positions of light of the plural light sources on a different captured image captured by the image sensor are positioned outside a region of the monocular images included in the different captured image.

<19>

The interchangeable lens according to <15>, in which the storage section stores the known reference positions and a reference angle that is an angle representing a direction of a line interconnecting the known reference position of one monocular image among the plural monocular images corresponding to the plural monocular lenses and the known reference position of a different monocular image, and the communication section transmits the known reference positions and the reference angle.

REFERENCE SIGNS LIST

10 Camera main body, 11 Camera mount, 20 Multi-lens interchangeable lens, 22 Lens mount, 23 Lens hood, $31_0$ to $31_6$ Monocular lens, 32L, 32R Light source, 41 Storage section, 42 Communication section, 51 Image sensor, 52 Region specification section, 53 Image processing section, 54 Display section, 55 Storage section, 56 Communication section, 57, 71 Reference position calculation section, 81 Parallax information generation section, 82 Interpolation section, 83 Light focusing processing section, 84 Parameter setting section, 90 Server, 201 Bus, 202 CPU, 203 ROM, 204 RAM, 205 Hard disk, 206 Outputting section, 207 Inputting section, 208 Communication section, 209 Drive, 210 Input/output interface, 211 Removable recording medium

The invention claimed is:

1. An information processing apparatus, comprising:
a communication section configured to receive, when an interchangeable lens unit including light sources and monocular lenses arranged so as not to overlap with each other is mounted on a camera main body that includes an image sensor,
known reference positions on a first captured image captured by the image sensor, the first captured image including first monocular images formed by the respective monocular lenses, and the known reference positions corresponding to predetermined rays of light on the respective first monocular images passed through the respective monocular lenses, and
known light positions corresponding to first light irradiation positions of the respective light sources on the first captured image; and
a reference position calculation section configured to determine, on a basis of the known reference positions and the known light positions, unknown reference positions corresponding to the predetermined rays of light on second monocular images formed by the respective monocular lenses on a second captured image captured by the image sensor different from the first captured image.

2. The information processing apparatus according to claim 1, wherein
the first captured image includes a predetermined imaging target at a known distance.

3. The information processing apparatus according to claim 1, further comprising:
a region specification section configured to specify regions for the second monocular images corresponding to the respective monocular lenses on the second captured image, on a basis of the unknown reference positions.

4. The information processing apparatus according to claim 1, wherein
the reference position calculation section is further configured to
determine a rotational angle between a line between second light irradiation positions of the respective light sources on the second captured image and a line between the known light positions on the first captured image, and
determine the unknown reference positions by moving the known reference positions according to the rotational angle.

5. The information processing apparatus according to claim 1, wherein
the reference position calculation section is further configured to determine a parallel movement amount between second light irradiation positions of the respective light sources on the second captured image and the known light positions on the first captured image.

6. An information processing method by an information processing apparatus, comprising:
receiving, when an interchangeable lens unit including light sources and monocular lenses arranged so as not to overlap with each other is mounted on a camera main body that includes an image sensor,
known reference positions on a first captured image captured by the image sensor, the first captured image including first monocular images formed by the respective monocular lenses, and the known reference positions corresponding to predetermined rays of light on the respective first monocular images passed through the respective monocular lenses, and
known light positions corresponding to first light irradiation positions of the respective light sources on the first captured image; and
determining, on a basis of the known reference positions and the known light positions, unknown reference positions corresponding to the predetermined rays of light on second monocular images formed by the respective monocular lenses on a second captured image captured by the image sensor different from the first captured image.

7. A non-transitory computer-readable medium having embodied thereon a program, which when executed by a computer causes the computer to execute a method, the method comprising:
receiving, when an interchangeable lens unit including light sources and monocular lenses arranged so as not to overlap with each other is mounted on a camera main body that includes an image sensor,
known reference positions on a first captured image captured by the image sensor, the first captured image including first monocular images formed by the respective monocular lenses, and the known reference positions corresponding to predetermined rays of light on the respective first monocular images passed through the respective monocular lenses, and
known light positions corresponding to first light irradiation positions of the respective light sources on the first captured image, and
determining, on a basis of the known reference positions and the known light positions, unknown reference positions corresponding to the predetermined rays of light on second monocular images formed by the respective monocular lenses on a second captured image captured by the image sensor different from the first captured image.

8. An interchangeable lens, comprising:
monocular lenses arranged so as not to overlap with each other to provide respective monocular images;
light sources each configured to emit light to an image sensor when the interchangeable lens is mounted on a camera main body that includes the image sensor;
a storage section configured to store known reference positions and known light positions, wherein
the known reference positions are positions corresponding to optical axes of the monocular lenses on the respective monocular images on a captured image acquired by the image sensor when the interchangeable lens is mounted on the camera main body, and
the known light positions are positions irradiated by the light sources on the captured image; and
a communication section configured to transmit information on the known reference position and the known light positions to an external device.

9. The interchangeable lens according to claim 8, wherein
at least two of the light sources are arranged on a line passing through a center of the interchangeable lens viewed from an imaging direction of the interchangeable lens.

10. The interchangeable lens according to claim 8, wherein
the light sources are provided such that irradiation positions of light of the light sources on the captured image are positioned outside a region of the monocular images included in the captured image.

11. The interchangeable lens according to claim 8, wherein
the storage section is configured to store a reference angle between a line interconnecting at least two of the known reference positions and a baseline of the interchangeable lens, and
the communication section is configured to transmit the known reference positions and the reference angle to the external device.

* * * * *